United States Patent
Adachi et al.

(10) Patent No.: US 6,810,362 B2
(45) Date of Patent: Oct. 26, 2004

(54) CONSTRUCTION MACHINE MANAGING METHOD AND SYSTEM, AND ARITHMETIC PROCESSING DEVICE

(75) Inventors: Hiroyuki Adachi, Tsuchiura (JP); Toichi Hirata, Ushiku (JP); Genroku Sugiyama, Inashiki-gun (JP); Hiroshi Watanabe, Ushiku (JP); Koichi Shibata, Tsuchiura (JP); Hideki Komatsu, Kitasoma-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 343 days.

(21) Appl. No.: 09/959,862
(22) PCT Filed: Apr. 2, 2001
(86) PCT No.: PCT/JP01/02852
§ 371 (c)(1),
(2), (4) Date: Nov. 9, 2001
(87) PCT Pub. No.: WO01/73633
PCT Pub. Date: Oct. 4, 2001

(65) Prior Publication Data
US 2002/0161551 A1 Oct. 31, 2002

(30) Foreign Application Priority Data
Mar. 31, 2000 (JP) .......... 2000-98055
Mar. 31, 2000 (JP) .......... 2000-99164

(51) Int. Cl.[7] .......... G06F 11/30
(52) U.S. Cl. .......... 702/187; 702/183; 702/184; 701/29; 340/870.16; 342/357.06
(58) Field of Search .......... 702/187, 182, 702/185, 188, 184, 183; 701/29; 37/348; 340/870.16, 870.01; 342/357.1, 357.06, 357.12

(56) References Cited

U.S. PATENT DOCUMENTS

| | | | |
|---|---|---|---|
| 5,628,229 A | | 5/1997 | Krone et al. |
| 5,808,907 A | * | 9/1998 | Shetty et al. .......... 702/188 |
| 6,256,594 B1 | * | 7/2001 | Yamamoto et al. .......... 702/185 |
| 6,542,851 B2 | * | 4/2003 | Hasegawa et al. .......... 702/182 |
| 6,611,740 B2 | * | 8/2003 | Lowrey et al. .......... 701/29 |
| 6,628,233 B2 | * | 9/2003 | Knockeart et al. .......... 342/357.1 |
| 2002/0103623 A1 | * | 8/2002 | Hasegawa et al. .......... 702/184 |
| 2003/0110667 A1 | * | 6/2003 | Adachi et al. .......... 37/348 |
| 2003/0193406 A1 | * | 10/2003 | Kinugawa .......... 340/870.16 |

FOREIGN PATENT DOCUMENTS

| | | |
|---|---|---|
| DE | 19512154 A | 3/1994 |
| JP | 3-242529 | 10/1991 |
| JP | 5-26784 | 2/1993 |
| JP | 6-116988 | 4/1994 |
| JP | 7-87005 | 3/1995 |
| JP | 7-294365 | 11/1995 |
| JP | 9-329051 | 12/1997 |
| WO | WO97/47489 | 12/1997 |

* cited by examiner

Primary Examiner—John Barlow
Assistant Examiner—Hien Vo
(74) Attorney, Agent, or Firm—Mattingly, Stanger & Malur, P.C.

(57) ABSTRACT

A method and system for managing a construction machine and processing apparatus therefor includes a controller 2 mounted on a hydraulic excavator 1 working in fields. An operating time for each of an engine 32, a front 15, a swing body 13 and a travel body 12 is measured and stored in a memory of the controller 2. The measured data is transferred to a base station computer 3 and stored in a database 100 inside the base station computer 3. The base station computer 3 reads, per hydraulic excavator, the data stored in the database 100 and then prepares and outputs a distribution graph of the number of operated machines with respect to the working time (engine running time) of the hydraulic excavator. While looking at the distribution graph, a machine maker estimates the number of hydraulic excavators to be renewed and estimates the sales quantity of hydraulic excavators, thereby setting up a production plan of hydraulic excavators.

30 Claims, 44 Drawing Sheets

FIG. 10

OPERATION DATABASE PER MACHINE MODEL AND NUMBER

MODEL A NO. N+1
MODEL A NO. N+2

| | MODEL A NO. N | | |
|---|---|---|---|
| 1 | JAN. 1, 2000 | $T_{NE}(1)$  $T_D(1)$ | ··· |
| ⋮ | ⋮ | ⋮ | |
| K | MARCH 16, 2000 | $T_{NE}(K)$  $T_D(K)$ | ··· |

ACTUAL MAINTENANCE DATABASE PER MACHINE MODEL AND NUMBER

MODEL A NO. N+1
MODEL A NO. N+2

| | MODEL A NO. N | |
|---|---|---|
| | BUCKET PRONG REPLACEMENT TIME INTERVAL (ACCUMULATIVE VALUE) | |
| 1 | $T_{FB}(1)$ | ··· e.g., 3400 hr |
| ⋮ | ⋮ | |
| L | $T_{FB}(L)$ | ··· e.g., 12500 hr |
| | TRAVEL LINK REPLACEMENT TIME INTERVAL (ACCUMULATIVE VALUE) | |
| 1 | $T_{TL}(1)$ | ··· e.g., 5100 hr |
| ⋮ | ⋮ | |
| M | $T_{TL}(M)$ | ··· e.g., 14900 hr |

RENEWING DATABASE PER MACHINE MODEL AND NUMBER

MODEL B
MODEL C

| MODEL A | | |
|---|---|---|
| NO. 1 | $T_X(1)$ | ··· e.g., 32000 hr |
| | ⋮ | |
| NO. L | $T_X(L)$ | ··· e.g., 30000 hr |

FIG.21
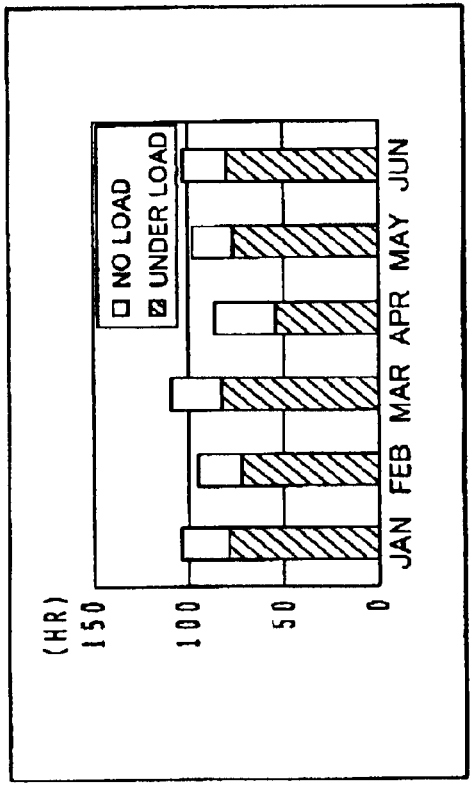
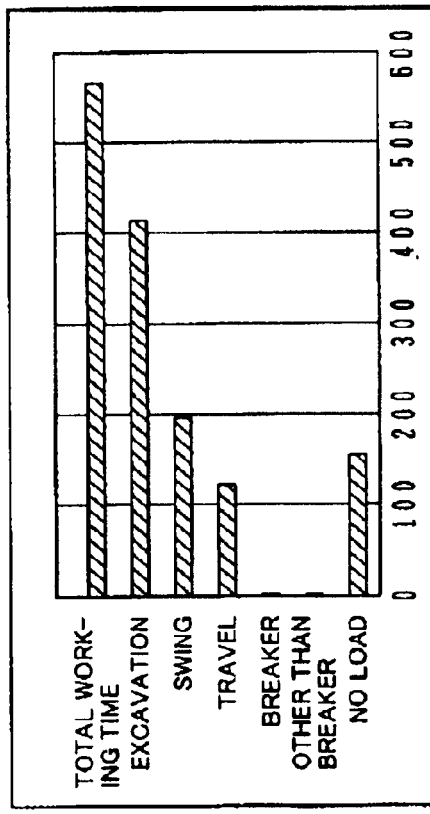

FIG.25

OPERATION DATABASE

| | MODEL A NO. N | | | |
|---|---|---|---|---|
| 1 | JAN. 1, 2000 | D(1) | $S_D(1)$ | ... |
| ⋮ | ⋮ | | | |
| K | MARCH 16, 2000 | D(K) | $S_D(K)$ | ... |

MODEL A NO. N+1

MODEL A NO. N+2

...

PUMP LOAD FREQUENCY DISTRIBUTION

1 JAN. 1, 2000

(FRONT)

| FROM 0 MPa TO 5 Mpa | 12 TIMES |
|---|---|
| FROM 5 MPa TO 10 Mpa | 32 TIMES |
| ⋮ | ⋮ |
| FROM 25 MPa TO 30 Mpa | 28 TIMES |
| NOT LESS THAN 30 MPa | 9 TIMES |

(SWING)

| FROM 0 MPa TO 5 Mpa | 8 TIMES |
|---|---|
| ⋮ | |
| NOT LESS THAN 30 MPa | 28 TIMES |

(TRAVEL)

| FROM 0 MPa TO 5 Mpa | 2 TIMES |
|---|---|
| ⋮ | |
| NOT LESS THAN 30 MPa | 22 TIMES |

⋮

K MAR. 16, 2000

(FRONT)
⋮

(SWING)
⋮

FIG. 28

ACTUAL MAINTENANCE DATABASE PER MACHINE MODEL AND NUMBER

| MODEL A NO. N | NUMBER OF TIMES OF OPERATIONS OF BUCKET PRONG (ACCUMULATIVE VALUE) | | NUMBER OF TIMES OF OPERATIONS OF TRAVEL LINK (ACCUMULATIVE VALUE) | |
|---|---|---|---|---|
| 1 | $S_{FB}(1)$, $[S'_{FB}(1)]$ | ... e.g., 6800 TIMES [6200 TIMES] | $S_{TL}(1)$, $[S'_{TL}(1)]$ | ... e.g., 1610 TIMES [1820 TIMES] |
| ... | | | | |
| L | $S_{FB}(L)$, $[S'_{FB}(L)]$ | ... e.g., 25000 TIMES [21200 TIMES] | | |
| 1 | | | | |
| ... | | | | |
| M | | | $S_{TL}(M)$, $[S'_{TL}(M)]$ | ... e.g., 10200 TIMES [11800 TIMES] |

MODEL A NO. N+1
MODEL A NO. N+2
...

RENEWING DATABASE PER MACHINE MODEL AND NUMBER

| MODEL A | | | |
|---|---|---|---|
| NO. 1 | $D_x(1)$ | ... | e.g., 3200 km |
| ... | ... | | |
| NO. L | $D_x(L)$ | ... | e.g., 3000 km |

MODEL B
MODEL C
...

FIG.43

NUMBER OF MACHINES FOR
WHICH PREDETERMINED
OPERATING TIME IS EXCEEDED

| MODEL TYPE | NUMBER OF MACHINES |
|---|---|
| ○○ | ○○ MACHINES |
| △△ | ×× MACHINES |
| ×× | △× MACHINES | ated in different states, e.g., a front operating device
CONSTRUCTION MACHINE MANAGING METHOD AND SYSTEM, AND ARITHMETIC PROCESSING DEVICE

TECHNICAL FIELD

The present invention relates to a method and system for managing a construction machine, and a processing apparatus. More particularly, the present invention relates to a method and system for managing a construction machine, such as a hydraulic excavator, having a plurality of sections operated in different states, e.g., a front operating device section, a swing section and a track or travel section, as well as to a processing apparatus for use with construction machines.

BACKGROUND ART

In general, makers of construction machines such as hydraulic excavators study trends of economic activities, the past sales quantity of products and other factors per term, and set up a production plan of products (bodies and parts of construction machines) in the next term.

DISCLOSURE OF INVENTION

The reason for studying the past sales quantity of products to set up a production plan of products is in estimating the number of products to be replaced (number of old products changed for new products with repurchases by number=of products newly purchased by users) from the past sales quantity of products.

However, the life of a construction machine such as a hydraulic excavator is affected by how products are operated on the user side. Even when the lapse of time after the date of selling is short, the life of a construction machine is shorter if the user operates the machine for a longer time. Conversely, even when the lapse of time after the date of selling is long, the machine can be still used without problems if the user operates the machine for a shorter time during that period.

Conventionally, it has been impossible to precisely estimate the sales quality of products, because the number of products to be renewed has been estimated from not the actual operating time of each product, but the lapse of time after the date of selling. Therefore, a difficulty has been experienced in an adequately setting up a production plan of products, thus often resulting in overstocked inventories or insufficient supply of products.

Further, the actual operation status (e.g., operating time and the number of times of operations) of each part of a construction machine such as a hydraulic excavator differs depending on to which section of the machine the part belongs.

More specifically, of various parts of a hydraulic excavator, a main pump and a pilot pump are parts operated while an engine is operated. An arm, a bucket and a bucket prong are parts operated during the front operation (excavation). A swing wheel and a swing motor are parts operated during the swing operation. A travel motor, a travel link and a travel roller are parts operated during travel.

The engine is operated upon turning-on of a key switch, whereas a front, a swing body, and a track or travel body are operated upon an operator's manipulation made during the engine operation. Thus, the engine running time, the front operating time, the swing time, and the travel time take different values from one another.

Conventionally, it has also been impossible to precisely estimate the timing of replacement of each part and hence the sales quantity of parts, because the operation status for each section cannot be confirmed. Therefore, a difficulty has also been experienced in adequately setting up a production plan of parts, thus often resulting in overstocked inventories or insufficient supply of products.

A first object of the present invention is to provide a method and system for managing a construction machine, and a processing apparatus, which can realize precise estimation of the sales quantity of construction machines, and setting-up of an adequate production plan of construction machines.

A second object of the present invention is to provide a method and system for managing a construction machine, and a processing apparatus, which can realize precise estimation of the sales quantity of parts of construction machines, and setting-up of an adequate production plan of parts.

(1) To achieve the above first object, according to the present invention, there is provided a method for managing a construction machine, the method comprising a first step of measuring an operation status for each of a plurality of construction machines working in fields, transferring the measured operation status to a base station computer, and then storing and accumulating it as operation data in a database; and a second step of, in the base station computer, statistically processing the operation data, and then producing and outputting estimation data of the number of construction machines to be renewed, the number of renewed construction machines being estimated from the estimation data.

By thus storing and accumulating an operation status for each of construction machines as operation data, producing estimation data of the number of construction machines to be renewed, and then estimating it, the number of renewed construction machines is estimated based on the actual operation status, and accuracy in estimation is improved. As a result, it is possible to precisely estimate the sales quantity of construction machines and to set up an adequate production plan of construction machines.

(2) In above (1), preferably, the second step includes a third step of obtaining, as the estimation data, first correlation between the operation status of construction machines currently operated and the number of operated machines based on the operation data, and the number of renewed construction machines is estimated from the first correlation.

With those features, the estimation data of the number of construction machines to be renewed can be produced.

(3) In above (2), preferably, the second step further includes a fourth step of obtaining, as the estimation data, second correlation between the operation status of construction machines, which have been renewed in the past, and the number of renewed machines based on both renewing data of the past construction machines and the operation data, and the number of renewed construction machines is estimated by comparing the first correlation with the second correlation.

By thus obtaining second correlation between the operation status of construction machines, which have been renewed in the past, and the number of renewed machines, and comparing the second correlation with the first correlation, the number of renewed construction machines is estimated upon reflection of the past actual data, thus resulting in more precise estimation.

(4) In above (1), preferably, the second step includes a fifth step of determining, as the estimation data, the number of those ones among construction machines currently operated, in which the operation status exceeds a preset reference value, based on the operation data, and the number of renewed construction machines is estimated from the determined number of machines.

With those features, the number of renewed construction machines can be precisely estimated based on the current operation data.

(5) In above (4), the reference value is, e.g., an average operation status of construction machines that have been renewed in the past.

With that feature, the number of renewed construction machines can be more precisely estimated upon reflection of past actual data.

(6) In above (5), the second step further includes a sixth step of obtaining correlation between the operation status of construction machines, which have been renewed in the past, and the number of renewed machines based on both renewing data of the past construction machines and the operation data, and the average operation status is represented by a value obtained from the correlation.

With those features, the average operation status of construction machines, which have been renewed in the past, can be obtained as the reference value.

(7) In above (1) to (6), preferably, the operation status is at least one of an operating time and a mileage.

With that feature, the number of renewed construction machines can be estimated using any of the operating time and the mileage.

(8) In above (4), the operation status may be an operating time, and the reference value may be a repurchase judgment time obtained from a crossed point between a trade-in value curve and a repair cost curve.

With those features, the number of renewed construction machines can also be estimated.

Also, the fact that the operating time of a construction machine exceeds the repurchase judgment time means that the timing of recommending a repurchase of the construction machine is reached. Based on such confirmation, the serviceman can start a sales campaign for promotion of the sales.

(9) To achieve the above second object, according to the present invention, there is provided a method for managing a construction machine, the method comprising a first step of measuring an operation status for each section of each of a plurality of construction machines working in fields, transferring the measured operation status to a base station computer, and then storing and accumulating it as operation data in a database; and a second step of, in the base station computer, statistically processing the operation data, and then producing and outputting estimation data of the number of repaired/replaced parts belonging to each section, the number of repaired/replaced parts belonging to each section being estimated from the estimation data.

By thus storing and accumulating an operation status for each section of each of construction machines as operation data, producing estimation data of the number of repaired/replaced parts belonging to each section, and then estimating it, the number of repaired/replaced parts is estimated based on the actual operation status, and accuracy in estimation is improved. As a result, it is possible to precisely estimate the sales quantity of parts and to set up an adequate production plan of parts.

(10) In above (9), the second step includes a third step of obtaining, as the estimation data, first correlation between the operation status for each section of construction machines currently operated and the number of operated machines based on the operation data, and the number of repaired/replaced parts belonging to each section is estimated from the first correlation.

With those features, the estimation data of the number of repaired/replaced parts can be produced.

(11) In above (10), preferably, the second step further includes a fourth step of obtaining, as the estimation data, second correlation between the past operation status for each section, to which parts having been repaired and replaced in the past belong, and the number of repaired/replaced parts based on both repair/replacement data of the past parts and the operation data, and the number of repaired/replaced parts belonging to each section is estimated by comparing the first correlation with the second correlation.

By thus obtaining second correlation between the past operation status and the number of repaired/replaced parts and comparing the second correlation with the first correlation, the number of repaired/replaced parts is estimated upon reflection of the past actual data, thus resulting in more precise estimation.

(12) In above (9), preferably, the first step measures a load for each section in addition to the operation status for each section, and stores and accumulates it as operation data in the database inside the base station computer, and the second step further includes a fifth step of modifying the measured operation status depending on an amount of the measured load, and produces the estimation data by using, as the operation data, the operation status having been modified depending on load.

In a construction machine, not only the operation status but also the load differ from one to another section, and the life (replacement time interval) of each part varies depending on the amount of load of each section as well. In other words, even for parts belonging to the same section of different construction machines, the part belonging to the section, which is operated under a high load at higher frequency, has a shorter life, and the part belonging to the section, which is operated under a low load at higher frequency, has a longer life. Thus, more precise estimation can be realized by modifying the measured operation status of each section depending on load, producing the estimation data by using the modified operation status as the operation data, and then estimating the number of repaired/replaced parts.

(13) In above (9) to (12), preferably, the operation status is at least one of an operating time and the number of operations per section.

With that feature, the number of repaired/replaced parts can be estimated using any of the operating time and the mileage.

(14) In above (9) to (12), preferably, the construction machine is a hydraulic excavator (1), and the section is any of a front, a swing body, a travel body, an engine, and a hydraulic pump of a hydraulic excavator.

With those features, the number of repaired/replaced parts can be estimated for parts belonging to front, a swing body, a travel body, an engine, and a hydraulic pump of a hydraulic excavator, and a production plan of those parts can be adequately set up.

(15) Further, to achieve the above first object, according to the present invention, there is provided a system for managing a construction machine, the system comprising operation-data measuring/collecting means for measuring and collecting an operation status for each of a plurality of construction machines working in fields; and a base station computer mounted in a base station and having a database in which the operation status measured and collected for each construction machine is stored and accumulated as operation data, the base station computer including computing means for statistically processing the operation data, and then producing and outputting estimation data of the number of construction machines to be renewed, the number of renewed construction machines being estimated from the estimation data.

(16) In above (15), preferably, the computing means includes first means for obtaining, as the estimation data, first correlation between the operation status of construction machines currently operated and the number of operated machines based on the operation data, and the number of renewed construction machines is estimated from the first correlation.

(17) In above (16), preferably, the computing means further includes second means for obtaining, as the estimation data, second correlation between the operation status of construction machines, which have been renewed in the past, and the number of renewed machines based on both renewing data of the past construction machines and the operation data, and the number of renewed construction machines is estimated by comparing the first correlation with the second correlation.

(18) In above (15), preferably, the computing means includes a third step for determining, as the estimation data, the number of those ones among construction machines currently operated, in which the operation status exceeds a preset reference value, based on the operation data, and the number of renewed construction machines is estimated from the determined number of machines.

(19) In above (18), the reference value is, e.g., an average operation status of construction machines that have been renewed in the past.

(20) In above (19), preferably, the computing means further includes fourth means for obtaining correlation between the operation status of construction machines, which have been renewed in the past, and the number of renewed machines based on both renewing data of the past construction machines and the operation data, and the average operation status is represented by a value obtained from the correlation.

(21) In above (15) to (20), preferably, the operation status is at least one of an operating time and a mileage.

(22) In above (18), the operation status may be an operating time, and the reference value may be a repurchase judgment time obtained from a crossed point between a trade-in value curve and a repair cost curve.

(23) Also, to achieve the above second object, according to the present invention, there is provided a system for managing a construction machine, the system comprising operation-data measuring/collecting means for measuring and collecting an operation status for each section of each of a plurality of construction machines working in fields; and a base station computer mounted in a base station and having a database in which the operation status measured and collected for each section is stored and accumulated as operation data, the base station computer including computing means for statistically processing the operation data, and then producing and outputting estimation data of the number of repaired/replaced parts belonging to each section, the number of repaired/replaced parts belonging to each section being estimated from the estimation data.

(24) In above (23). preferably, the computing means includes first means for obtaining, as the estimation data, first correlation between the operation status for each section of construction machines currently operated and the number of operated machines based on the operation data, and the number of repaired/replaced parts belonging to each section is estimated from the first correlation.

(25) In above (23), preferably, the computing means further includes second means for obtaining, as the estimation data, second correlation between the past operation status for each section, to which parts having been repaired and replaced in the past belong, and the number of repaired/replaced parts based on both repair/replacement data of the past parts and the operation data, and the number of repaired/replaced parts belonging to each section is estimated by comparing the first correlation with the second correlation.

(26) In above (23), preferably, the data measuring/collecting means measures a load for each section in addition to the operation status for each section, the base station computer stores and accumulates the operation status and the load, which have been measured and collected per section, as operation data in the database, and the computing means includes third means for modifying the measured operation status depending on an amount of the measured load, and produces the estimation data by using, as the operation data, the operation status having been modified depending on load.

(27) In above (23) to (26), preferably, the operation status is at least one of an operating time and the number of operations.

(28) In above (23) to (26), preferably, the construction machine is a hydraulic excavator, and the section is any of a front, a swing body, a travel body, an engine, and a hydraulic pump of a hydraulic excavator.

(29) Still further, to achieve the above first object, according to the present invention, there is provided a processing apparatus wherein an operation status for each of a plurality of construction machines working in fields is stored and accumulated as operation data, and the operation data is statistically processed to produce and output estimation data of the number of construction machines to be renewed.

(30) Still further, to achieve the above second object, according to the present invention, there is provided a processing apparatus wherein an operation status for each section of each of a plurality of construction machines working in fields is stored and accumulated as operation data, and the operation data is statistically processed to produce and output estimation data of the number of repaired/replaced parts belonging to each section.

BRIEF DESCRIPTION OF THE DRAWINGS

FIG. 10 shows how operation data, actual maintenance data, and renewing operating time data are stored as a database in the base station center server.

FIG. 21 is a table showing one example of a daily report transmitted to an in-house computer and a user side computer.

FIG. 25 shows how the operation data is stored as a database in the base station center server.

FIG. 28 shows how actual maintenance data and renewing operating time data are stored as a database in the base station center server.

FIG. 43 shows one example of repurchase information transmitted to the in-house computer 4.

BEST MODE FOR CARRYING OUT THE INVENTION

Embodiments of the present invention will be described below with reference to the drawings.

Figure 1:
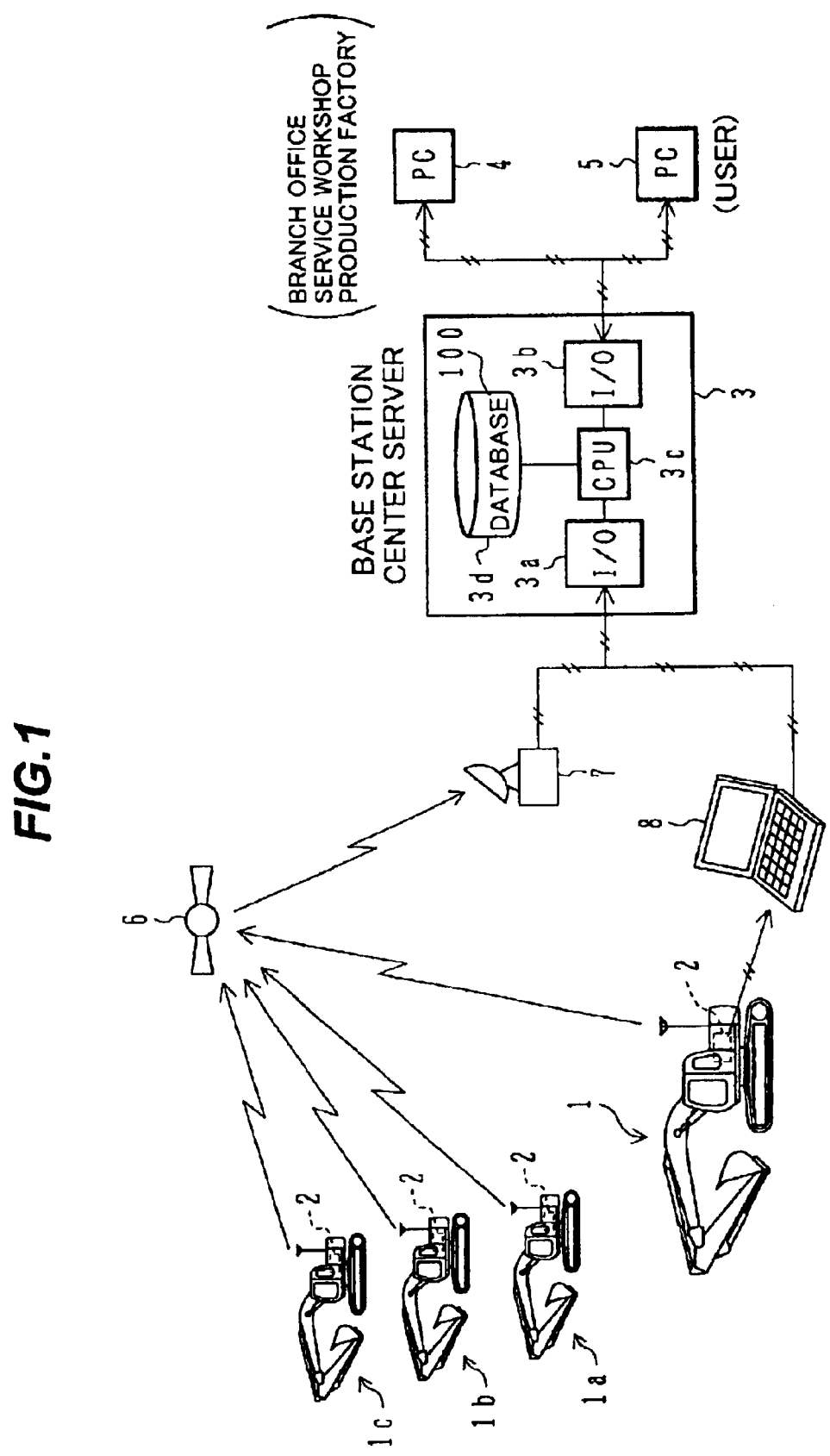
FIG. 1 shows an overall outline of a management system including a system for estimating sales of construction machines according to a first embodiment of the present invention.

FIG. 1 shows an overall outline of a construction machine management system including a system for estimating sales of construction machines according to a first embodiment of the present invention. The management system comprises machine side controllers 2 mounted on hydraulic excavators 1, 1a, 1b, 1c, . . . (hereinafter represented by numeral 1) working in fields; a base station center server 3 installed in a main office, a branch office, a production factory or the like; an in-house computer 4 installed in the branch office, a service workshop, the production factory or the like; and a user side computer 5. The base station center server 3 may be installed, in addition to the above-mentioned places, in any other desired place, for example, in a rental company possessing plural units of hydraulic excavators.

The controller 2 in each hydraulic excavator 1 collects operation information of the hydraulic excavator 1. The collected operation information is sent along with machine body information (machine model and number) to a ground station 7 through satellite communication using a communication satellite 6, and then transmitted from the ground station 7 to the base station center server 3. The machine body/operation information may be taken into the base station center server 3 through a personal computer 8 instead of satellite communication. In such a case, a serviceman downloads the operation information collected by the controller 2 into the personal computer 8 along with the machine body information (machine model and number). The downloaded information is taken into the base station center server 3 from the personal computer 8 using a floppy disk or via a communication line such as a public telephone line or the Internet. When using the personal computer 8, in addition to the machine body/operation information of the hydraulic excavator 1, check information obtained by the routine inspection and repair information can also be collected through manual inputting by the serviceman. Such manually inputted information is similarly taken into the base station center server 3.

Figure 2:
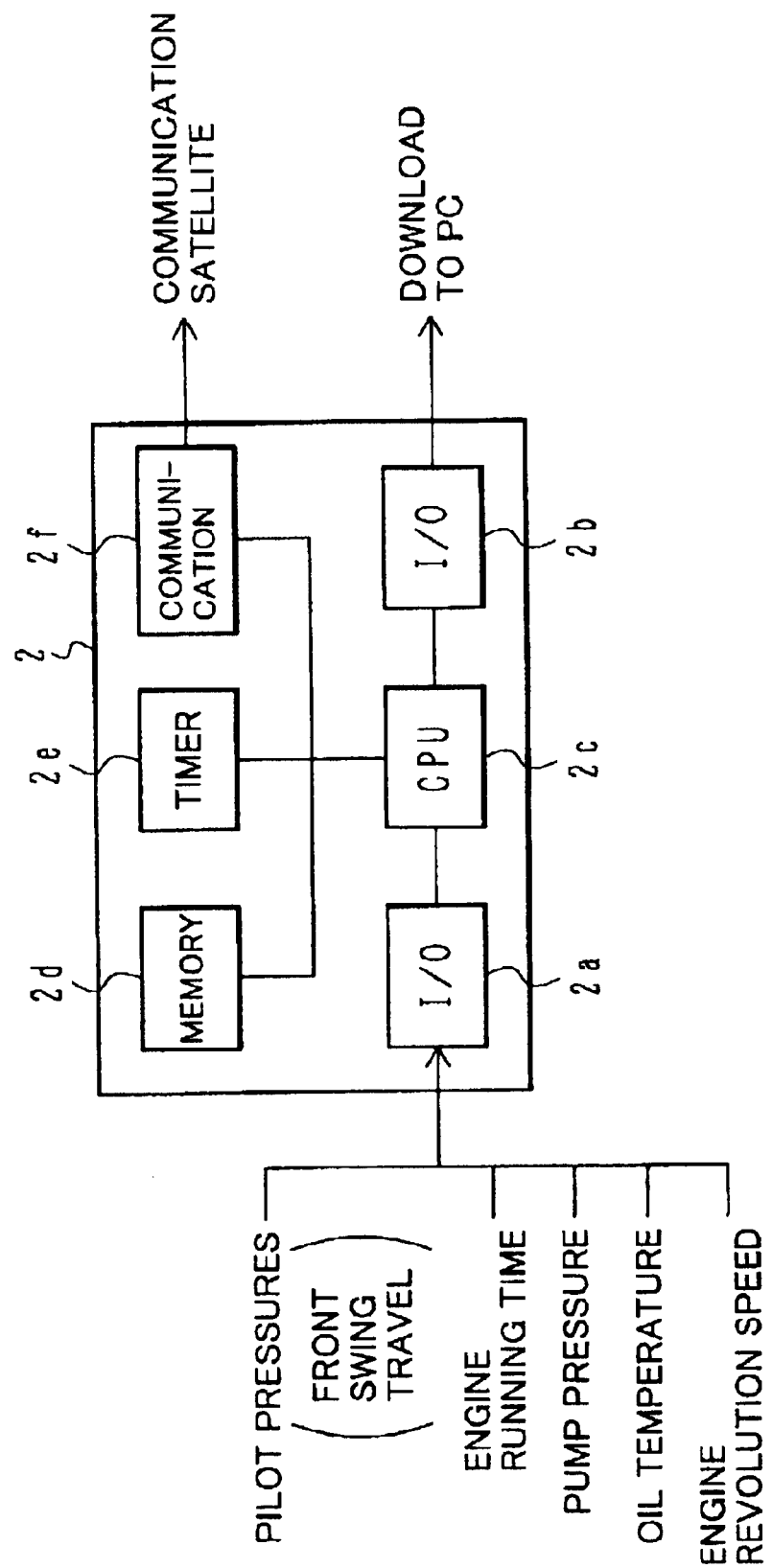
FIG. 2 shows details of the configuration of a machine side controller.

FIG. 2 shows details of the configuration of the machine side controller 2. In FIG. 2, the controller 2 comprises input/output interfaces 2a, 2b, a CPU (Central Processing Unit) 2c, a memory 2d, a timer 2e, and a communication control unit 2f.

The controller 2 receives, from a sensor group (described later) through the input/output interface 2a, detection signals of pilot pressures associated with the front, swing and track or travel; a detection signal of the operating time of an engine 32 (see FIG. 3) (hereinafter referred to as the "engine running time"); a detection signal of pump pressure in a hydraulic system; a detection signal of oil temperature in the hydraulic system; and a detection signal of the engine revolution speed. The CPU 2c processes those data of the received information into operation information in the predetermined form by using a timer (including the clocking function) 2e, and then stores the operation information in the memory 2d. The communication control unit 2f routinely transmits the operation information to the base station center server 3 through satellite communication. Also, the operation information is downloaded into the personal computer 8 through the input/-output interfaces 2b.

Additionally, the machine side controller 2 includes a ROM for storing control programs, with which the CPU 2c executes the above-described processing, and a RAM for temporarily storing data during the processing.

Figure 3:
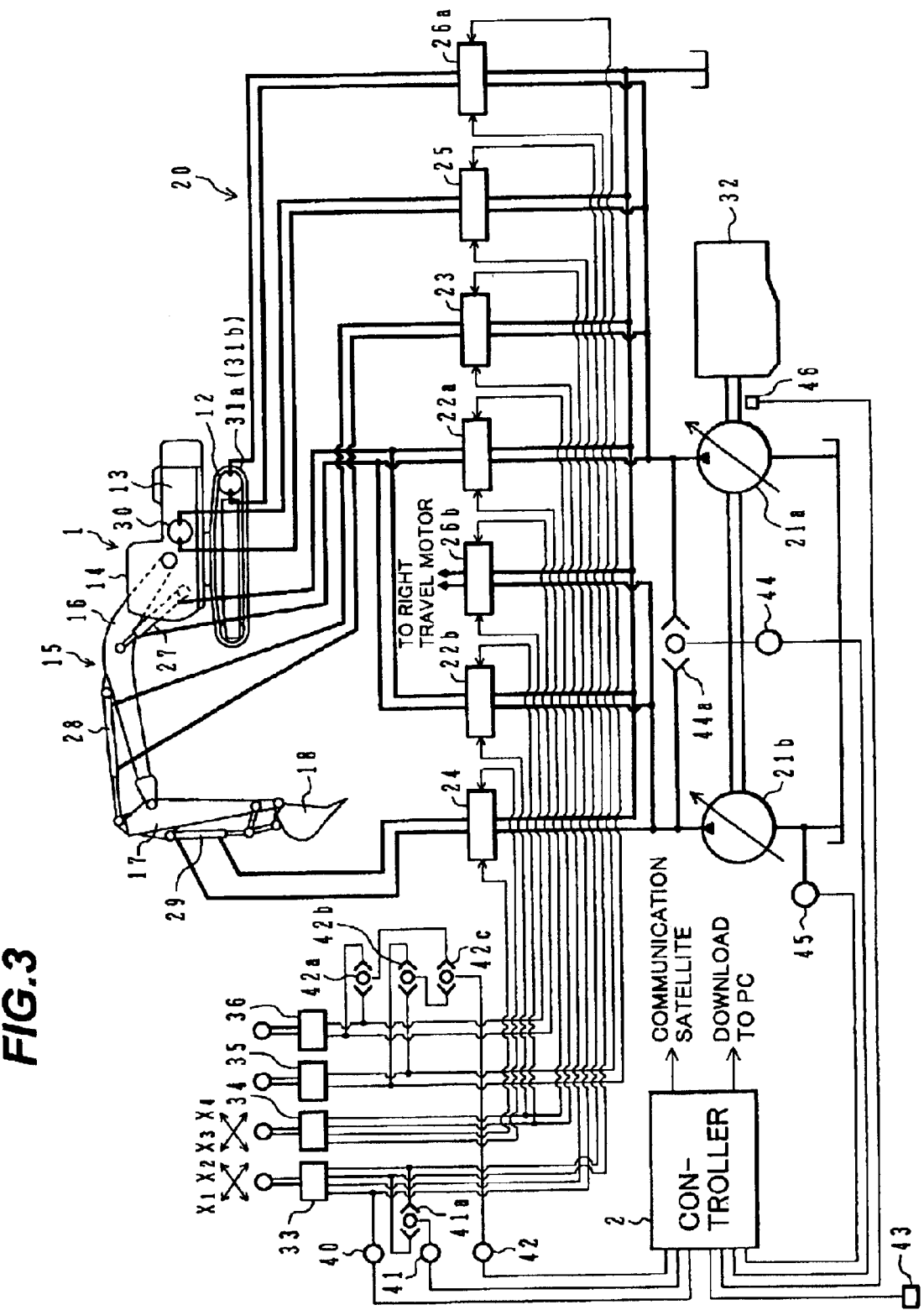
FIG. 3 shows details of a hydraulic excavator and a sensor group.

FIG. 3 shows details of the hydraulic excavator 1 and the sensor group. In FIG. 3, the hydraulic excavator 1 comprises a travel body 12; a swing body 13 rotatably mounted on the travel body 12; a cab 14 provided in a front left portion of the swing body 13; and a front operating device (excavation device), i.e., a front 15, mounted to a front central portion of the swing body 13 in a vertically rotatable manner. The front 15 is made up of a boom 16 rotatably provided on the swing body 13; an arm 17 rotatably provided at a fore end of the boom 16; and a bucket 18 rotatably provided at a fore end of the arm 17.

Also, a hydraulic system 20 is mounted on the hydraulic excavator 1. The hydraulic system 20 comprises hydraulic pumps 21a, 21b; boom control valves 22a, 22b, an arm control valve 23, a bucket control valve 24, a swing control valve 25, and track or travel control valves 26a, 26b; and a boom cylinder 27, an arm cylinder 28, a bucket cylinder 29, a swing motor 30, and travel motors 31a, 31b. The hydraulic pumps 21a, 21b are driven for rotation by a diesel engine (hereinafter referred to simply as an "engine") 32 to deliver a hydraulic fluid (oil). The control valves 22a, 22b to 26a, 26b control flows (flow rates and flow directions) of the hydraulic fluid supplied from the hydraulic pumps 21a, 21b to the actuators 27 to 31a and 31b. The actuators 27 to 31a and 31b drive the boom 16, the arm 17, the bucket 18, the swing body 13, and the travel body 12. The hydraulic pumps 12a, 21b, the control valves 22a, 22b to 26a, 26b, and the engine 32 are installed in an accommodation room formed in a rear portion of the swing body 13.

Control lever devices 33, 34, 35 and 36 are provided in association with the control valves 22a, 22b to 26a, 26b. When a control lever of the control lever device 33 is operated in one direction X1 of two crossing directions (+), an arm-crowding pilot pressure or an arm-dumping pilot pressure is generated and applied to the arm control valve 23. When the control lever of the control lever device 33 is operated in the other direction X2 of the two crossing directions (+), a rightward-swing pilot pressure or a leftward-swing pilot pressure is generated and applied to the swing control valve 25. When a control lever of the control lever device 34 is operated in one direction X3 of two crossing directions (+), a boom-raising pilot pressure or a boom-lowering pilot pressure is generated and applied to the boom control valves 22a, 22b. When the control lever of the control lever device 34 is operated in the other direction X4 of the two crossing directions (+), a bucket-crowding pilot pressure or a bucket-dumping pilot pressure is generated and applied to the bucket control valve 24. Further, when control levers of the control lever devices 35, 36 are operated, a left-travel pilot pressure and a right-travel pilot pressure are generated and applied to the travel control valves 26a, 26b, respectively.

The control lever devices 33 to 36 are disposed in the cab 14 together with the controller 2.

Sensors 40 to 46 are provided in the hydraulic system 20 having the above-described construction. The sensor 40 is a pressure sensor for detecting the arm-crowding pilot pressure as an operation signal for the front 15. The sensor 41 is a pressure sensor for detecting the swing pilot pressure taken out through a shuttle valve 41a, and the sensor 42 is a pressure sensor for detecting the travel pilot pressure taken out through shuttle valves 42a, 42b and 42c. Also, the sensor 43 is a sensor for detecting the on/off state of a key switch of the engine 32, the sensor 44 is a pressure sensor for detecting a delivery pressure of the hydraulic pumps 21a, 21b, i.e., a pump pressure, taken out through a shuttle valve 44a, and the sensor 45 is an oil temperature sensor for detecting a temperature of working oil (oil temperature) in the hydraulic system 1. Further, the revolution speed of the engine 32 is detected by a revolution speed sensor 46. Signals from those sensors 40 to 46 are sent to the controller 2.

Returning to FIG. 1, the base station center server 3 comprises input/output interfaces 3a, 3b, a CPU 3c, and a storage device 3d in which a database 100 is formed. The input/output interface 3a receives the machine body/-operation information and the check information from the machine side controller 2, and the input/output interface 3b receives part replacement information from the in-house computer 4. The CPU 3c stores and accumulates those data of the received information in the storage device 3d in the form of the database 100. Also, the CPU 3c processes the information stored in the database 100 to make a daily report, a maintenance report, a diagnostic report, etc., and then transmits those reports to the in-house computer 4 and the user side computer 5 via the input/output interface 3b.

Additionally, the base station center server 3 includes a ROM for storing control programs, with which the CPU 3c executes the above-described processing, and a RAM for temporarily storing data during the processing.

Figure 4:
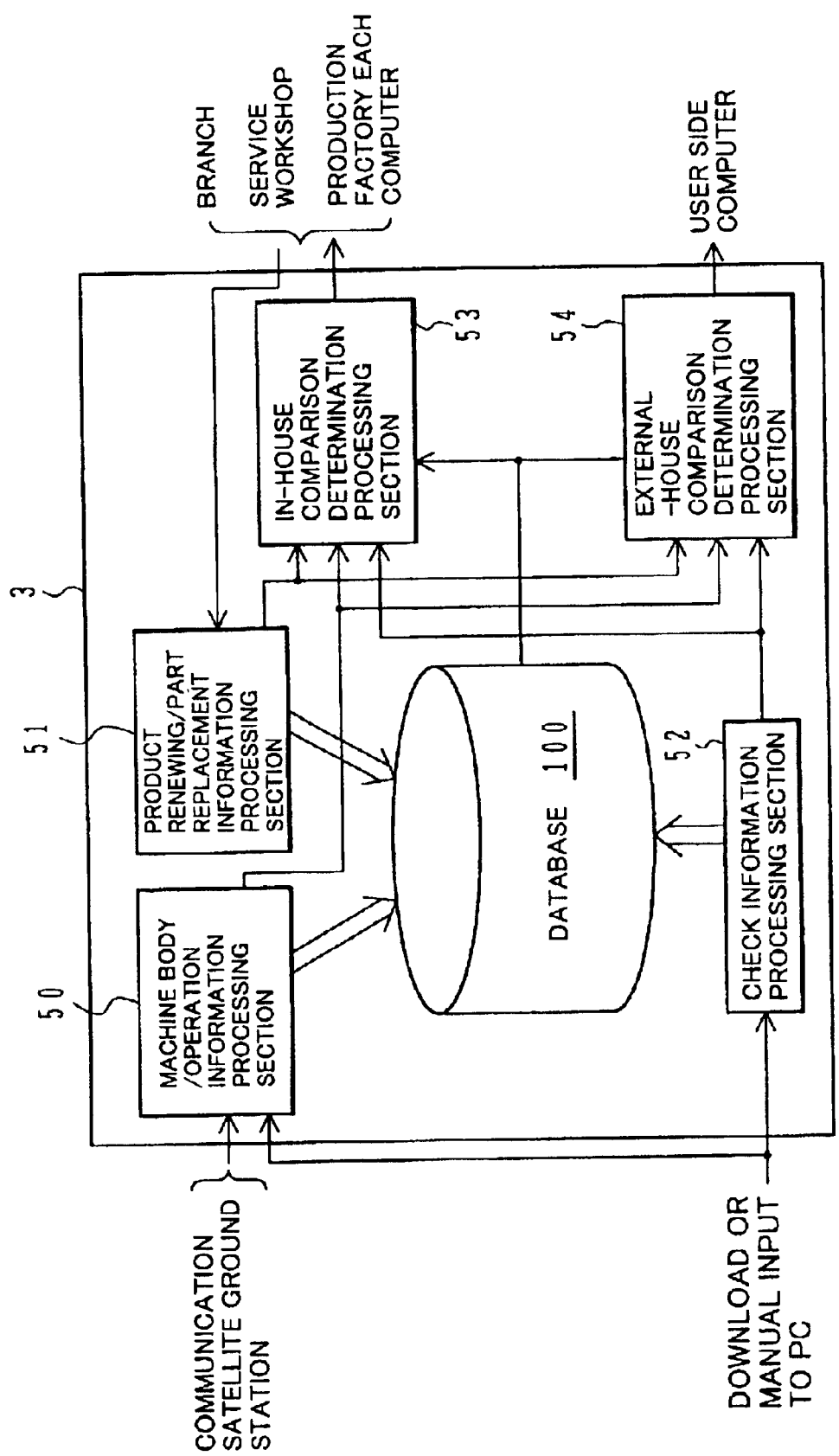
FIG. 4 is a functional block diagram showing an outline of processing functions of a CPU in a base station center server.

FIG. 4 is a functional block diagram showing an outline of processing functions of the CPU 3c. The CPU 3c has various processing functions executed by a machine body/-operation information processing section 50, a product renewing/part replacement information processing section 51, a check information processing section 52, an in-house comparison determination processing section 53, and an external-house comparison determination processing section 54. The machine body/operation information processing section 50 executes predetermined processing by using the operation information inputted from the machine side controller 2. The product renewing/part replacement information processing section 51 executes predetermined processing by using product renewing/part replacement information inputted from the in-house computer 4 (described later). The check information processing section 52 stores and accumulates the check information, inputted from the personal computer 8, in the database 100, and also processes the check information to make a diagnostic report. The inhouse comparison determination processing section 53 and the external-house comparison determination processing section 54 select required data among from not only the information prepared by the machine body/operation information processing section 50, the product renewing/part replacement information processing section 51 and the check information processing section 52, but also the information stored and accumulated in the database 100, and transmit the selected data to the in-house computer 4 and the user side computer 5.

The processing functions of the machine side controller 2 and the processing functions of the machine body/operation information processing section 50 and the product renewing/-part replacement information processing section 51 in the base station center server 3 will be described below with reference to flowcharts.

The processing functions of the machine side controller 2 include the function of collecting an operating or working time for each section of the hydraulic excavator. Correspondingly, the machine body/operation information processing section 50 of the base station center server 3 has the function of processing the operating time. Also, the product renewing/-part replacement information processing section 51 has the function of processing the product renewing information and the function of processing the part replacement information.

A description is first made of the function of collecting the operating time for each section of the hydraulic excavator, which is executed in the machine side controller 2.

Figure 5:
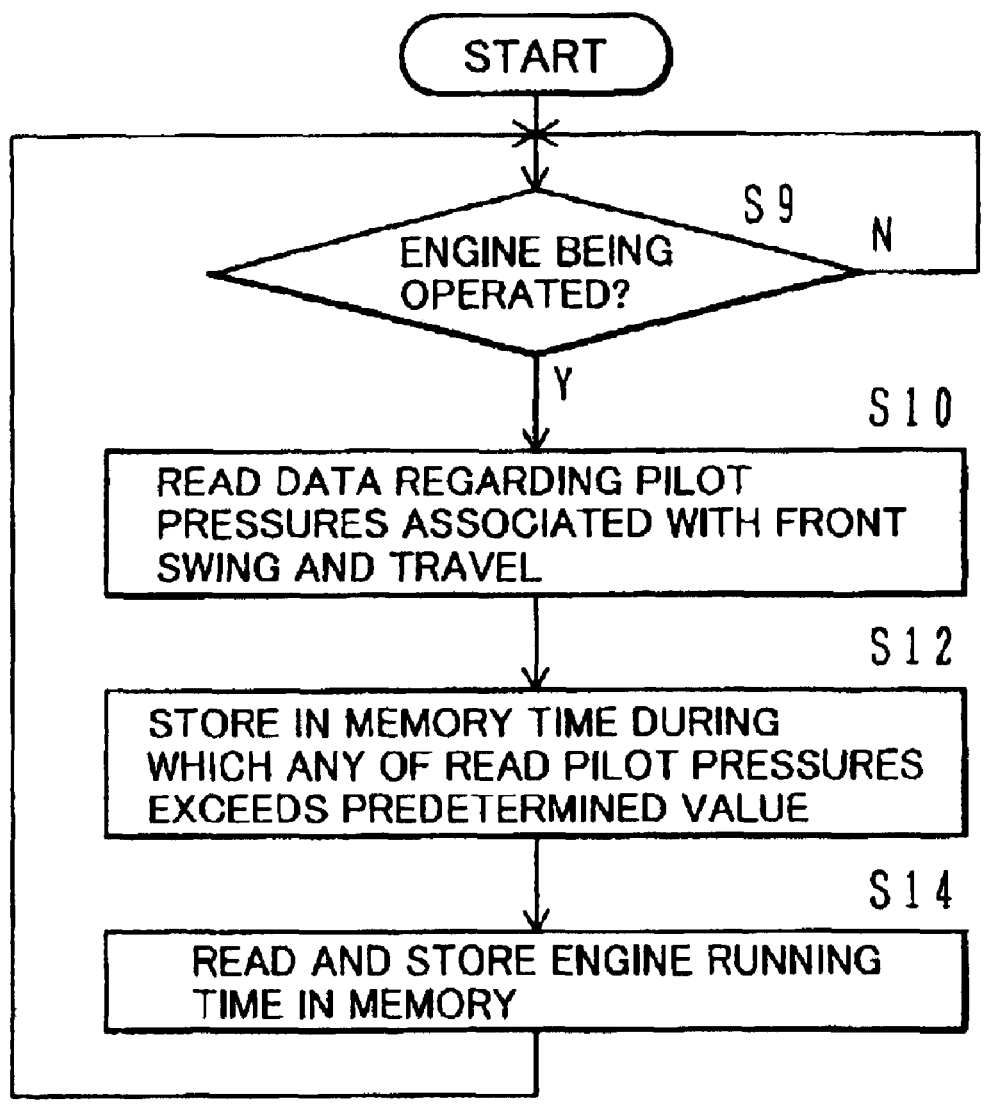
FIG. 5 is a flowchart showing the function of collecting an operating time for each section of the hydraulic excavator executed in a CPU of the machine side controller.
Figure 6:
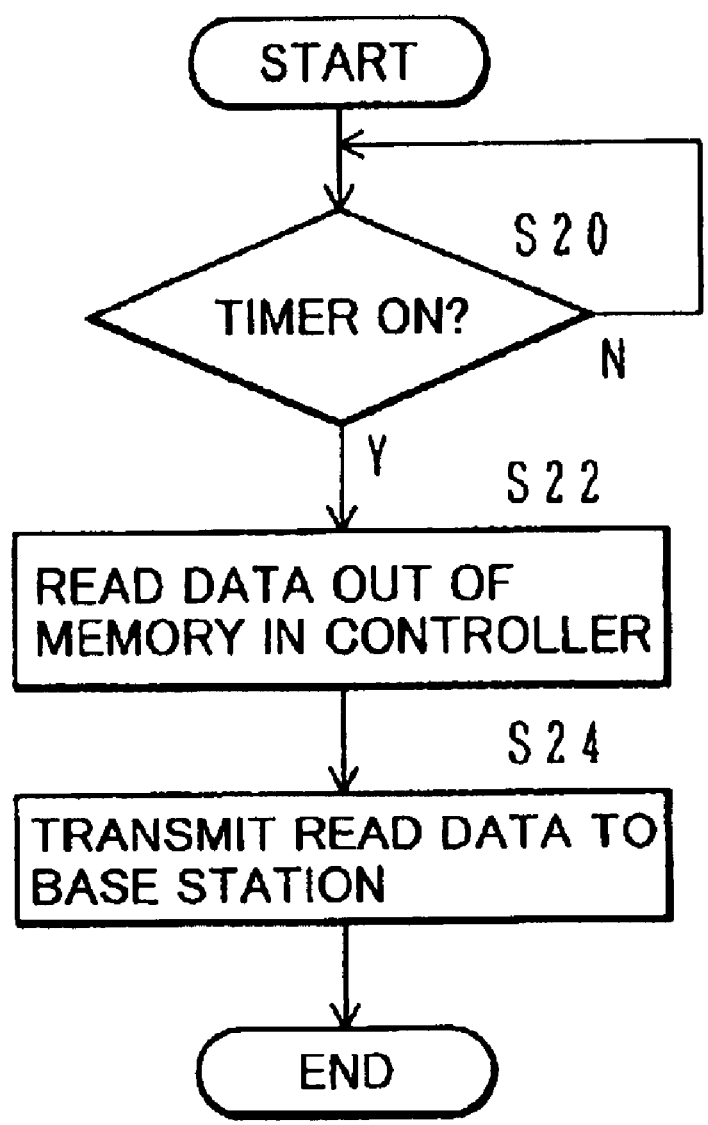
FIG. 6 is a flowchart showing the processing function of a communication control unit in the machine side controller executed when the collected operating time data is transmitted.

FIG. 5 is a flowchart showing the function of collecting the operating time for each section of the hydraulic excavator executed in the CPU 2c of the controller 2, and FIG. 6 is a flowchart showing the processing function of the communication control unit 2f in the controller 2 executed when the collected operating time data for each section is transmitted.

In FIG. 5, the CPU 2c first determines whether the engine revolution speed signal from the sensor 46 is of a value not lower than a predetermined revolution speed, and hence whether the engine is being operated (step S9). If it is determined that the engine is not being operated, step S9 is repeated. If it is determined that the engine is being operated, the CPU 2c proceeds to next step S10 and reads data regarding the pilot pressure detection signals associated with the front, swing and travel from the sensors 40, 41 and 42 (step S10). Then, for each of the read pilot pressures associated with the front, swing and travel, the CPU 2c calculates, using time information from the timer 2e, a time during which the pilot pressure exceeds a predetermined pressure, and stores and accumulates the calculated result in the memory 2d in correspondence to the date and the time of day (step S12). Herein, the predetermined pressure represents a pilot pressure that can be regarded as indicating that each of the front, swing and travel operations has been performed. Also, while it is determined in step S9 that the engine is being operated, the CPU 2c calculates an engine running time using time information from the timer 2e, and stores and accumulates the calculated result in the memory 2d in correspondence to the date and the time of day (step S14). The CPU 2 executes the above-described processing at a predetermined cycle during a period of time in which power supplied to the controller 2 is turned on.

The operating time calculated in each of steps S12, S14 may be added to the corresponding time calculated in the past and stored in the memory 2d, and may be stored as an accumulative operating time.

In FIG. 6, the communication control unit 2f monitors whether the timer 2e is turned on (step S20). When the timer 2e is turned on, the CPU reads the operating time for each section of the front, swing and travel, the engine running time (including the date and the time of day), and the machine body information, which are stored and accumulated in the memory 2d (step S22), and then transmits the read data to the base station center server 3 (step S24). The timer 2e is set to turn on at the fixed time of day, for example, at a.m. 0. By so setting the timer, when it becomes a.m. 0, the operating time data for one preceding day is transmitted to the base station center server 3.

The CPU 2c and the communication control unit 2f repeat the above-described processing everyday. The data stored in the CPU 2c is erased when a predetermined number of days, e.g., 365 days (one year), have lased after the transmission to the base station center server 3.

Figure 7:
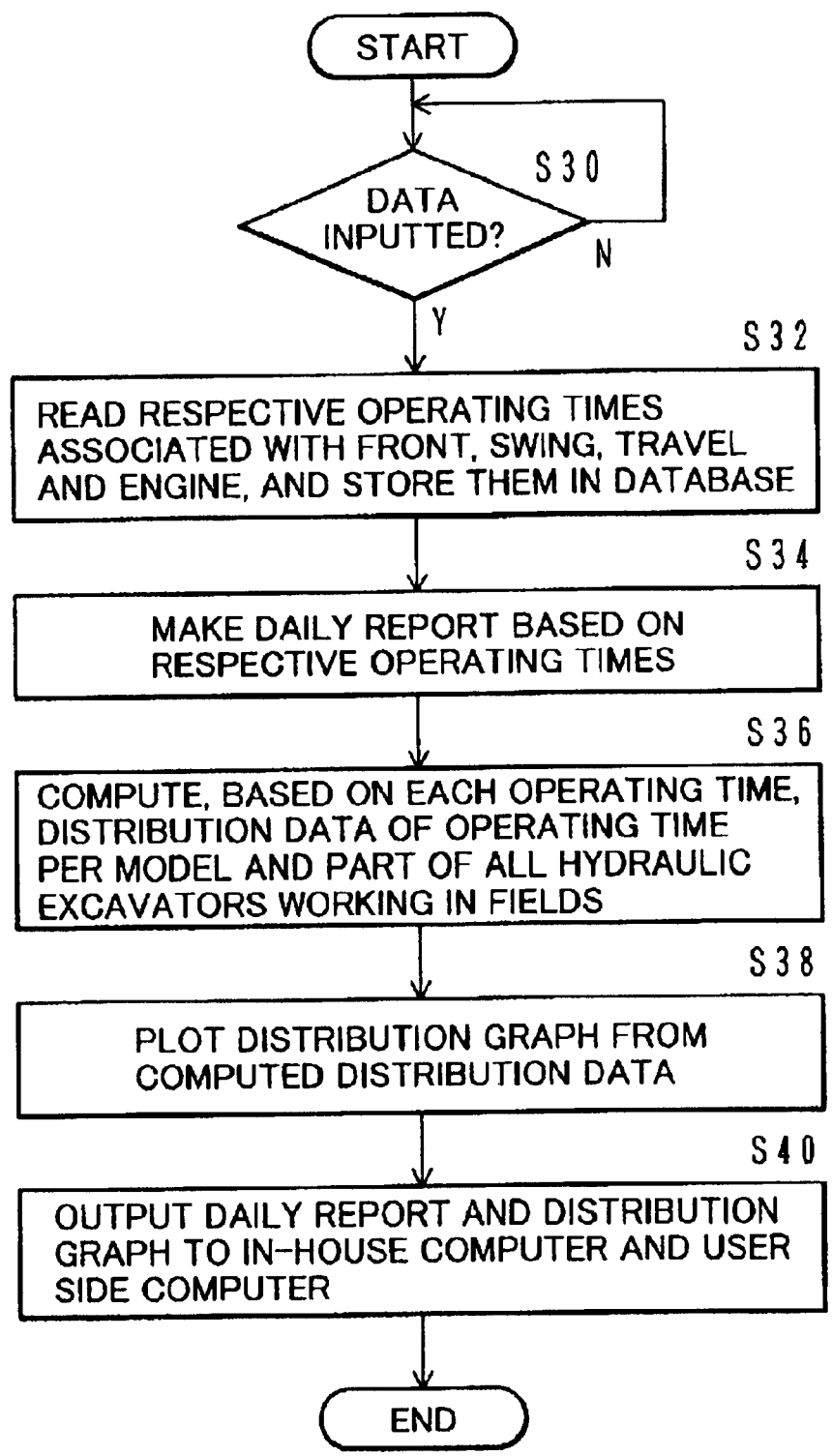
FIG. 7 is a flowchart showing the processing function of a machine body/operation information processing section in the base station center server executed when the operating time data is transmitted from the machine side controller.

FIG. 7 is a flowchart showing the processing function of the machine body/operation information processing section

50 in the center server 3 executed when the machine body/-operation information is transmitted from the machine side controller 2.

In FIG. 7, the machine body/operation information processing section 50 monitors whether the machine body/-operation information is inputted from the machine side controller 2 (step S30). When the machine body/operation information is inputted, the processing section 50 reads the inputted information, and then stores and accumulates it as operation data (described later) in the database 100 (step S32). The machine body information contains, as described above, the machine model and number. Subsequently, the processing section 50 reads the operation data for a predetermined number of days, e.g., one month, out of the database 100 and makes a daily report regarding the operating time (step S34). Also, the processing section 50 reads, out of the database 100, the operation data of all hydraulic excavators currently operating in fields, and then computes distribution data of the number of operated machines with respect to the operating time per model and part of the hydraulic excavator (step S36). Further, it prepares a distribution graph of the number of operated machines based on the computed distribution data (step S38) (described later). Thereafter, the daily report and the distribution graph thus prepared are transmitted to the inhouse computer 4, and the daily report is also transmitted to the user side computer 5 (step S40).

Figure 8:
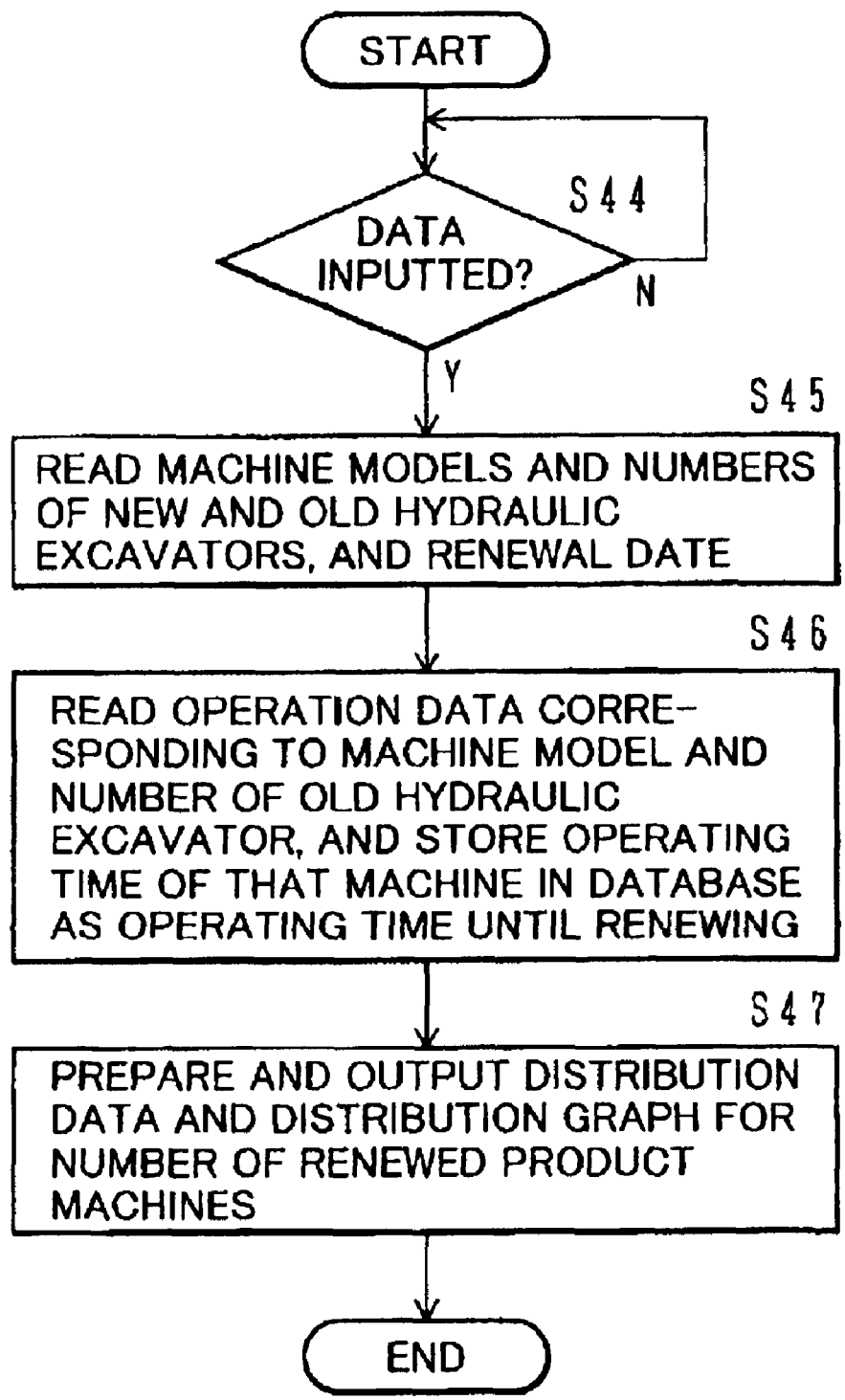
FIG. 8 is a flowchart showing the function of processing product renewing information, which is executed in a product renewing/part replacement information processing section of the base station center server.

FIG. 8 is a flowchart showing the function of processing the product renewing information, which is executed in the product renewing/part replacement information processing section 51 of the center server 3.

In FIG. 8, the product renewing/part replacement information processing section 51 monitors whether the product renewing information is inputted from the in-house computer 4 by, e.g., the serviceman (step S44). When the product renewing information is inputted, the processing section 51 reads the inputted information (step S45). Herein, the product renewing information contains the machine model and number of an old hydraulic excavator changed for a new hydraulic excavator upon repurchase, the machine model and number of the new hydraulic excavator, and the renewal date.

Then, the processing section 51 accesses the database 100, reads the operation data corresponding to the machine number of the old hydraulic excavator, and stores the latest engine running time in the database 100 as an operating time until renewing of the hydraulic excavator (hereinafter referred to also as a "renewing operating time"(step S46).

Subsequently, the processing section 51 reads the latest renewing operating time, computes distribution data of the number of operated machines with respect to the operating time, and prepares a distribution graph of the number of renewed machines based on the computed distribution data (step S47) (described later).

Figure 9:
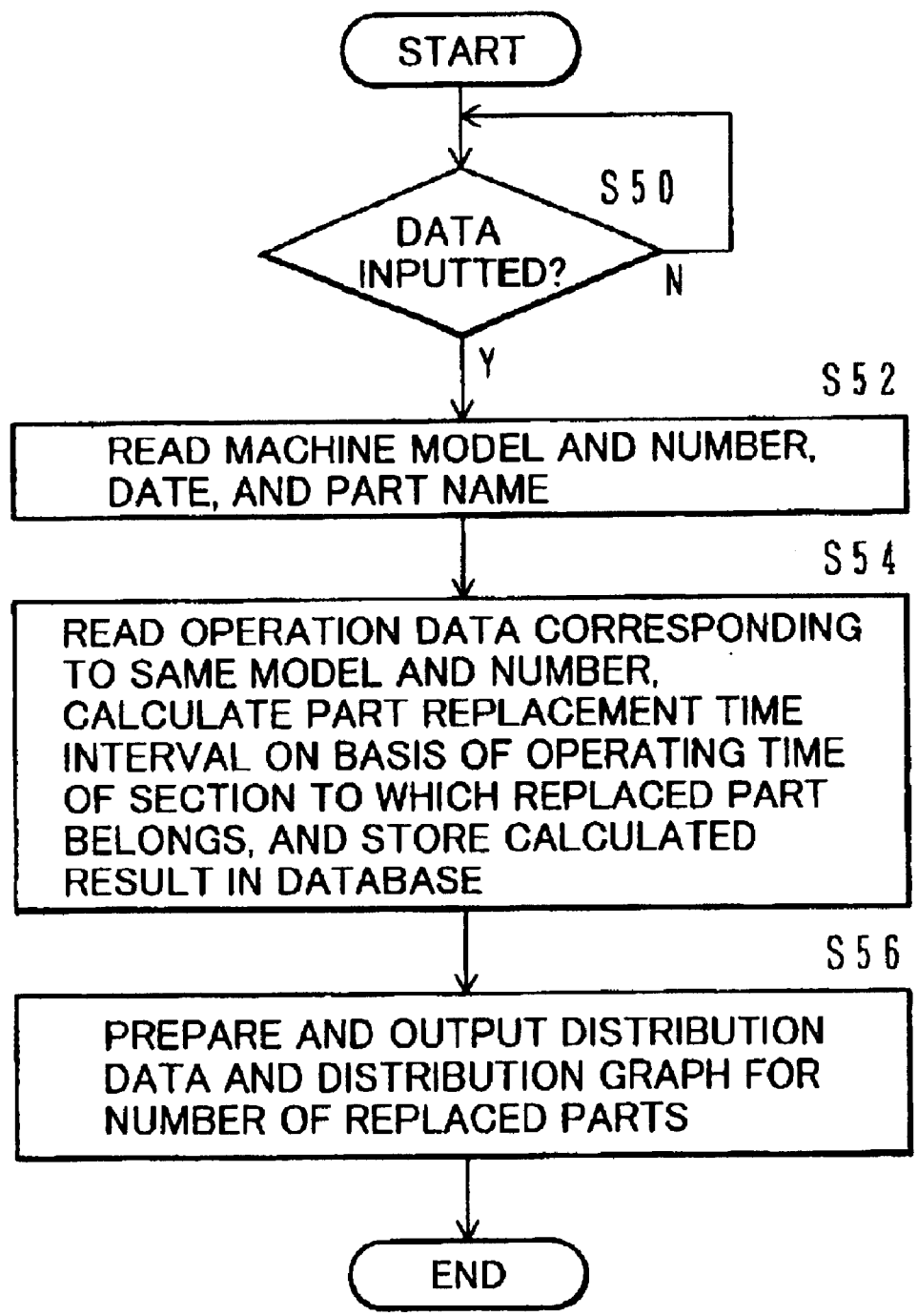
FIG. 9 is a flowchart showing the function of processing part replacement information, which is executed in the product renewing/part replacement information processing section of the base station center server.

FIG. 9 is a flowchart showing the function of processing the part replacement information, which is executed in the product renewing/part replacement information processing section 51 of the center server 3.

In FIG. 9, the product renewing/part replacement information processing section 51 monitors whether the part replacement information is inputted from the in-house computer 4 by, e.g., the serviceman (step S50). When the part replacement information is inputted, the processing section 51 reads the inputted information (step S52). Herein, the part replacement information contains the machine model and number of a hydraulic excavator whose part has been replaced, the replacement data, and the name of the replaced part.

Then, the processing section 51 accesses the database 100, reads the operation data corresponding to the same machine model and number, and calculates a part replacement time interval on the basis of the operating time of the section to which the replaced part belongs, followed by storing and accumulating the calculated result in the database 100 as actual maintenance data (step S54). Herein, the part replacement time interval means a time interval from the time at which one part was assembled in the machine body, to the time at which it was replaced by a new one because of a failure or expiration of the life. As mentioned above, the part replacement time interval is calculated on the basis of the operating time of the section to which the replaced part belongs. Taking the bucket prong as an example, the section to which the bucket prong belongs is the front. Then, if the front operating time (excavation time) measured during a period from assembly of one bucket prong in the machine body to replacement thereof because of breakage is 1500 hours, the part replacement time interval is calculated as 1500 hours.

Subsequently, the processing section 51 reads the latest actual maintenance data, computes distribution data of the number of replaced parts with respect to the operating time, and prepares a distribution graph of the number of replaced parts based on the computed distribution data (step S56) (described later).

FIG. 10 shows how the operation data, the actual maintenance data, and the renewing operating time data are stored in the database 100.

In FIG. 10, the database 100 contains various sections, i.e., a database section (hereinafter referred to as an "operation database") in which the operation data per machine model and number is stored and accumulated, a database section (hereinafter referred to as an "actual maintenance database") in which the actual maintenance data per machine model and number is stored and accumulated, and a database section (hereinafter referred to as an "renewing database") in which the renewing operating data per machine model and number is stored and accumulated. Those databases store data as given below.

In the operation database per machine model and number, the engine running time, the front operating time (hereinafter referred to also as the "excavation time"), the swing time, and the travel time are stored per machine model and number as accumulative values in correspondence to the date. In an illustrated example, $T_{NE}(1)$ and $T_D(1)$ represent respective accumulative values of the engine running time and the front operating time for a No. N machine of model A as of Jan. 1, 2000. $T_{NE}(K)$ and $T_D(K)$ represent respective accumulative values of the engine running time and the front operating time for the No. N machine of model A as of Mar. 16, 2000. Similarly, accumulative values $T_S(1)$ to $T_S(K)$ of the swing time and accumulative values $T_T(1)$ to $T_T(K)$ of the travel time for the No. N machine of model A are stored in correspondence to the date. Similar data is also stored for a No. N+1 machine, a No. N+2 machine, ... of model A and for all machines of other models B, C, ....

In the actual maintenance database per machine model and number, the replacement time intervals of parts, which have been replaced in the past, are stored per machine model and number as accumulative values on the basis of the operating time of the section to which each part belongs. In an illustrated example, $T_{FB}(1)$ and $T_{FB}(L)$ represent respective accumulative values of the replacement time interval of the first and L-th bucket prongs of the No. N machine of model A (e.g., 3400 hr and 12500 hr on the basis of the front operating time). $T_{TL}(1)$ and $T_{TL}(M)$ represent respective accumulative values of the replacement time interval of the first and M-th travel links of the No. N machine (e.g., 5100 hr and 14900 hr on the basis of the travel time). Similar data is also stored for a No. N+1 machine, a No. N+2 machine, . . . of model A and for all machines of other models B, C, . . . .

In the renewing database per machine model and number, the operating time of each of old hydraulic excavators, which have been renewed in the past, is stored per machine model and number as an accumulative value on the basis of the engine running time. In an illustrated example, $T_X(1)$ represents the operating time interval until change of a No. 1 machine of model A (e.g., 32000 hr on the basis of the engine running time). $T_X(L)$ represents the operating time interval until change of a No. L machine of model A (e.g., 30000 hr on the basis of the engine running time). Similar data is also stored for all machines of other models B, C, . . .

Figure 11:
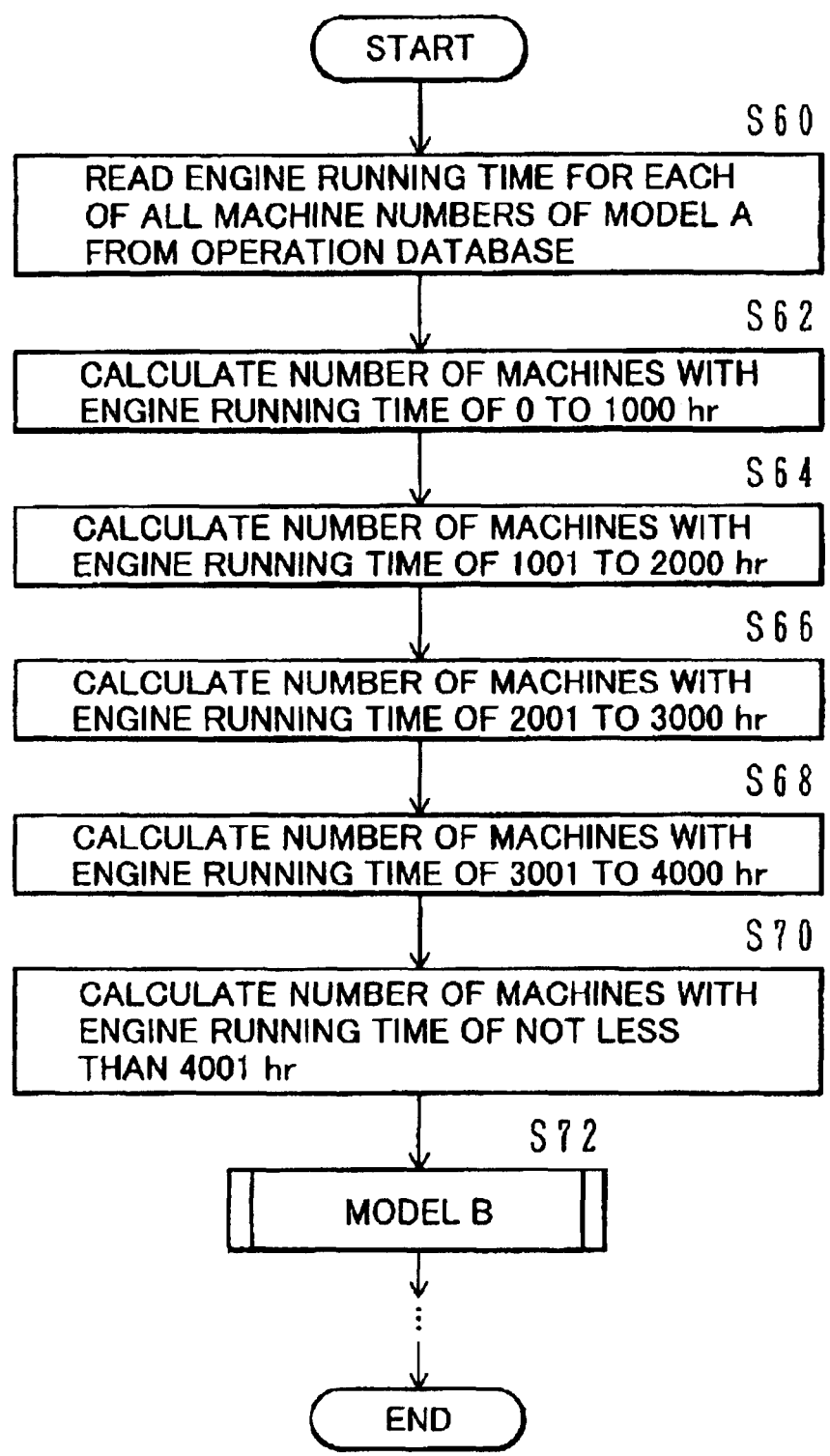
FIG. 11 is a flowchart showing procedures for obtaining distribution data of the number of operated machines with respect to the engine running time.
Figure 12:
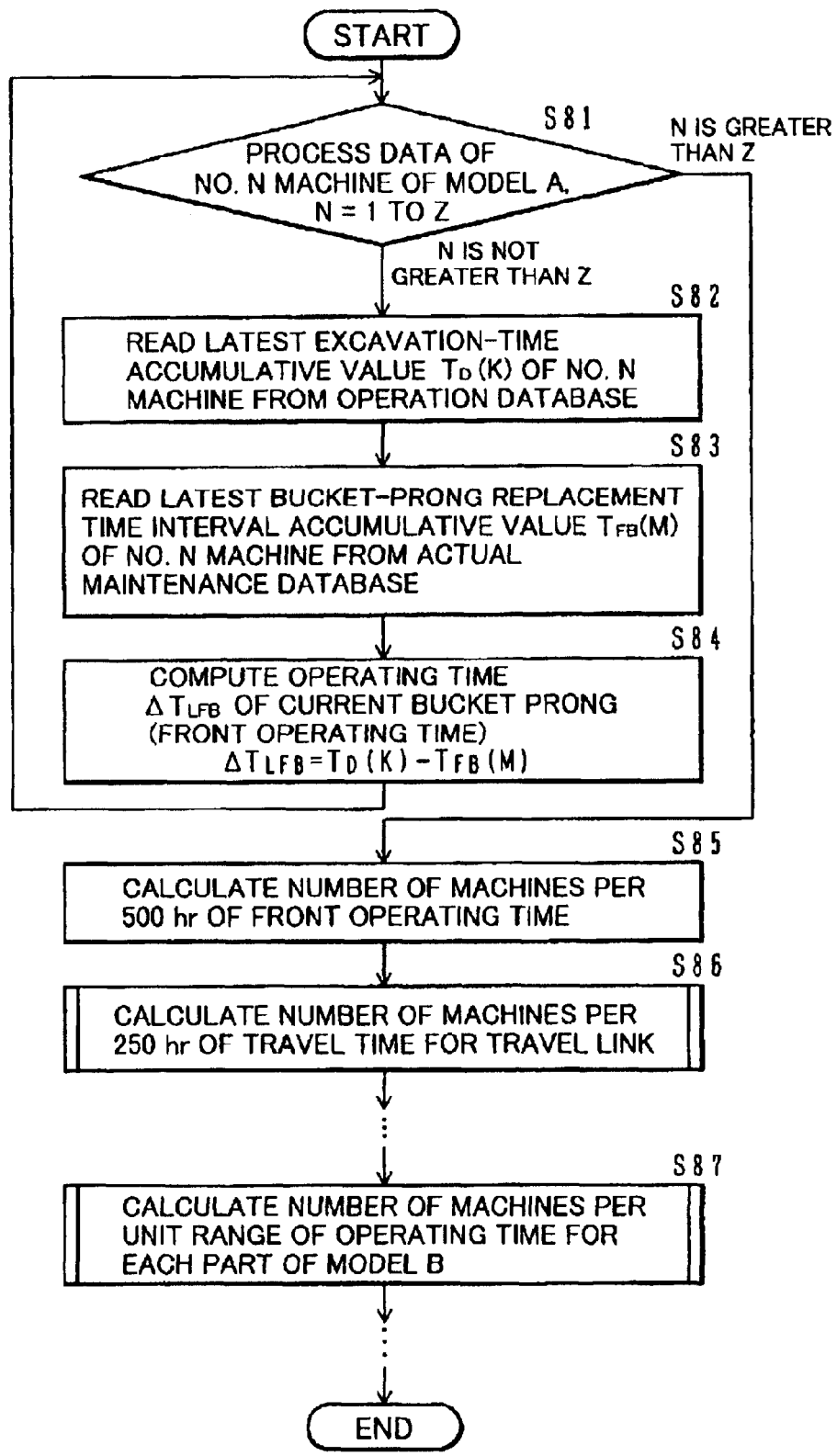
FIG. 12 is a flowchart showing procedures for obtaining distribution data of the number of operated machines with respect to the operating time per part.

Using the data stored in the operation database described above, the machine body/operation information processing section 50 computes, in step S36 of FIG. 7, distribution data of the number of operated machines with respect to the operating time of all hydraulic excavators working in fields per machine model and part in accordance with procedures shown in flowcharts of FIGS. 11 and 12. The operating time of each part is calculated on the basis of the operating time of each section to which the part belongs.

In this embodiment, the term "operating time of each section to which the part belongs" represents the operating time of the front 15 (excavation time) when the front 15 is the section to which the part belongs, as with a bucket, a bucket prong, a front pin (e.g., a joint pin between the boom and the arm), etc., the swing time when the swing body 13 is the section to which the part belongs, as with a swing wheel, a swing motor, etc., and the travel time when the travel body 12 is the section to which the part, belongs, as with a travel motor, a travel link, a travel roller, etc.. Also, it represents the engine running time when the engine 32 is the section to which the part belongs, as with engine oil, an engine oil filter, etc. Further, when a hydraulic source of the hydraulic system is the section to which the part belongs, as with the working oil, a working oil filter, a main pump, a pilot pump, etc., the engine running time is regarded as the operating time of the section to which those parts belong. Note that the operating time of the hydraulic source may be obtained by measuring the operating time during which the delivery pressure of the hydraulic pumps 21a, 21b is not lower than a predetermined level, or by subtracting a period of time, during which no load is applied, from the engine running time.

FIG. 11 is a flowchart showing procedures for obtaining distribution data of the number of operated machines per model with respect to the engine running time.

In FIG. 11, the machine body/operation information processing section 50 first reads the engine running time for each of all machines of model A from the operation database shown in FIG. 10 (step S60). Then, it divides the engine running time into a unit zone of 10000 hours, and calculates the number of hydraulic excavators in each unit zone of the engine running time. More specifically, the number of hydraulic excavators is calculated for each unit zone of the engine running time, i.e., for each unit zone of 0 to 10000 hr, 10001 to 20000 hr, 20001 to 30000 hr, 30001 to 40000 hr, and not less than 40001 hr (steps S62 to S70).

Likewise, for all machines of other models B, C, . . . , the number of hydraulic excavators is calculated for each 10000-hour zone of the engine running time (step S72). After thus computing distribution data of the number of operated machines for each unit zone of the engine running time, a distribution graph of the number of operated machines is prepared and outputted to the in-house computer through processing of steps S38 and S40 shown in FIG. 7.

Figure 13:
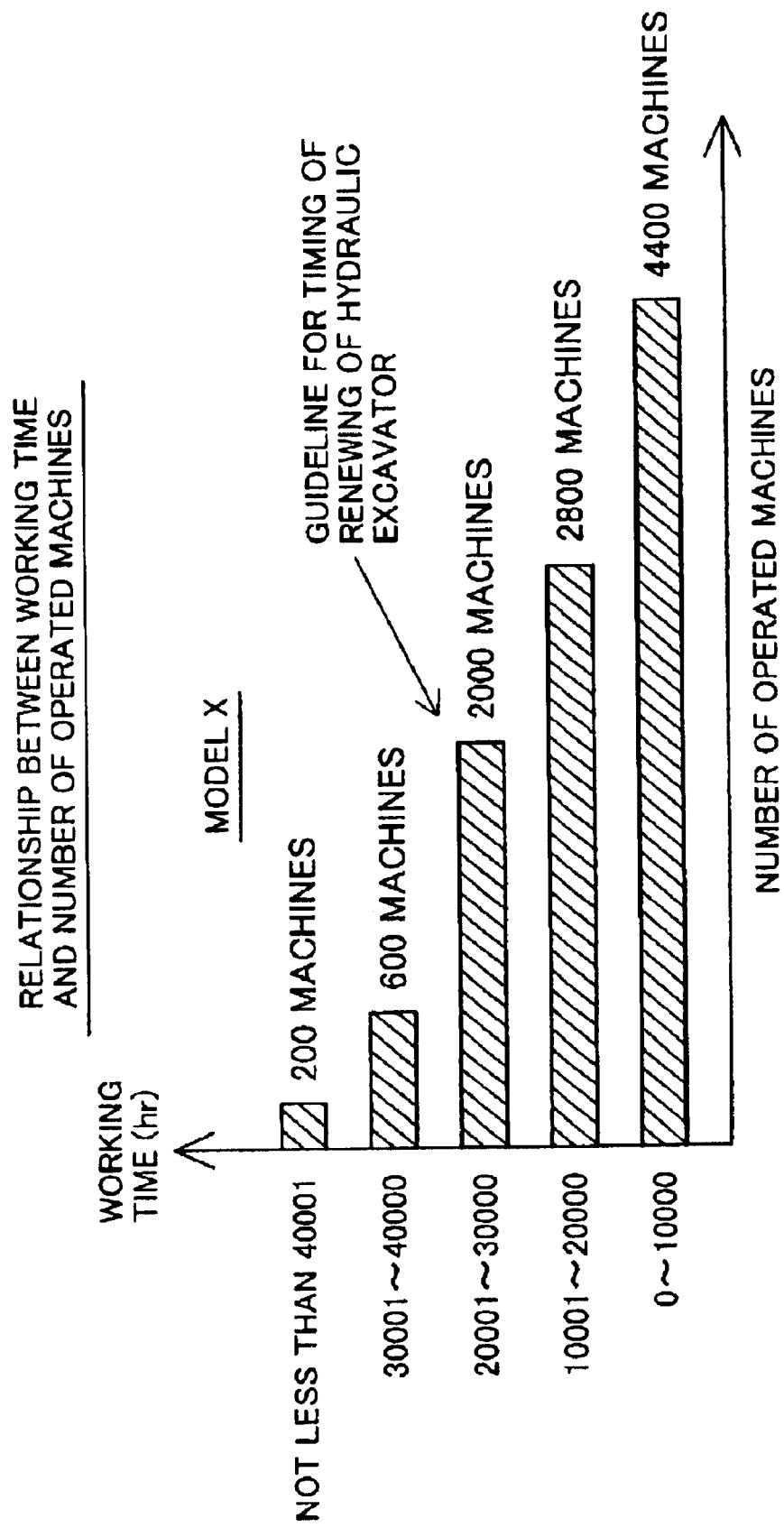
FIG. 13 shows one example of a distribution graph of the number of operated machines with respect to the working time (engine running time) of hydraulic excavators of model X.

FIG. 13 shows, by way of example, a distribution graph of the number of operated machines with respect to the working time (engine running time) of hydraulic excavators of model X. The horizontal axis of FIG. 13 indicates the number of operated hydraulic excavators, and the vertical axis indicates the working time of the hydraulic excavator.

FIG. 12 is a flowchart showing procedures for obtaining distribution data of the number of operated machines per part with respect to the operating time.

In FIG. 12, for processing all data of No. 1 to Z machines of model A, the machine body/operation information processing section 50 first determines whether the machine number N is not greater than Z (step S81). If N is not greater than Z, the processing section 50 reads the latest accumulative value $T_D(K)$ of the front operating time of the No. N machine of model A from the operation database shown in FIG. 10 (step S82). Subsequently, it reads the latest accumulative value $T_{FB}(M)$ of the bucket-prong replacement time interval of the No. N machine from the actual maintenance database shown in FIG. 10 (step S83), and calculates the operating time (front operating time) $\Delta T_{LFB}$ of the bucket prong, which is currently used, based on the following formula (step S84):

$$\Delta T_{LFB}=T_D(K)-T_{FB}(M)$$

Then, the above-described processing is executed for all machines of No. 1 to Z, thereby calculating the operating time (front operating time) $\Delta T_{LFB}$ of the bucket prong, which is currently used, for all hydraulic excavators of model A.

Thereafter, the processing section 50 divides the front operating time $\Delta T_{LFB}$ regarding the bucket prong into a unit zone of 500 hours, and calculates the number of hydraulic excavators in each unit zone of the operating time. More specifically, the number of hydraulic excavators is calculated for each unit zone of the front operating time, i.e., for each unit zone of 0 to 500 hr, 501 to 1000 hr, 1001 to 1500 hr, 1501 to 2000 hr, and not less than 2001 hr, thereby obtaining distribution data of the number of operated machines (step S85).

Also, for the travel link of each hydraulic excavator of model A, the processing section 50 calculates the operating time (travel time) per link and obtains distribution data of the number of operated machines per 250 hr (step S86). Then, it calculates the operating time for each of other parts in a similar manner, thereby obtaining distribution data of the number of operated machines for each predetermined unit zone of the operating time.

Likewise, for each of all parts of other models B, C, . . . , the operating time is calculated to obtain distribution data of the number of operated machines for each predetermined unit zone of the operating time (step S87).

After thus computing the distribution data of the number of operated machines versus the operating time per the machine model and number, a distribution graph of the number of operated machines is prepared and outputted to the in-house computer through processing of steps S38 and S40 shown in FIG. 7.

Figure 14:
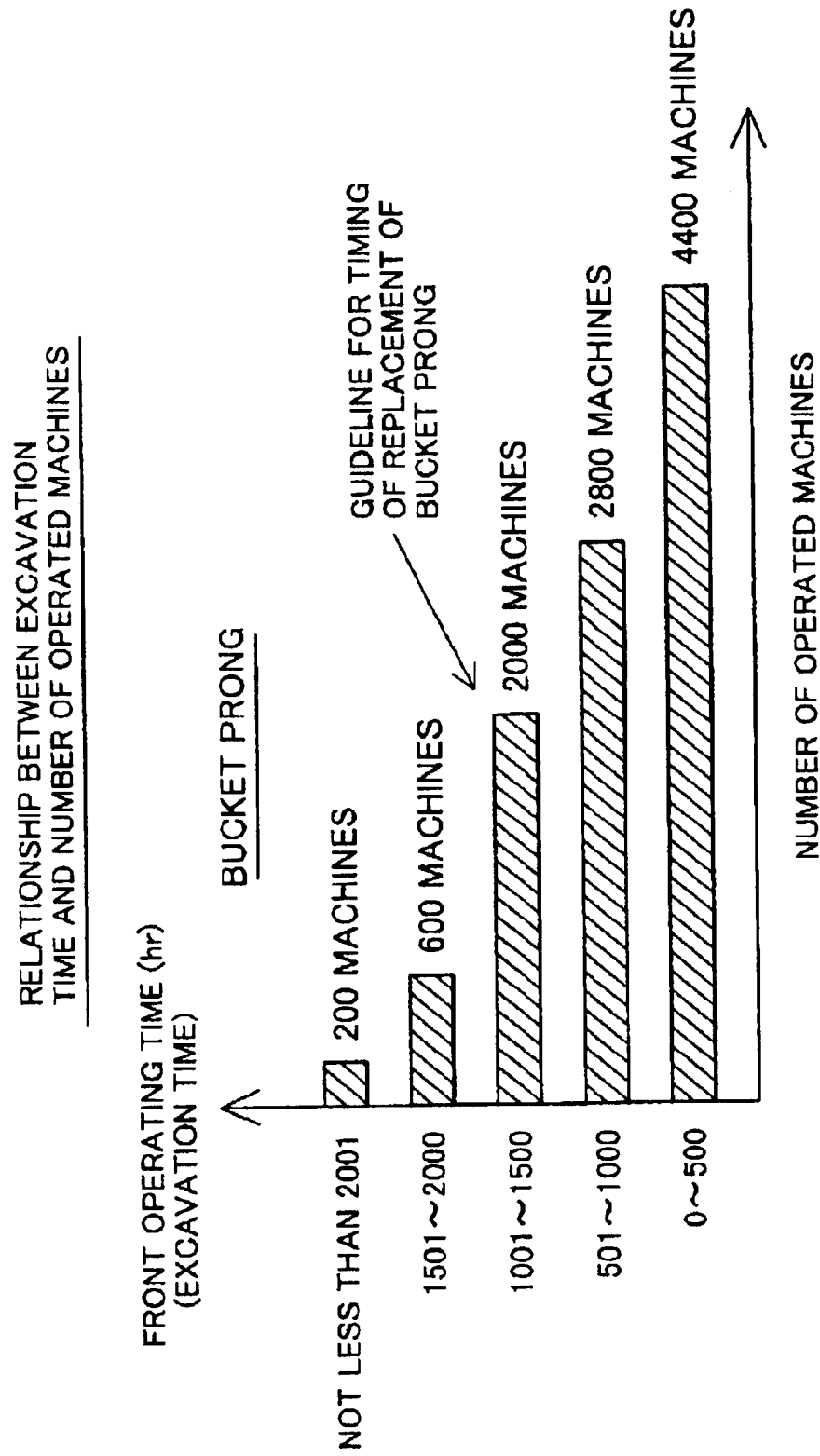
FIG. 14 shows one example of a distribution graph of the number of operated machines with respect to the front operating time (excavation time) regarding bucket prongs.
Figure 15:
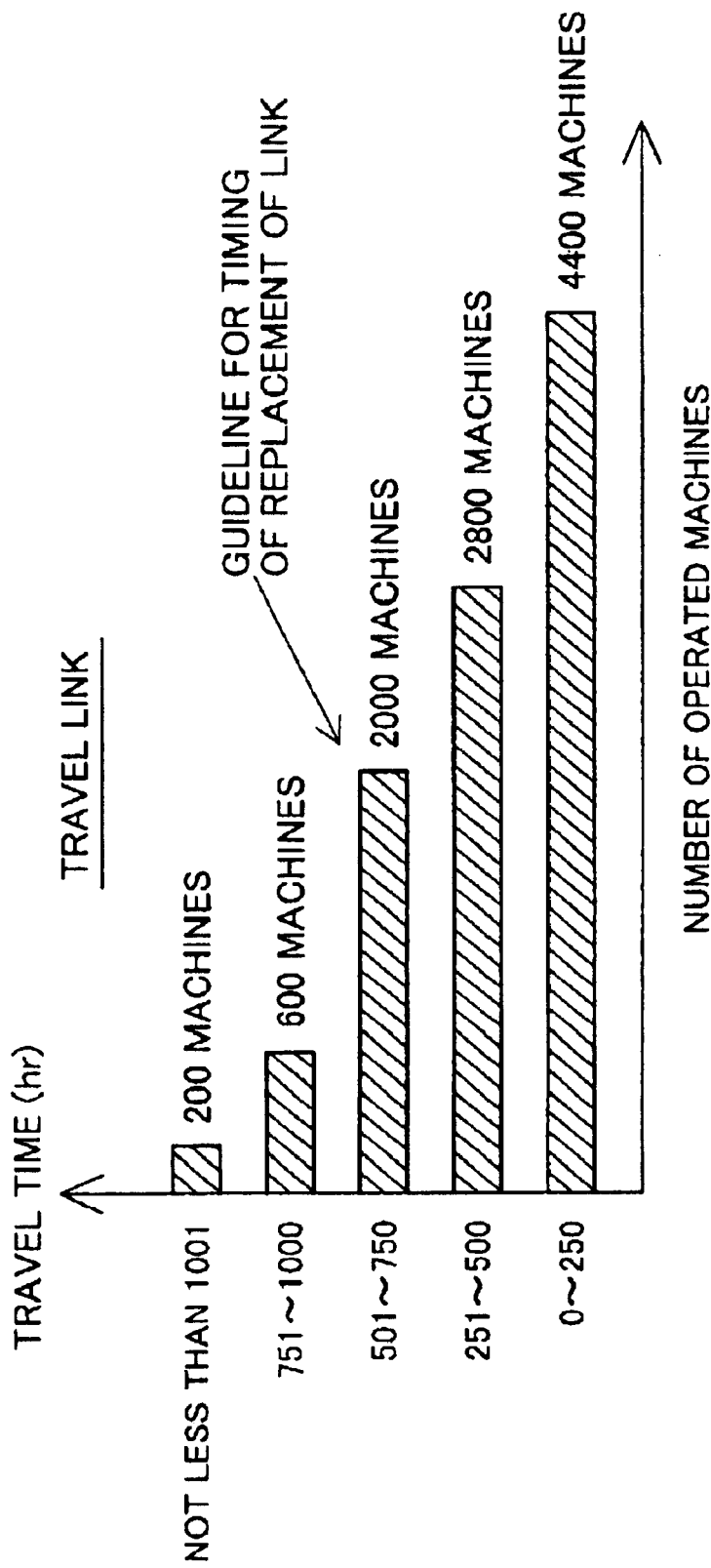
FIG. 15 shows one example of a distribution graph of the number of operated machines with respect to the travel time regarding travel links.

FIG. 14 shows one example of a distribution graph of the number of operated machines with respect to the front operating time (excavation time) regarding bucket prongs, and FIG. 15 shows one example of a distribution graph of the number of operated machines with respect to the travel time regarding travel links. In FIGS. 14 and 15, the horizontal axis indicates the number of operated hydraulic excavators, and the vertical axis indicates the front operating time (excavation time) and the travel time, respectively.

Figure 16:
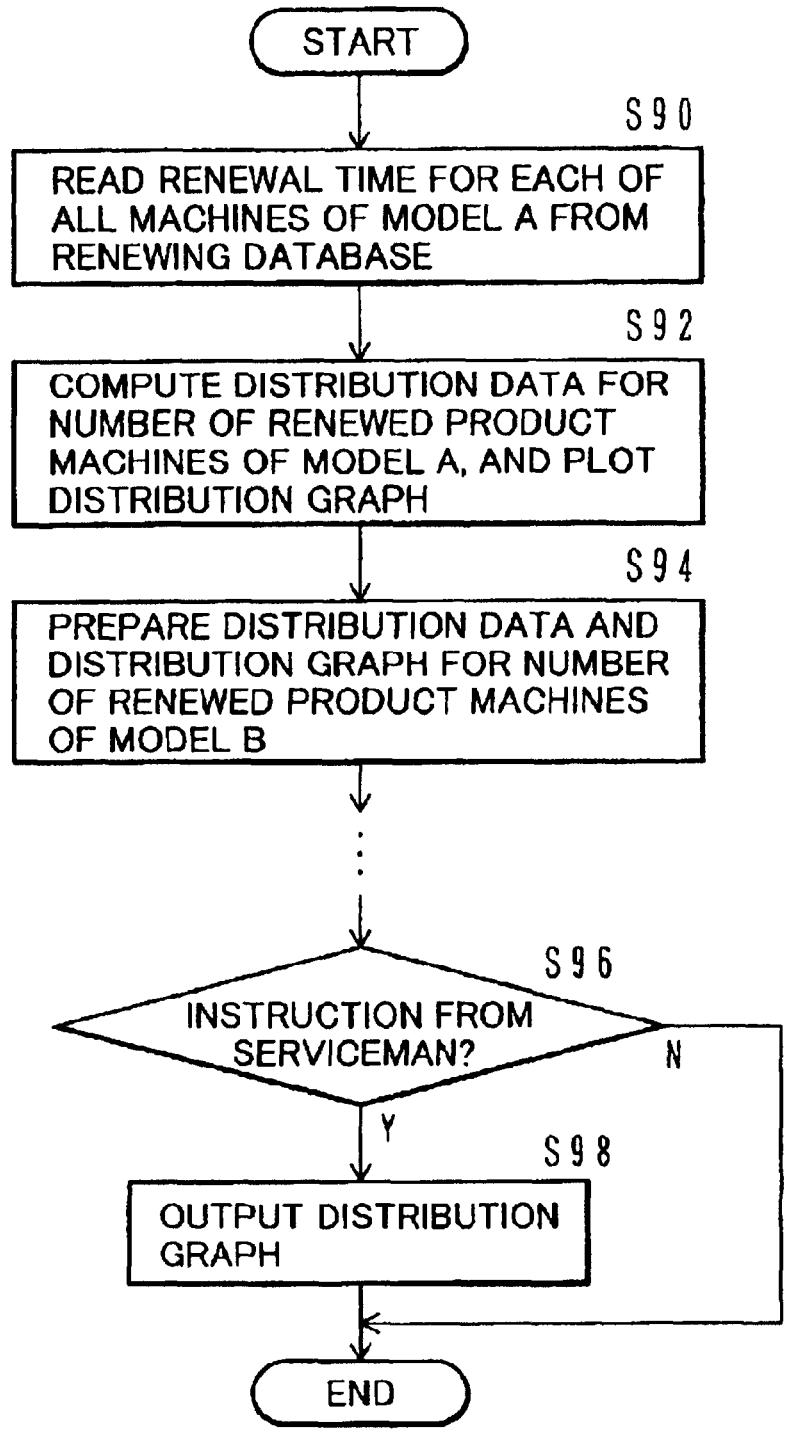
FIG. 16 is a flowchart showing procedures for computing distribution data of the number of renewed machines with respect to the working time of hydraulic excavators which have been renewed in the past, and for plotting a distribution graph.

Using the data stored in the renewing database shown in FIG. 10, the product renewing/part replacement information processing section 51 computes, in step S47 of FIG. 8, distribution data of the number of renewed product machines with respect to the working time of hydraulic excavators, which have been renewed in the past, in accordance with procedures shown in a flowchart of FIG. 16, and then prepares a distribution graph of the number of renewed product machines based on the computed data.

In FIG. 16, the product renewing/part replacement information processing section 51 first reads the operating time until renewing for each of all machines of model A from the renewing database shown in FIG. 10 (step S90). Then, it computes distribution data of the number of renewed product machines with respect to the operating time from data of the read operating time until renewing, and prepares a distribution graph of the number of renewed product machines based on the computed data (step S92). That distribution data can be obtained in a similar manner to that used when computing the distribution data of the number of operated machines as described above. Likewise, for all machines of other models B, C, ..., distribution data of the number of renewed product machines is computed and a distribution graph is prepared (step S94). The processing section 51 then waits for an instruction from the serviceman (step S96). If there is an instruction, the thus-prepared distribution graph of the number of renewed product machines is outputted to the in-house computer (step S98).

Figure 17:
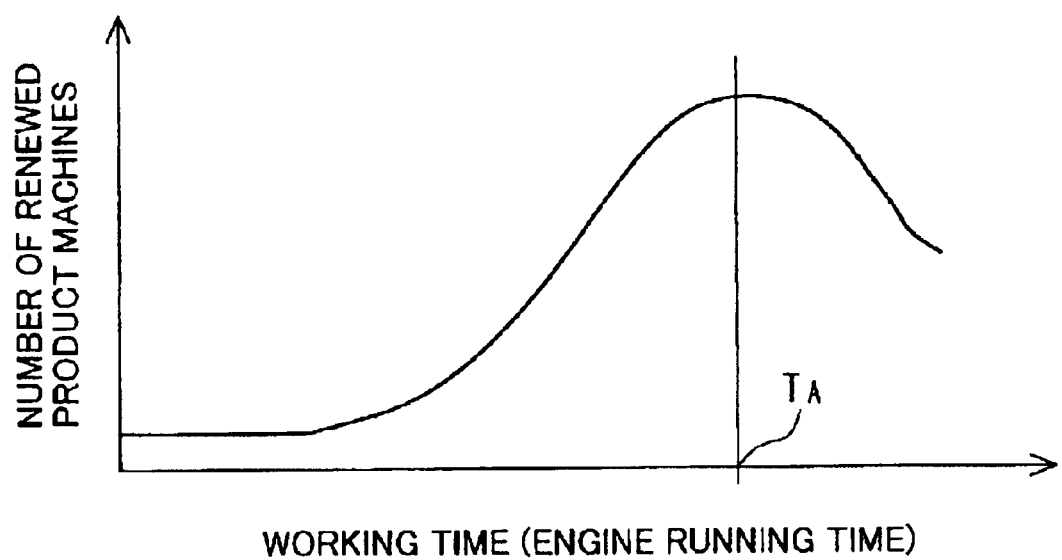
FIG. 17 shows one example of a distribution graph of the number of renewed machines with respect to the working time of hydraulic excavators which have been renewed in the past.

FIG. 17 shows one example of a distribution graph of the number of renewed product machines with respect to the working time of hydraulic excavators that have been renewed in the past. The horizontal axis of FIG. 17 indicates the working time of the hydraulic excavator, and the vertical axis indicates the number of renewed product machines.

Figure 18:
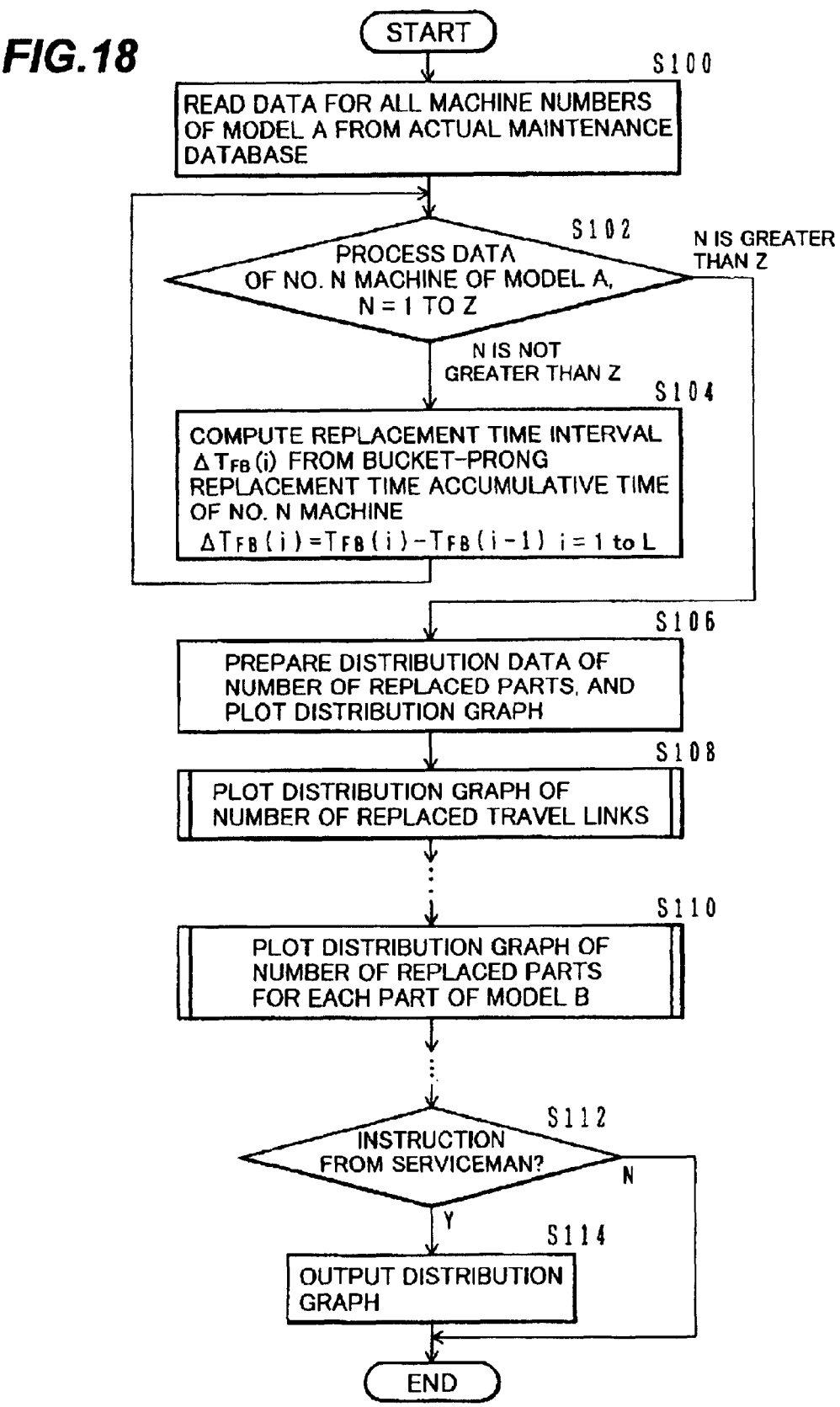
FIG. 18 is a flowchart showing procedures for computing distribution data of the number of parts, which have been replaced in the past, with respect to the operating time, and for plotting a distribution graph.

Also, using the data stored in the actual maintenance database shown in FIG. 10, the product renewing/part replacement information processing section 51 computes, in step S56 of FIG. 9, distribution data of the number of parts, which have been replaced in the past, with respect to the operating time in accordance with procedures shown in a flowchart of FIG. 18, and then prepares a distribution graph of the number of replaced parts based on the computed data.

In FIG. 18, the product renewing/part replacement information processing section 51 first reads the maintenance data for all machines of model A from the actual for processing all data of No. 1 to Z machines of model A, the processing section 51 determines whether the machine number N is not greater than Z (step S102). If N is not greater than Z, it computes the replacement time interval $\Delta T_{FB}(i)$ of the bucket prong, for example, from the accumulative value of the bucket-prong replacement time interval, which is included in the read data of the No. N machine, based on the following formula (step S104):

$$\Delta T_{FB}(i) = T_{FB}(i) - T_{FB}(i-1)$$

i=1 to L (L is the number of times of replacements of No. N machine's bucket prong) Herein, the replacement time interval $\Delta T_{FB}(i)$ of the bucket prong means a time interval (life) from the time at which one part was assembled in the machine body, to the time at which it was replaced by a new one because of a failure or expiration of the life. The time interval is given as a value on the basis of the operating time (excavation time) of the front to which the bucket prong belongs. The above-mentioned processing is repeated for all machines of No. 1 to Z, thereby collecting data of the replacement time interval $\Delta T_{FB}$ of each bucket prong for all hydraulic excavators of model A.

After completing data collection of the replacement time interval $\Delta T_{FB}$ of each bucket prong for all hydraulic excavators as described above, the processing section 51 computes, using the collected replacement time intervals, distribution data of the number of replaced parts with respect to the replacement time interval, and prepares a distribution graph of the number of replaced parts based on the computed data (step S106). That distribution data can be obtained in a similar manner to that used when computing the distribution data of the number of operated machines as described above. Likewise, for other parts such as a travel link, distribution data of the number of replaced parts is computed and a distribution graph is prepared (step S108). Further, for all hydraulic excavators of other models B, C, ..., distribution data of the number of replaced parts is computed and a distribution graph is prepared in a similar manner (step S110). The processing section 51 then waits for an instruction from the serviceman (step S112). If there is an instruction, the thus-prepared distribution graph of the number of replaced parts is outputted to the in-house computer (step S114).

Figure 19:
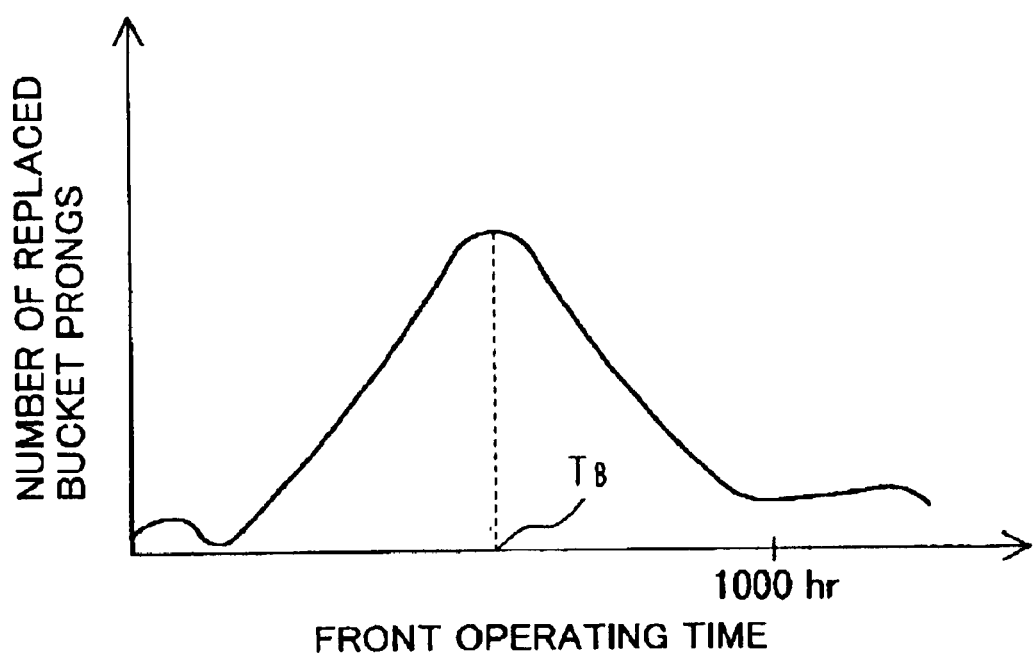
FIG. 19 shows one example of a distribution graph of the number of bucket prongs, which have been replaced in the past, with respect to the front operating time.

FIG. 19 shows one example of a distribution graph of the number of bucket prongs, which have been replaced in the past, with respect to the front operating time. The horizontal axis of FIG. 19 indicates the front operating time, and the vertical axis indicates the number of replaced bucket prongs.

Figure 20:
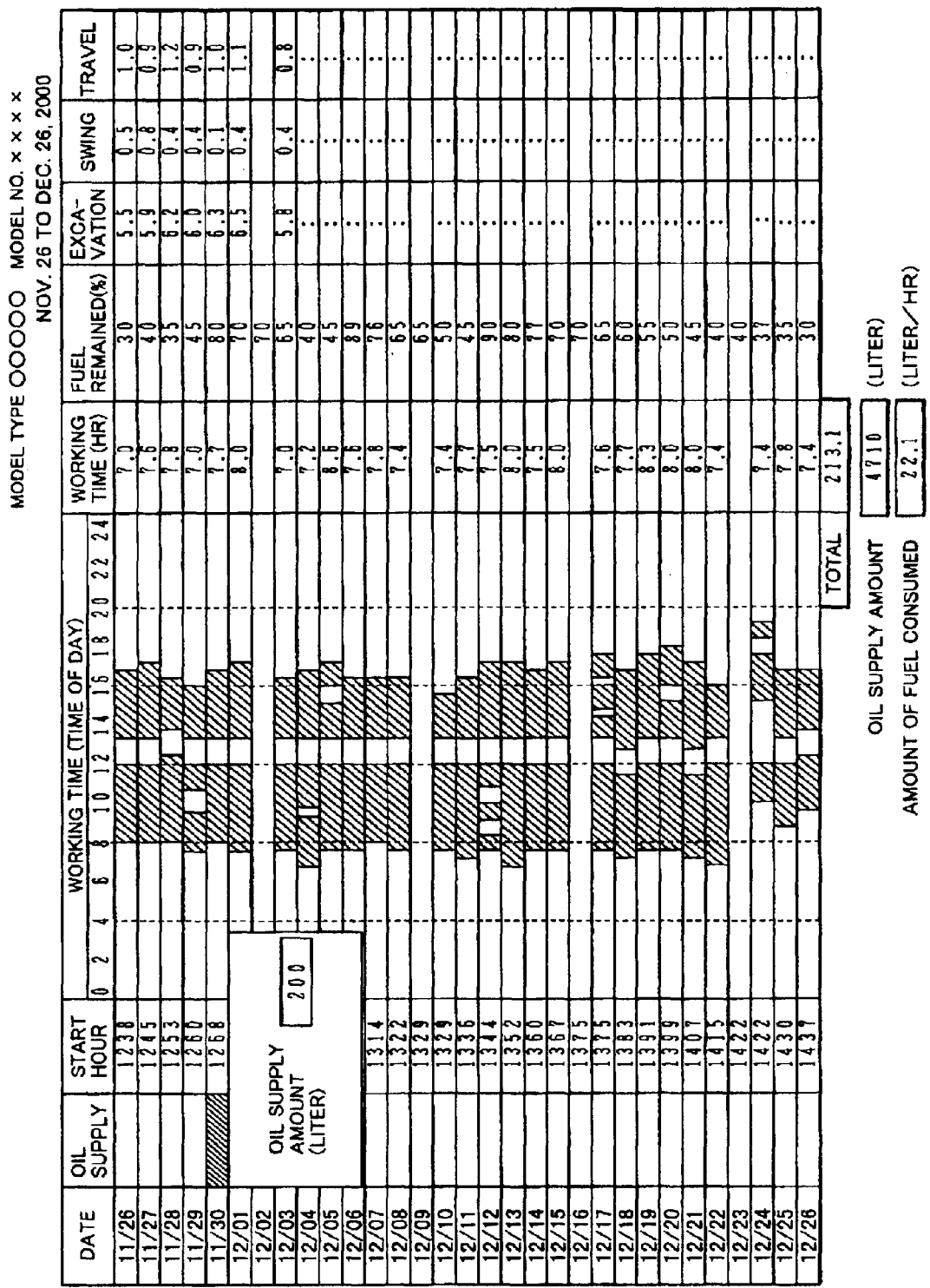
FIG. 20 is a table showing one example of a daily report transmitted to an in-house computer and a user side computer.

FIGS. 20 and 21 each show one example of the daily report transmitted to the in-house computer 4 and the user side computer 5. FIG. 20 shows each operating time data for one month in the form of graph and numerical value in correspondence to the date. Based on FIG. 20, the user can confirm changes in the state of use of the owned hydraulic excavator for the past one month. The left side of FIG. 21 graphically shows the operating time for each section and the engine running time under no load for the past half year, and the right side of FIG. 21 graphically shows transition of a ratio between the engine running time under load and the engine running time under no load for the past half year. Based on FIG. 21, the user can confirm changes in the state and efficiency of use of the owned hydraulic excavator for the past half year.

With this embodiment constructed as described above, the sensors 40 to 46 and the controller 2 are provided as data measuring and collecting means in each of a plurality of hydraulic excavators 1 working in fields to measure an operating time for each of a plurality of sections (the engine 32, the front 15, the swing body 13, the travel body 12, and the hydraulic pumps 21a, 21b), which are operated for different periods of time per hydraulic excavator, and the measured operating time for each section is transferred to the base station computer 3 to be stored and accumulated therein as operation data shown in FIG. 10. In the base station computer 3, the operation data is read out for each hydraulic excavator to prepare and output the distribution graph, shown in FIG. 13, of the number of operated machines with respect to the working time (engine running time) of the hydraulic excavator. By looking at the distribution graphs, therefore, it is possible to estimate the number of hydraulic excavators which will be renewed in the next term.

Such an estimation of the number of renewed hydraulic excavators can be performed, for example, through the following procedures.

(1) An average operating time until renewing of the hydraulic excavator is assumed. The average operating time is on the basis of the engine running time.

For example, the average operating time is assumed to be 20000 hours on the basis of the engine running time.

(2) The number of hydraulic excavators, which have been operated in excess of the average operating time, is calculated from the distribution graph of the number of operated machines.

For example, in the case of assuming the average operating time to be 20000 hours as mentioned above, the number of hydraulic excavators, which have been operated in excess of the average operating time, is total 2800 in the distribution graph shown in FIG. 13, i.e., 2000 in the operating time zone of 20001 to 30000 hr, 600 in the operating time zone of 30001 to 40000 hr, and 200 in the operating time zone of not less than 40001 hr.

(3) The number of hydraulic excavators, which will be renewed in the next term, is estimated from the number of hydraulic excavators which have been operated in excess of the average operating time.

For example, in the distribution graph shown in FIG. 13, among 2800 units of hydraulic excavators in excess of the average operating time of 20000 hours, the number of hydraulic excavators, which will be still used in the next term without being renewed, is estimated to be 600 in the operating time zone of 30001 to 40000 hr and 200 in the operating time zone of not less than 40001 hr as with the present situation. Then, the number of hydraulic excavators, which will be renewed in the next term, is estimated to be 2000.

As a result of thus estimating the number of renewed hydraulic excavators, a machine maker can precisely estimate the number of hydraulic excavators that are expected to be sold in the next term, and can set up an adequate production plan of hydraulic excavators.

Also, with this embodiment, in the base station computer 3, the operation data is read out for each hydraulic excavator to prepare and output the distribution graphs, shown in FIGS. 14 and 15, of the number of operated machines with respect to the front operating time (excavation time) and the travel time. By looking at the distribution graphs, therefore, it is possible to estimate the number of parts of the front and the travel body, which will be replaced in the next term.

Such an estimation of the number of replaced parts can be performed through the following procedures as with the above case of estimating the number of renewed hydraulic excavators.

(1) An average operating time until replacement of the part is assumed. The average operating time is on the basis of the operating time of the section to which the part belongs.

Taking a bucket prong as an example, the average operating time is assumed to be, e.g., 1000 hours on the basis of the front operating time.

(2) The number of hydraulic excavators, in which the bucket prong has been operated in excess of the average operating time, is calculated from the distribution graph of the number of operated machines with respect to the operating time regarding the relevant part.

For example, in the case of assuming the average operating time of the bucket prong to be 1000 hours, as mentioned above, on the basis of the front operating time, the number of hydraulic excavators, in which the front operating time (excavation time) is in excess of the average operating time, is total 2800 in the distribution graph shown in FIG. 14, i.e., 2000 in the operating time zone of 1001 to 1500 hr, 600 in the operating time zone of 1501 to 2000 hr, and 200 in the operating time zone of not less than 2001 hr.

(3) The number of hydraulic excavators, in which the parts will be replaced in the next term, is estimated from the number of hydraulic excavators in which the front operating time is in excess of the average operating time.

For example, in the distribution graph shown in FIG. 14, among 2800 units of hydraulic excavators in which the front operating time is in excess of the average operating time of 1000 hours, the number of hydraulic excavators, which will be still used in the next term without replacing bucket prongs, is estimated to be about 10%. Then, the number of hydraulic excavators, in which bucket prongs will be replaced, is estimated to be 2520.

(4) The number of parts, which will be replaced in the next term, is estimated by multiplying the above-estimated number of hydraulic excavators by the number of parts per machine.

Assuming, for example, that the number of hydraulic excavators, in which bucket prongs will be replaced, is estimated to be 2520, since the number of bucket prongs per machine is 4, the number of bucket prongs, which will be replaced in the next term, is expected to be 10080.

For each of other parts, the number of replaced parts is likewise estimated. Taking a travel link as an example, the number of travel links, which will be replaced in, the next term, can be expected in a similar manner from the distribution graph, shown in FIG. 15, by assuming the average operating time until replacement of the travel link to be 500 hours on the basis of the travel time.

As a result of thus estimating the number of replaced parts, a machine maker can precisely estimate the number of parts that are expected to be sold in the next term, and can set up an adequate production plan of parts.

Further, with this embodiment, in the base station computer 3, the renewing data and the operation data of each hydraulic excavator, shown in FIG. 10, are read out to prepare and output the distribution graph, shown in FIG. 17, of the number of renewed product machines with respect to the working time of hydraulic excavators that have been renewed in the past. By looking at the distribution graph, therefore, it is possible to determine the average operating time until renewing of the hydraulic excavator, and to precisely estimate the number of hydraulic excavators which will be renewed in the next term.

More specifically, the average operating time until renewing of the hydraulic excavator is assumed to be 20000 hours on the basis of the engine running time in the step (1) of the above description, and the accuracy in estimating the number of renewed hydraulic excavators is determined depending on how appropriately the average operating time is assumed.

In this embodiment, since the distribution graph of the number of actually renewed machines is obtained as shown in FIG. 17, the average operating time until renewing of the hydraulic excavator can be given as, e.g., an operating time $T_A$ near the maximum number of renewed machines in the distribution graph. This means that the average operating time $T_A$ until renewing of the hydraulic excavator reflects the actual past renewing data, and hence a more precise estimation of the number of renewed hydraulic excavators can be realized. As a result, a machine maker can more precisely estimate the number of hydraulic excavators that are expected to be sold in the next term, and can set up a more adequate production plan of hydraulic excavators.

Furthermore, with this embodiment, in the base station computer 3, the actual maintenance data (repair/replacement data of parts) and the operation data, shown in FIG. 10, are read out to prepare and output the distribution graph, shown in FIG. 19, of the number of parts, which have been replaced in the past, with respect to the operating time on the basis of the operating time of the section to which each part belongs. By looking at the distribution graph, therefore, it is possible to determine the average operating time $T_B$ until replacement of the part, and to precisely estimate the number of parts which will be replaced in the next term.

More specifically, the average operating time until replacement of the bucket prong is assumed to be 1000 hours on the basis of the front operating time in the step (1) of the above description, and the accuracy in estimating the number of replaced bucket prongs is determined depending on how appropriately the average operating time is assumed.

In this embodiment, since the distribution graph of the number of actually replaced parts is obtained as shown in FIG. 19, the average operating time until renewing of the hydraulic excavator can be given as, e.g., an operating time $T_B$ near the maximum number of replaced parts in the distribution graph. This means that the average operating time until replacement of the bucket prong reflects the actual past replacement data, and hence a more precise estimation of the number of replaced parts can be realized. As a result, a machine maker can more precisely estimate the number of parts that are expected to be sold in the next term, and can set up a more adequate production plan of parts.

According to this embodiment, as described above, the sales quantity of hydraulic excavators and the sales quantity of parts thereof can be precisely estimated, and therefore productions plans of hydraulic excavators and parts thereof can be adequately set up. Also, setting-up of adequate production plans makes it possible to properly perform inventory management and to minimize the occurrence of overstocked inventories or insufficient supply of products.

The above-mentioned advantages are resulted when a managing party is a maker of hydraulic excavators. When a managing party is a rental company, i.e., when the base station center server 3 is installed in a rental company, the company can estimate the number of hydraulic excavators to be renewed machines, and adequately set up plans about the number of hydraulic excavators to be purchased and the number of trade-in hydraulic excavators, as well as plans about the number of parts to be purchased. Consequently, easier planning of a budget and proper management of assets can be realized.

Further, according to this embodiment, since the daily report of the operation information and the diagnostic report indicating the results of maintenance and check are provided to the user side as appropriate, the user can confirm the state of operation of the owned hydraulic excavator and hence can perform management of the hydraulic excavator more easily.

A second embodiment of the present invention will be described with reference to FIGS. 22 to 41 in addition to FIGS. 1, 3, 4 and 10. This embodiment is intended to measure a mileage as the operation status of construction machines for estimating the sales quantity of product machines, to measure the number of times of operations as the operation status of each section for estimating the sales quantity of parts, and to modify the measured operation status (number of times of operations) of each section depending on load.

The overall construction of a system for managing a construction machine according to this embodiment will be first described below. This embodiment is suitable for managing construction machines with a high traveling capability, such as wheel type hydraulic excavators, wheel loaders, and tractors. Referring to FIG. 1, hydraulic excavators are of, e.g., the wheel type, and the machine side controller 2 is mounted on each of the wheel type hydraulic excavators.

Figure 22:
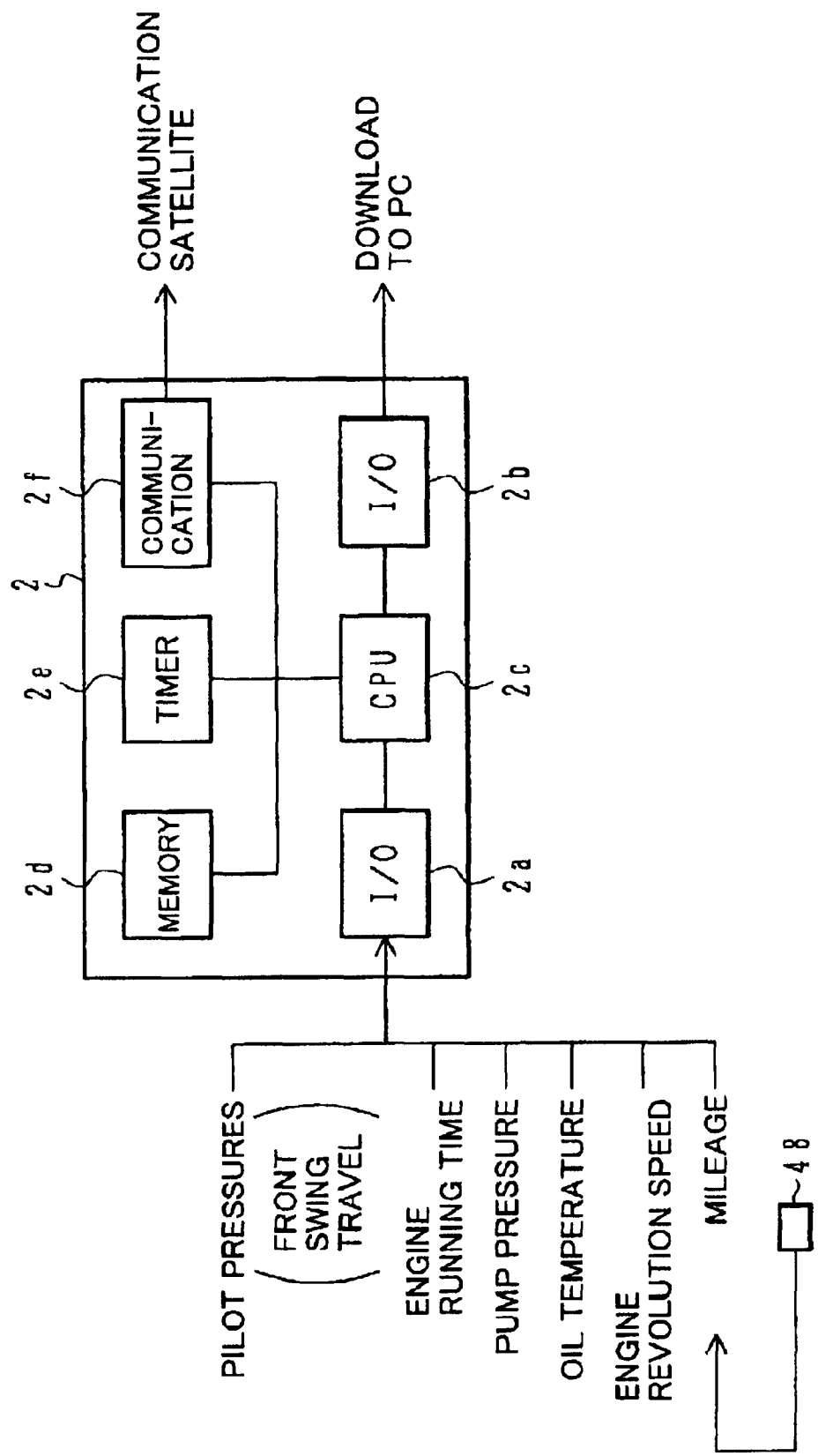
FIG. 22 shows details of the configuration of a machine side controller in a system for managing a construction machine according to a second embodiment of the present invention.

FIG. 22 shows details of the machine side controller 2 in this embodiment and signals inputted to it. A mileage detection signal is inputted to the controller 2 in addition to the respective detection signals of the pilot pressures associated with the front, swing and travel, the engine running time, the pump pressure, the oil temperature, and the engine revolution speed. The mileage is measured by an odometer 48 of the wheel type hydraulic excavator.

The machine side controller 2 includes the function of collecting respective data of the operating time, the number of times of operations and the mileage, as well as the function of collecting frequency distribution data. Correspondingly, the machine body/operation information processing section 50 of the base station center server 3, shown in FIG. 4, has the function of processing the operating time, the number of times of operations and the mileage, as well as the function of processing the frequency distribution data.

Figure 23:
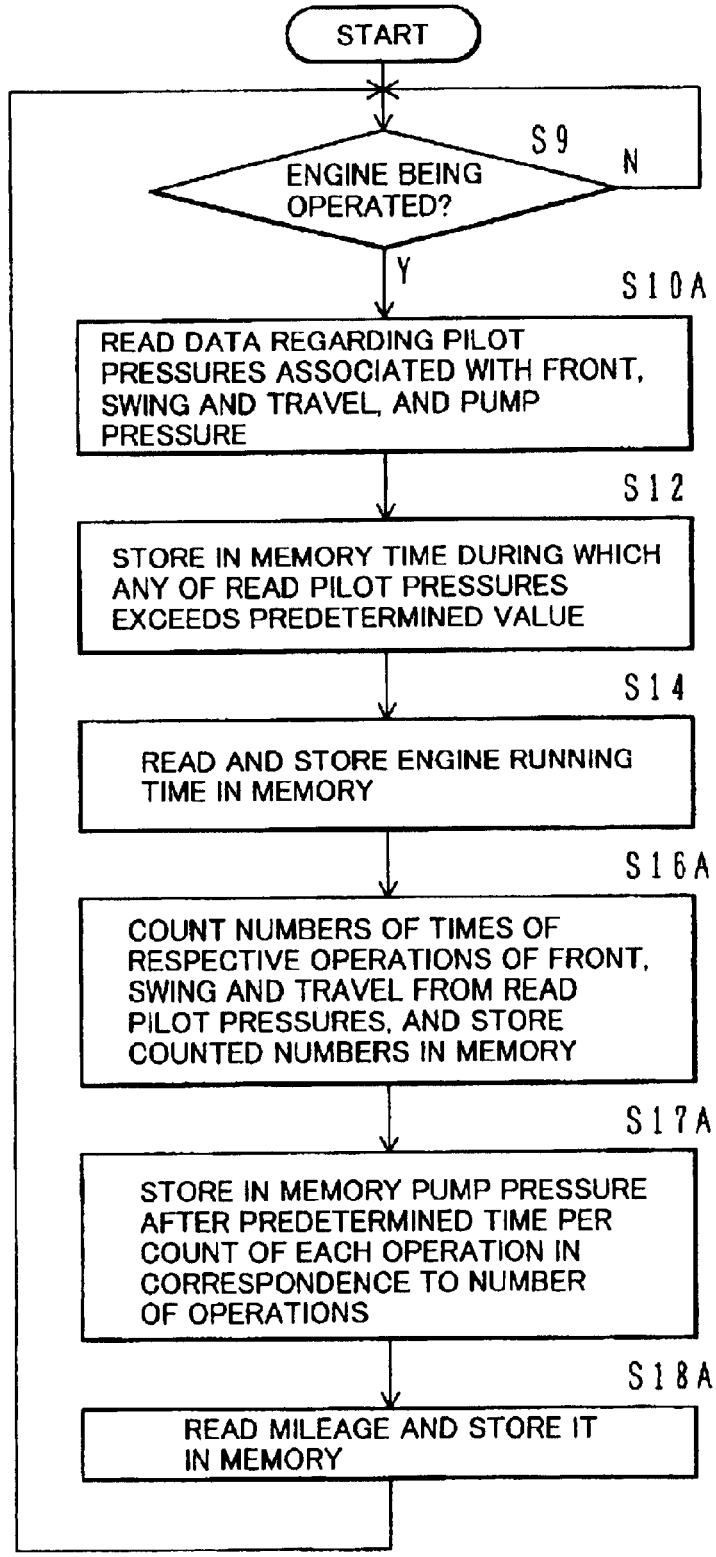
FIG. 23 is a flowchart showing the function of collecting an operating time and the number of times of operations for each section of a hydraulic excavator executed in a CPU of the machine side controller.

FIG. 23 is a flowchart showing the function of collecting respective data of the operating time, the number of times of operations and the mileage executed in the machine side controller 2. The controller 2 executes the processing of steps of S9 to S14 similarly to the first embodiment shown in FIG. 5. In step S10A, however, the controller 2 reads the detection signal of the pump pressure as well. Then, based on the read pilot pressures associated with the front, swing and travel operations, the controller counts the number of times of each of front (excavation), swing and travel operations, and stores and accumulates the counted result in the memory 2d in correspondence to the date and the time of day in step S16A. Herein, the number of times of operations is counted up one when the pilot pressure exceeds a predetermined pressure. Also, the number of times of front operations is counted depending on, e.g., the pilot pressure for arm drawing that is essential in excavation work. The number of times of front operations may be counted up one depending on each of the pilot pressures for operating the boom, the arm and the bucket. To count it up one upon a combined operation of those sections in this embodiment, however, if another of the pilot pressures for operating the boom, the arm and the bucket exceeds the predetermined pressure when any one of them is in excess of the predetermined pressure, the number of times of front operations is counted up one by taking logical "OR" of those detection signals.

Thereafter, each time when the number of times of operations is counted in step S16A, the pump pressure after the lapse of a predetermined time (e.g., 2 to 3 seconds) is detected and then stored and accumulated in the memory 2d in correspondence to the number of times of operations (step S17A). Subsequently, the controller proceeds to step S18A in which the mileage detection signal is read to be stored and accumulated in the memory 2d in correspondence to the date and the time of day.

The machine body/operation information thus stored and accumulated is transmitted to the base station center server 3 once a day, as described above in connection with the first embodiment with reference to FIG. 6.

Figure 24:
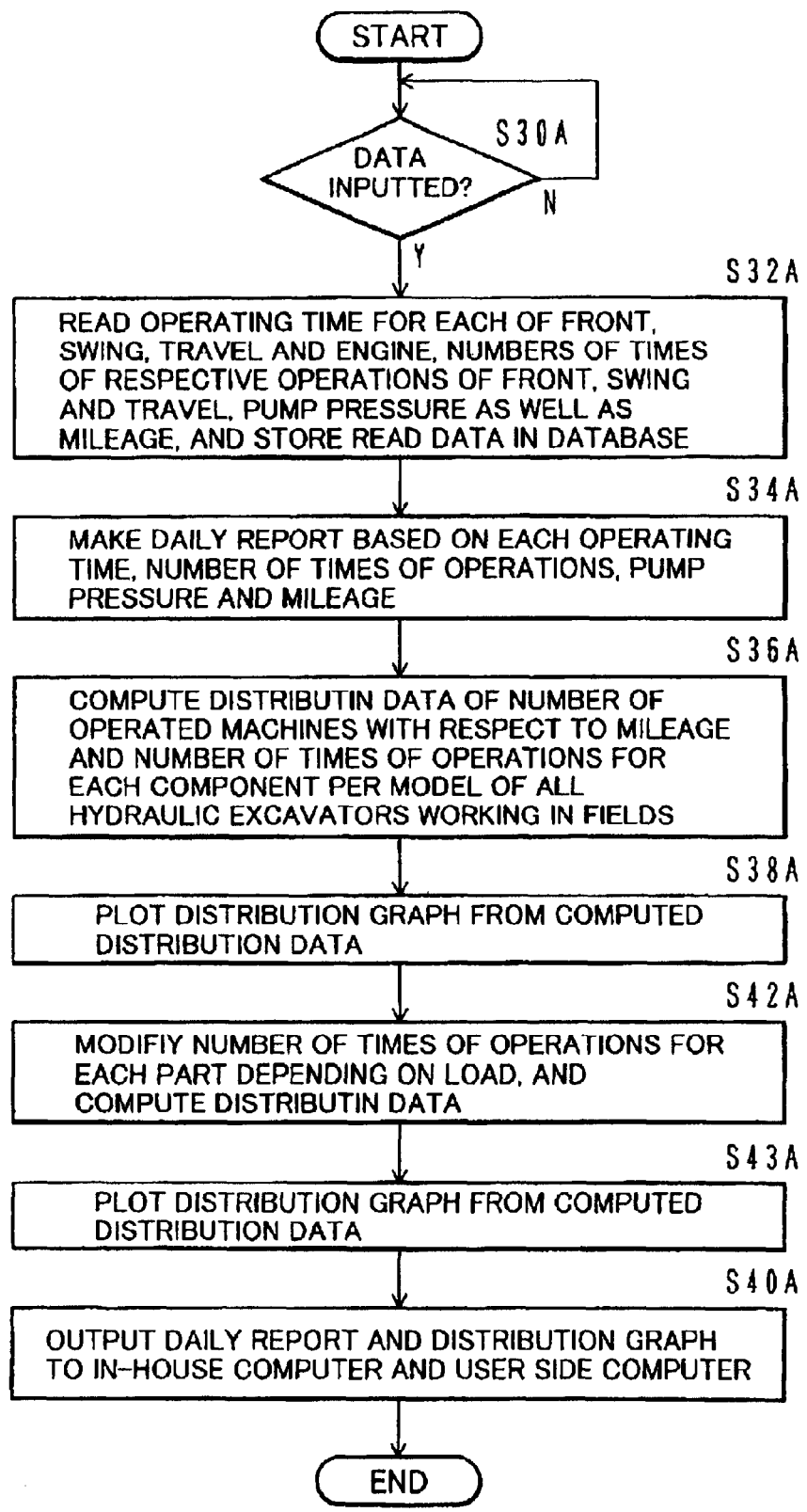
FIG. 24 is a flowchart showing the processing function of a machine body/operation information processing section in a base station center server executed when the operation data is transmitted from the machine side controller.

FIG. 24 is a flowchart showing the processing function of the machine body/operation information processing section 50 in the center server 3 executed when the machine body/-operation information is transmitted from the machine side controller 2. The machine body/operation information processing section 50 monitors whether data is inputted from the machine side controller 2 (step S30A). When data is inputted, the processing section 50 reads the inputted data, i.e., respective data of the operating time, the front, swing and travel operations, the pump pressure, and the mileage, and then stores and accumulates them as operation data in the database 100 (step S32A). The processing section 50 then reads the operation data for a predetermined number of days, e.g., one month, out of the database 100 and makes a daily report regarding the operating time, the number of times of operations, the pump pressure and the mileage (step S34A). Also, the processing section 50 reads the operation data of all hydraulic excavators currently working in fields from the database 100, computes distribution data of the number of operated machines with respect to the mileage per model and distribution data of the number of operated machines with respect to the number of times of operations per part (step S36A), and prepares a distribution graph of the number of operated machines based on each set of distribution data (step S38A) (described later). Further, the processing section 50 modifies the number of times of operations per part, which is obtained in step S36A, depending on load to compute distribution data of the number of operated machines with respect to the number of times of operations having been modified depending on load (step S42A) (described later). The processing section 50 then prepares a distribution graph of the number of operated machines versus the number of times of operations having been modified depending on load, per part, based on the computed distribution data (step S43A). Thereafter, the thus-prepared daily report and the distribution graphs are transmitted to the in-house computer 4 and the user side computer 5 (step S40A).

FIG. 25 shows how the operation data is stored in the database 100. In the database 100, the mileage, the number of times of front operations (the number of times of excavations), the number of times of swing operations, and the number of times of travel operations are stored as an operation database per machine model and number in the form of accumulative values in correspondence to the date. In an illustrated example, D(1) and $S_D(1)$ represent respective accumulative values of the mileage and the number of times of front operations for a No. N machine of model A as of Jan. 1, 2000. D(K) and $S_D$ represent respective accumulative values of the mileage and the number of times of front operations for the No. N machine of model A as of Mar. 16, 2000. Similarly, accumulative values $S_s(1)$ to $S_s(K)$ for the number of times of swing operations and accumulative values $S_T(1)$ to $S_T(K)$ for the number of times of travel operations for the No. N machine of model A are stored in correspondence to the date. Similar data is also stored for a No. N+1 machine, a No. N+2 machine, of model A and for all machines of other models B, C, . . .

Further, in the operation database per machine model and number, the pump load frequency distribution is stored and accumulated for each of the front, swing and travel operations in correspondence to the date. In an illustrated example, the number of times of front operations is stored in an area for the front operation dated Jan. 1, 2000 for each pump pressure zone of 5 MPa; e.g., from 0 MPa to 5 MPa: 12 times, from 5 MPa to 10 MPa: 32 times, . . . , from 25 MPa to 30 MPa: 28 times, and not lower than 30 MPa: 9 times. The pump load frequency distribution is also similarly stored in areas for the swing and travel operations and areas for the subsequent dates.

Figure 26:
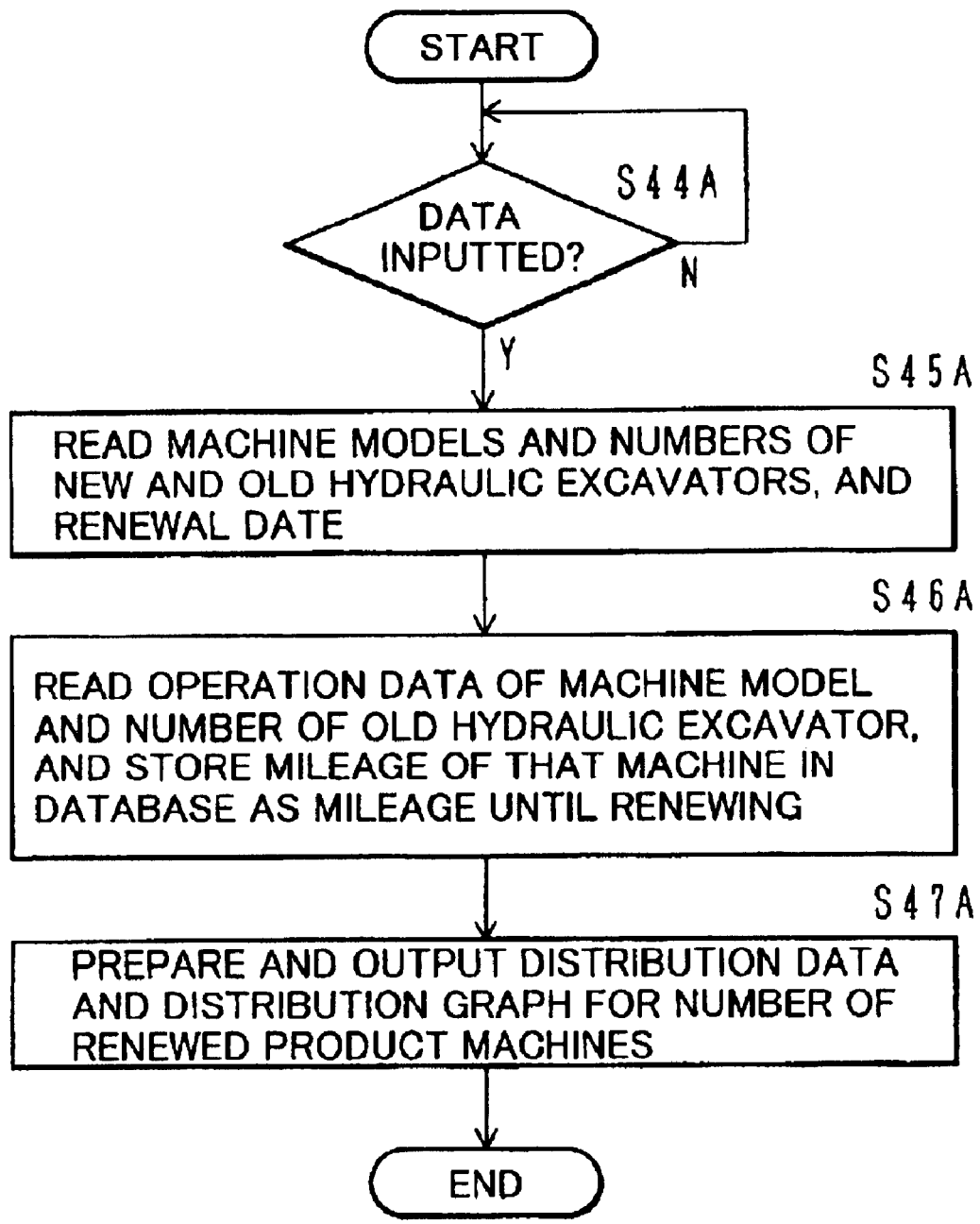
FIG. 26 is a flowchart showing the function of processing product renewing information, which is executed in a product renewing/part replacement information processing section of the base station center server.

FIG. 26 is a flowchart showing the function of processing product renewing information, which is executed in the product renewing/part replacement information processing section 51 of the center server 3. The product renewing/part replacement information processing section 51 monitors whether the product renewing information is inputted from the in-house computer 4 by, e.g., the serviceman (step S44A). When the product renewing information is inputted, the processing section 51 reads the inputted information (step S45A). The product renewing information contains, as mentioned above, the machine model and number of an old hydraulic excavator changed for a new hydraulic excavator upon repurchase, the machine model and number of the new hydraulic excavator, and the renewal date.

Then, the processing section 51 accesses the database 100, reads the operation data corresponding to the machine number of the old hydraulic excavator, and stores the latest mileage in the database 100 as a mileage until renewing of the hydraulic excavator (hereinafter referred to also as a "renewing mileage")(step S46A).

Subsequently, the processing section 51 reads the latest renewing mileage data, computes distribution data of the number of renewed product machines with respect to the mileage, and prepares a distribution graph of the number of renewed product machines based on the computed distribution data (step S47A) (described later).

Figure 27:
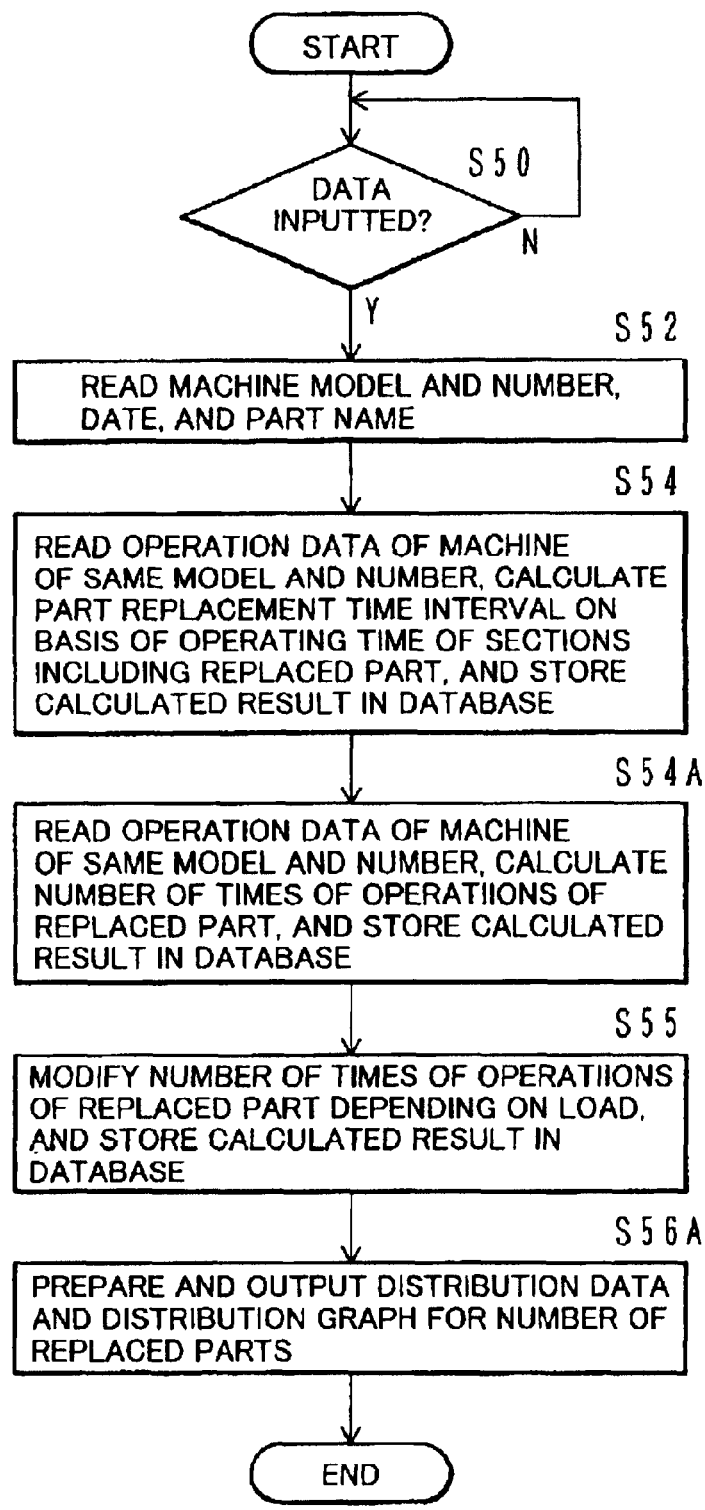
FIG. 27 is a flowchart showing the function of processing part replacement information, which is executed in the product renewing/part replacement information processing section of the base station center server.

FIG. 27 is a flowchart showing the function of processing the part replacement information, which is executed in the product renewing/part replacement information processing section 51 of the center server 3. The processing of steps S50 to S54 in FIG. 27 is the same as that in the flowchart of FIG. 9. After step S54, the processing section 51 accesses the database 100, reads the operation data corresponding to the same machine number, and calculates the number of times of operations of a replaced part on the basis of the number of times of operations of the section to which the replaced part belongs, followed by storing and accumulating the calculated result in the database 100 as actual maintenance data (step S54A) (described later). Also, the processing section 51 modifies the calculated number of times of operations depending on load, and then stores and accumulates the number of times of operations having been modified depending on load, as actual maintenance data, in the database 100 (step S55) (described later).

Subsequently, the processing section 51 reads the latest actual maintenance data, computes distribution data of the number of replaced parts with respect to the number of times of operations having been modified depending on load, and prepares a distribution graph of the number of replaced parts based on the computed distribution data (step S56A) (described later).

FIG. 28 shows how the actual maintenance data for the number of times of operations and the renewing mileage data are stored in the database 100.

In FIG. 28, the database 100 contains an actual maintenance database per machine model and number, where the actual number of times of operations during the replacement time interval of each of parts, which have been replaced in the past, and the number of times of operations having been modified depending on load are stored per machine model and number as accumulative values on the basis of the number of times of operations of the section to which the relevant part belongs. In an illustrated example, $S_{FB}(1)$ and $S_{FB}(L)$ represent respective accumulative values for the number of times of front operations regarding the first and L-th bucket prongs of a No. N machine of model A (e.g., 6800 times and 25000 times). $S'_{FB}(1)$ and $S'_{FB}(L)$ represent respective accumulative values for the number of times of front operations, which has been modified depending on load, regarding the same bucket prongs (e.g., 6200 times and 21200 times). $S_{TL}(1)$ and $S_{TL}(M)$ represent respective accumulative values for the number of times of travel operations regarding the first and M-th travel links of the No. N machine (e.g., 1610 times and 10200 times). $S'_{TL}(1)$ and $S'_{TL}(M)$ represent respective accumulative values for the number of times of travel operations, which has been modified depending on load, regarding the same travel links (e.g., 1820 times and 11800 times). Similar data is also stored for a No. N+1 machine, a No. N+2 machine, . . . of model A.

In the renewing database per machine model and number, the mileages of the old hydraulic excavators, which have been renewed in the past, are stored per machine model and number. In an illustrated example, $D_x(1)$ represents the mileage (e.g., 3200 Km) of a No. 1 machine of model A until renewing thereof, and $D_x(L)$ represents the mileage (e.g., 3000 Km) of a No. L machine of model A until renewing thereof. Similar data is also stored for all machines of other models B, C, . . . .

Figure 29:
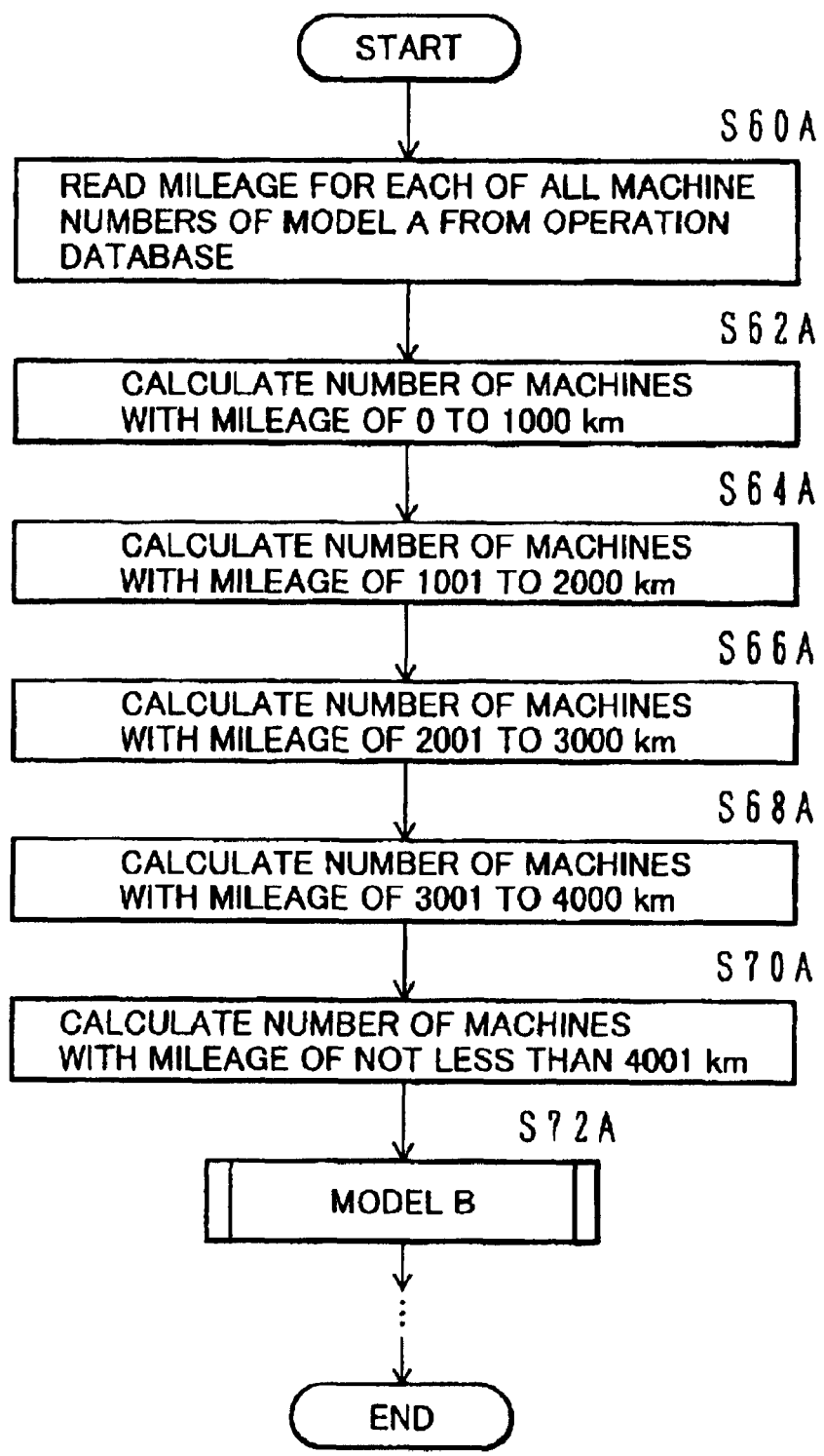
FIG. 29 is a flowchart showing procedures for obtaining distribution data of the number of operated machines with respect to the mileage per model.

FIG. 29 is a flowchart showing details of the processing, in step S36A of FIG. 24, to obtain distribution data of the number of operated machines versus the mileage per model. The processing section first reads the mileages of all machines of model A from the operation database (step S60A). Then, it divides the mileage into a unit zone of 1000 Km, and calculates the number of hydraulic excavators in each unit zone of the mileage. More specifically, the number of hydraulic excavators is calculated for each unit zone of the mileage, i.e., for each unit zone of 0 to 1000 Km, 1001 to 2000 Km, 2001 to 3000 Km, 3001 to 4000 Km, and not less than 4001 Km (steps S62A to S70A).

Likewise, for all machines of other models B, C, . . . , the number of hydraulic excavators is calculated for each 1000-Km zone of the mileage (step S72A).

Figure 30:
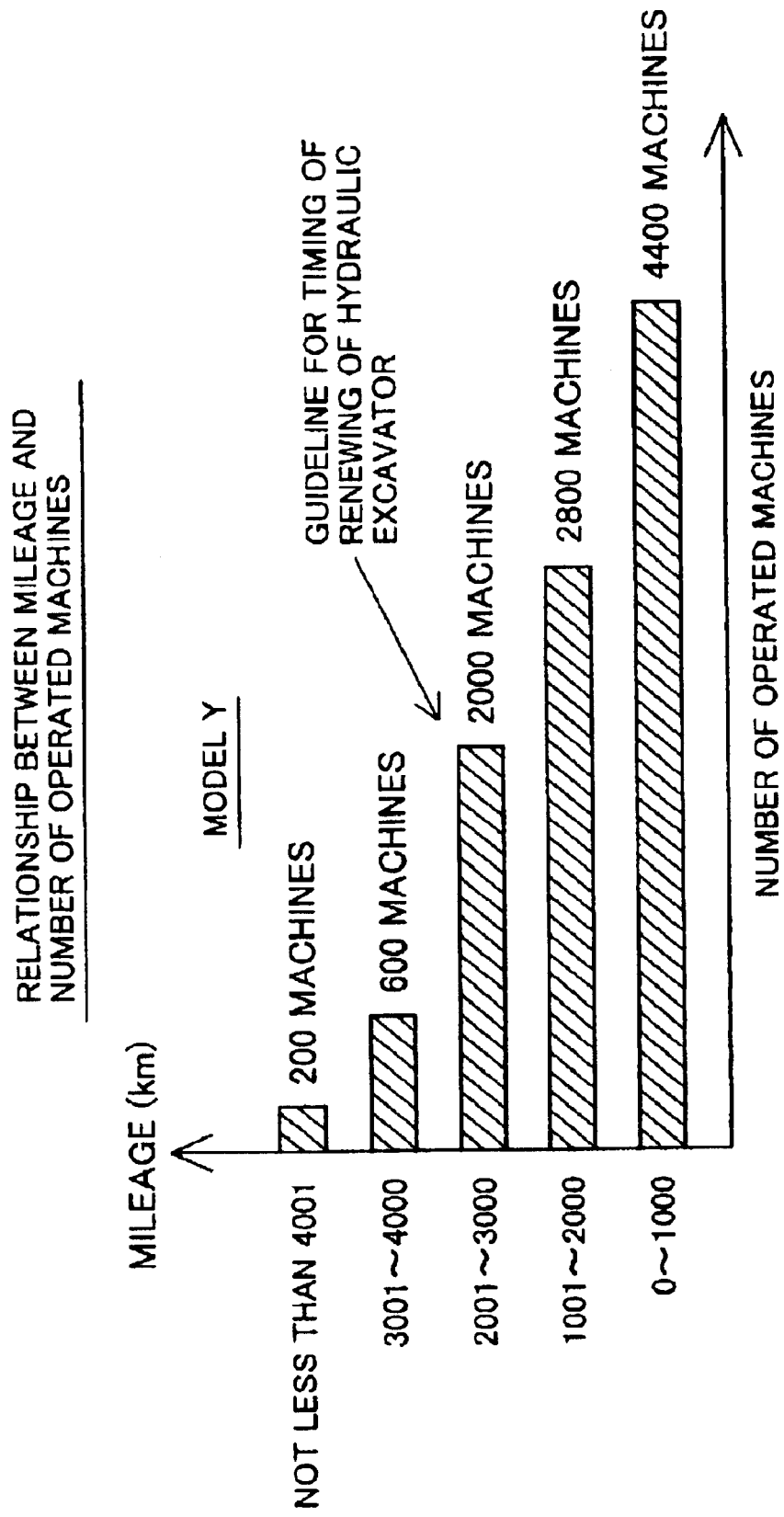
FIG. 30 shows one example of a distribution graph of the number of operated machines with respect to the travel time of hydraulic excavators of model Y.

FIG. 30 shows, by way of example, a distribution graph of the number of operated machines with respect to the mileages of hydraulic excavators of model Y. The horizontal axis of FIG. 30 indicates the number of operated hydraulic excavators, and the vertical axis indicates the mileage of the hydraulic excavator.

Figure 31:
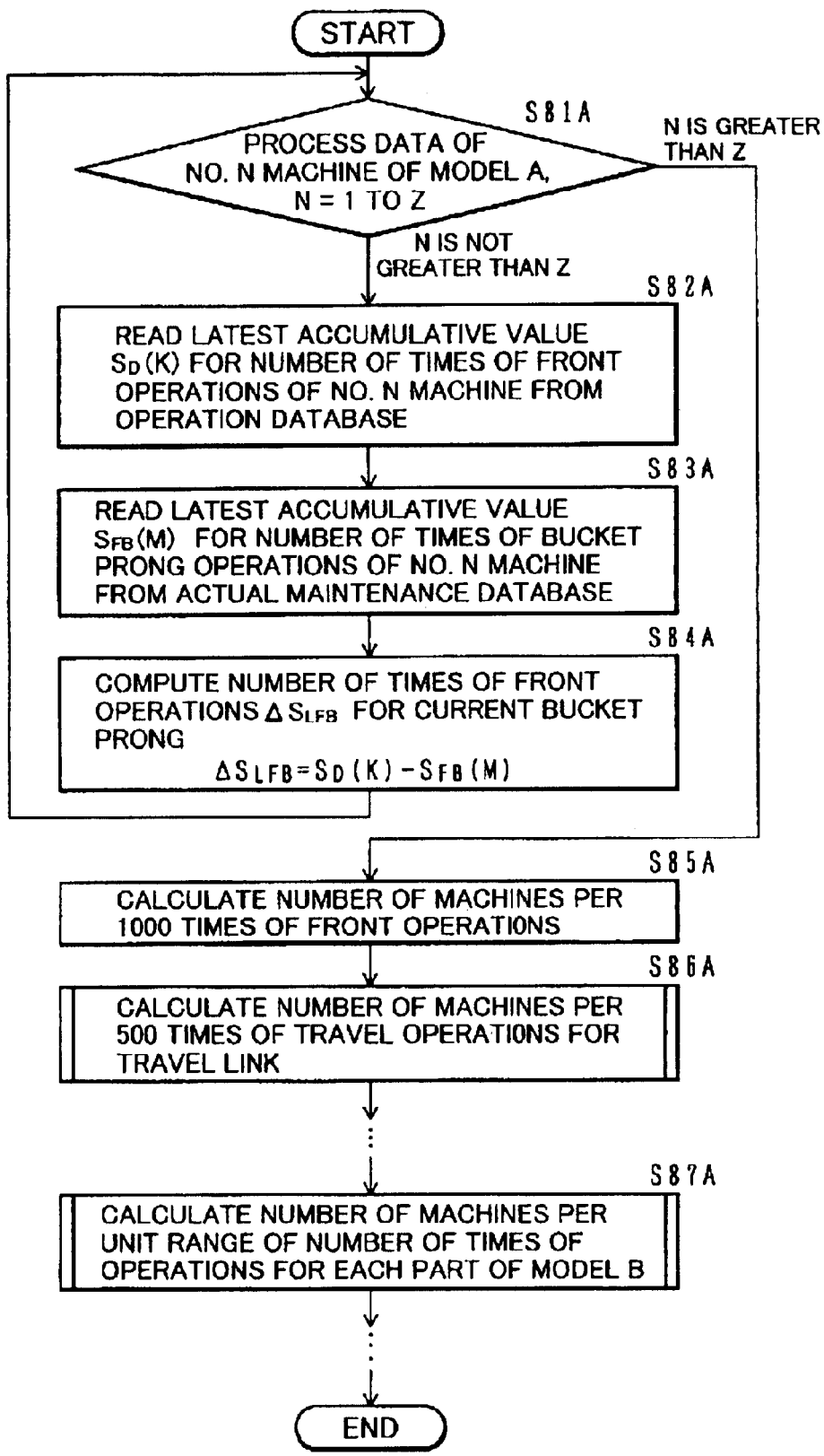
FIG. 31 is a flowchart showing details of processing, in step S36A of FIG. 24, to compute distribution data of the number of times of operations and the number of operated machines per part.

FIG. 31 is a flowchart showing details of the processing, in step S36A of FIG. 24, to obtain distribution data of the number of operated machines versus the number of times of operations per part. For processing all data of No. 1 to Z machines of model A, the processing section first determines whether the machine number N is not greater than Z (step S81A). If N is not greater than Z, the processing section reads the latest accumulative value $S_D(K)$ for the number of times of front operations of the No. N machine of model A from the operation database shown in FIG. 25 (step S82A). Subsequently, it reads the latest accumulative value $S_{FB}(M)$ for the number of times of bucket-prong operations of the No. N machine from the actual maintenance database shown in FIG. 28 (step S83A), and calculates the number of times of front operations $\Delta S_{LFB}$ regarding the bucket prong, which is currently used, based on the following formula (step S84A):

$$\Delta S_{LFB} = S_D(K) - S_{FB}(M)$$

Then, the above-described processing is executed for all machines of No. 1 to Z, thereby calculating the number of times of front operations $\Delta S_{LFB}$ regarding the bucket prong, which is currently used, for all hydraulic excavators of model A.

Thereafter, the processing section divides the number of times of front operations $\Delta S_{LFB}$ regarding the bucket prong into a unit zone of 1000 times, and calculates the number of hydraulic excavators in each unit zone of the number of times of operations. More specifically, the number of hydraulic excavators is calculated for each unit zone of the number of times of front operations, i.e., for each unit zone of 0 to 1000 times, 1001 to 2000 times, 2001 to 3000 times, 3001 to 4000 times, and not less than 4001 times, thereby obtaining distribution data of the number of operated machines (step S85A).

Also, for the travel link of each hydraulic excavator of model A, the processing section calculates the number of times of operations for each travel link (number of times of travel operations) and obtains distribution data of the number of operated machines per 500 times (step S86A). Then, it calculates the number of times of operations for each of other parts in a similar manner, thereby obtaining distribution data of the number of operated machines for each predetermined unit zone of the number of times of operations.

Likewise, for each of all parts of other models B, C, . . . , the number of times of operations is calculated to obtain distribution data of the number of operated machines for each predetermined unit zone of the number of times of operations (step S87A).

After thus computing the distribution data of the number of operated machines versus the number of times of operations per the machine model and number, a distribution graph of the number of operated machines is prepared and outputted to the in-house computer through the processing of steps S38A and S40A shown in FIG. 24.

Figure 32:
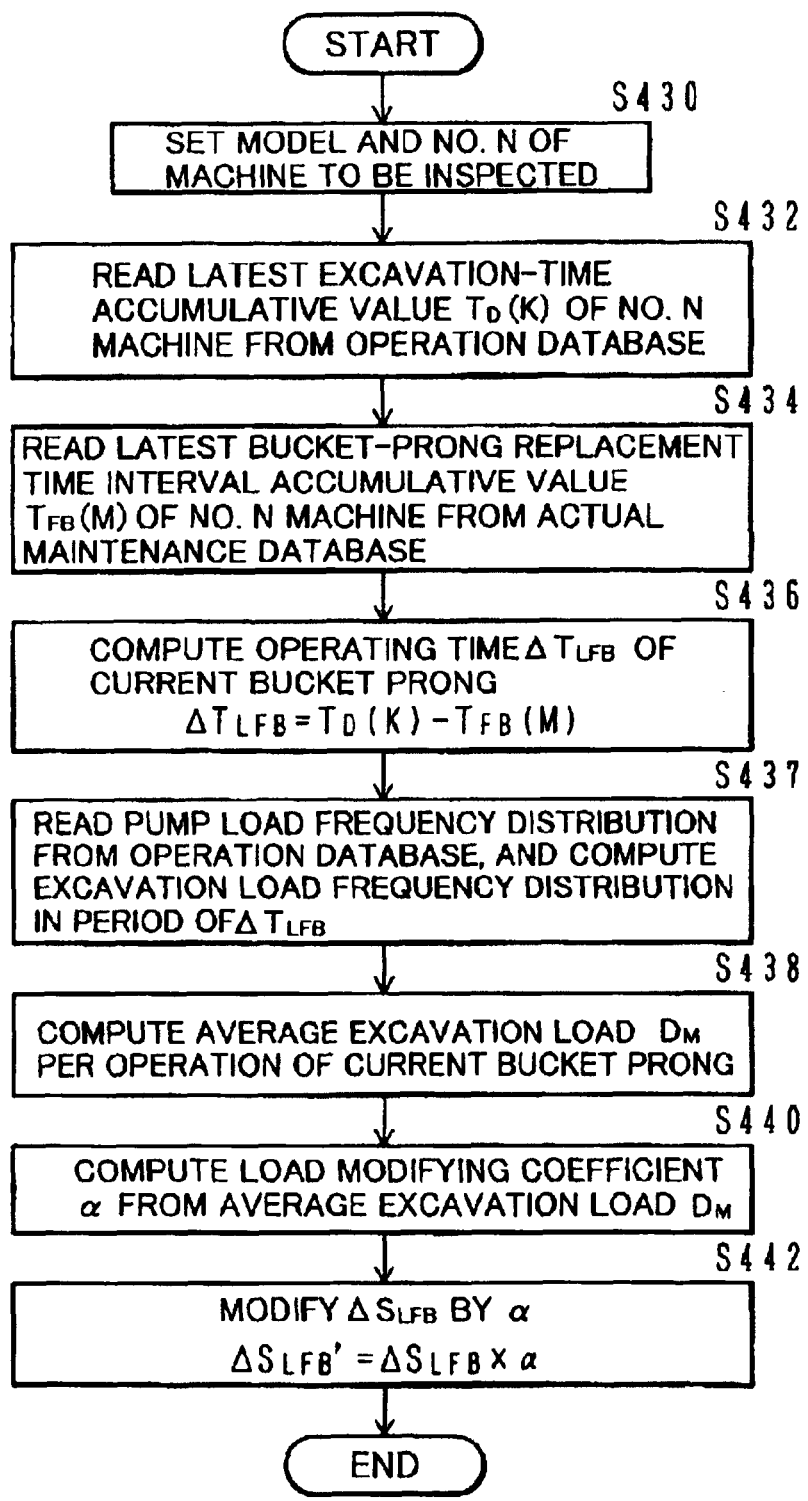
FIG. 32 is a flowchart showing details of processing, in step S42A of FIG. 24, to modify the number of times of operations depending on load and obtaining distribution data of the number of times of operations and the number of operated machines per part, which have been both modified depending on load.

FIG. 32 is a flowchart showing details of the processing, in step S42A of FIG. 24, to modify the number of times of operations per part depending on load and to obtain distribution data of the number of operated machines versus the number of times of operations having been modified depending on load.

In FIG. 32, the processing section first sets the machine model and number (e.g., N) of a hydraulic excavator to be inspected (step S430). Then, it reads the latest accumulative value $T_D(K)$ of the excavation time of the No. N machine of the set model from the operation database shown in FIG. 10 (step S432). Also, it reads the latest accumulative value $T_{LFB}(M)$ of the bucket-prong replacement time interval of the No. N machine of the set model from the actual maintenance database shown in FIG. 10 (step S434). Subsequently, it calculates the operating time (front operating time) $\Delta T_{LFb}$ of the bucket prong, which is currently used, based on the following formula (step S436):

$$\Delta T_{LFB} = T_D(K) - T_{FB}(M)$$

Then, data of the pump load frequency distribution is read out of the front operation area of the operation database, shown in FIG. 25, to compute a frequency distribution of front-operation load (frequency distribution of excavation load) during the operating time $\Delta T_{LFB}$ of the current bucket prong (step S437). Subsequently, an average excavation load $D_M$ per operation of the current bucket prong is calculated (step S438). That calculation is executed, by way of example, as follows.

Figure 33:
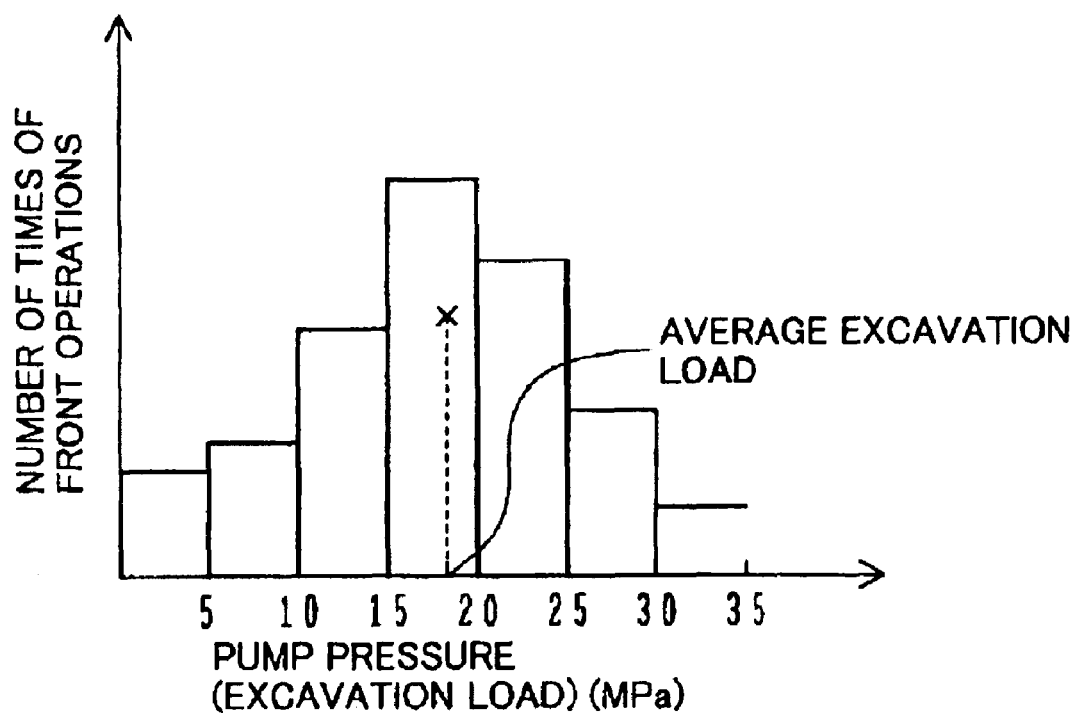
FIG. 33 is a graph showing a load frequency distribution computed in step S437 of FIG. 32.

FIG. 33 is a graph showing the load frequency distribution computed in step 437. From the load frequency distribution of FIG. 33, the average excavation load $D_M$ is determined by calculating the products of respective pump pressures and the number of times of front operations, and then dividing the sum of those products by the number of times of front operations, thereby determining the average excavation load per operation. As an alternative, the average excavation load $D_M$ may be determined by obtaining the position of the center of gravity (mark x) of an integral value of the load frequency distribution shown in FIG. 33, and setting the pump pressure at the position of the center of gravity as $D_M$.

After obtaining the average excavation load $D_M$ for the current bucket prong in step S438 as described above, a load modifying coefficient α is derived from the average excavation load $D_M$ (step S440). That process is executed using the preset relationship between the average excavation load $D_M$ and the load modifying coefficient α, which is shown, by way of example, in FIG. 34.

Figure 34:
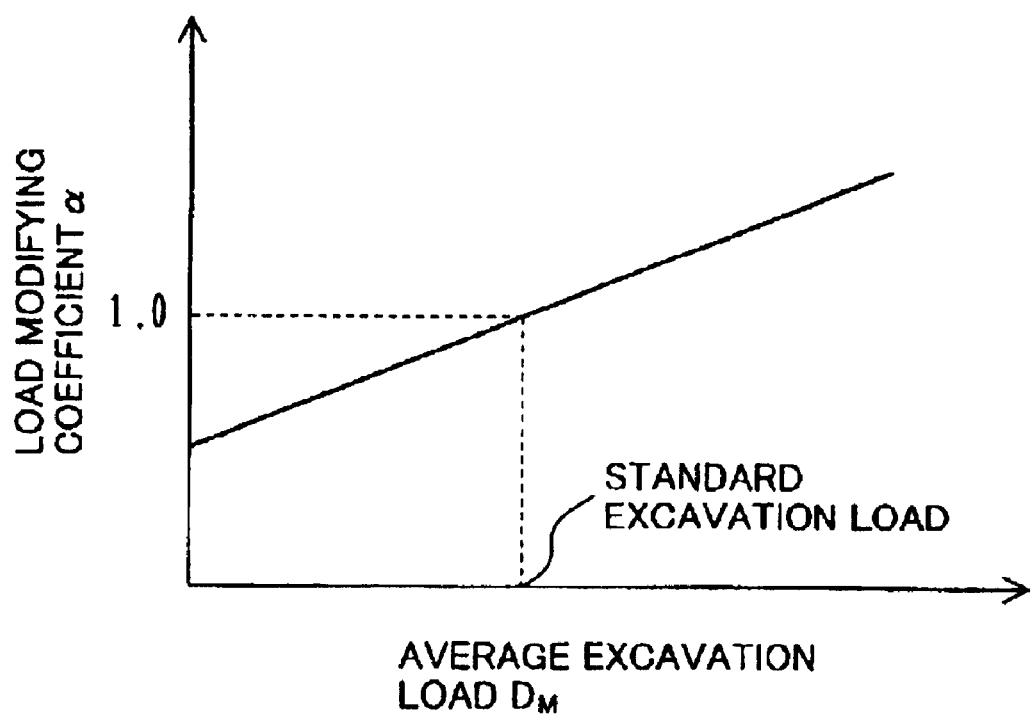
FIG. 34 is a graph showing the preset relationship between an average excavation load $D_H$ and a load modifying coefficient $\alpha$.

In FIG. 34, the relationship between the average excavation load $D_M$ and the load modifying coefficient α is set such that α=1 is held when $D_M$ is a standard load, but α is gradually increased from 1 as $D_M$ increases from the standard load, and α is gradually decreased as $D_M$ decreases from the standard load.

After obtaining the load modifying coefficient α as described above, the number of times of operations $\Delta S_{LFB}$ of the current bucket prong is modified with the load modifying coefficient α, thereby obtaining the modified number of times of operations $\Delta S'_{LFB}$ as given below (step S442):

$$\Delta S'_{LFB} = \Delta S_{LFB} \times \alpha$$

After thus computing distribution data of the number of operated machines with respect to the number of times of operations per part, which has been modified depending on load, a distribution graph of the number of operated machines is prepared and outputted to the in-house computer through the processing of steps S43A and S40A shown in FIG. 24.

Figure 35:
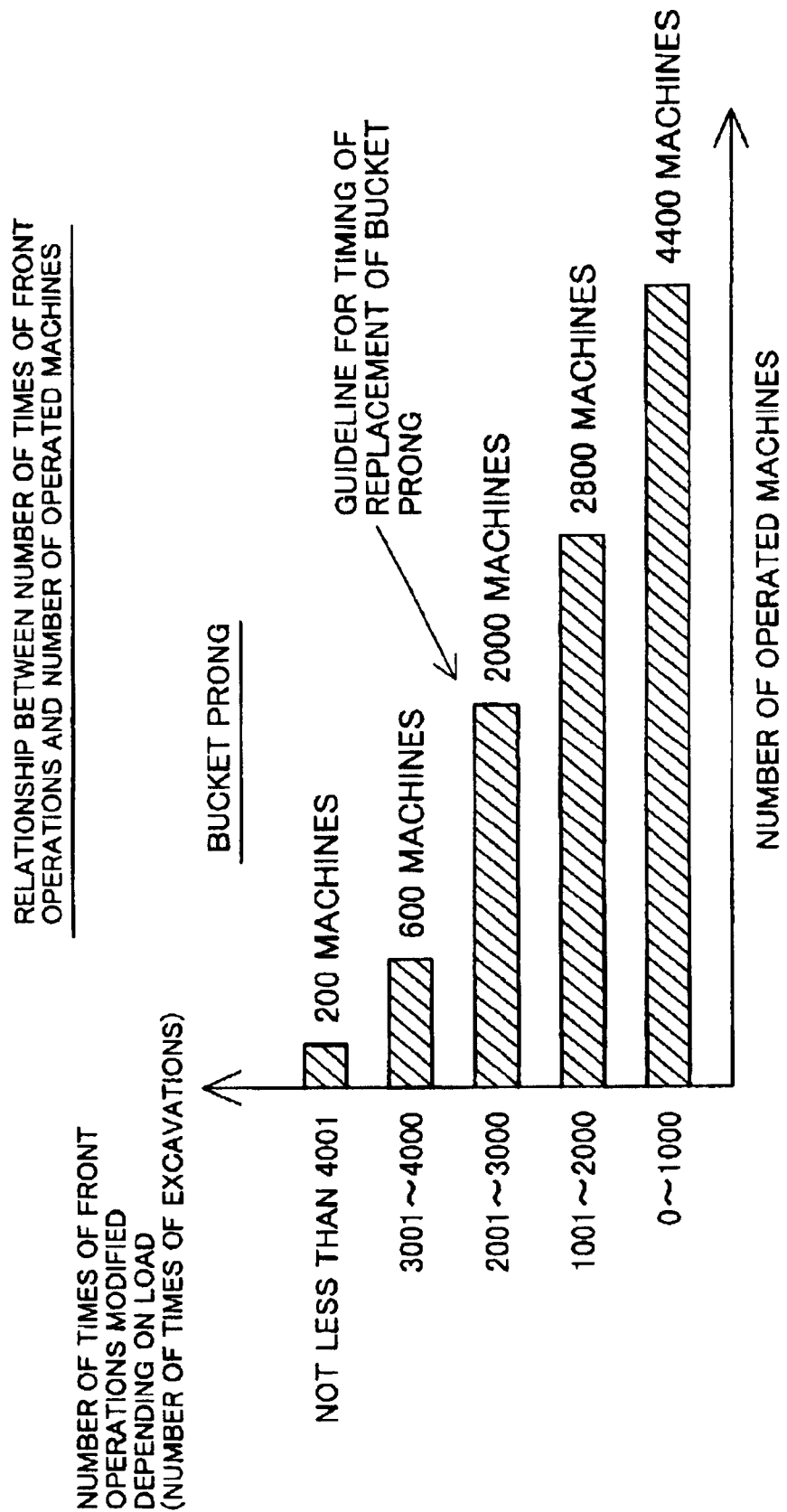
FIG. 35 shows one example of a distribution graph of the number of operated machines with respect to the number of times of front operations regarding bucket prongs.
Figure 36:
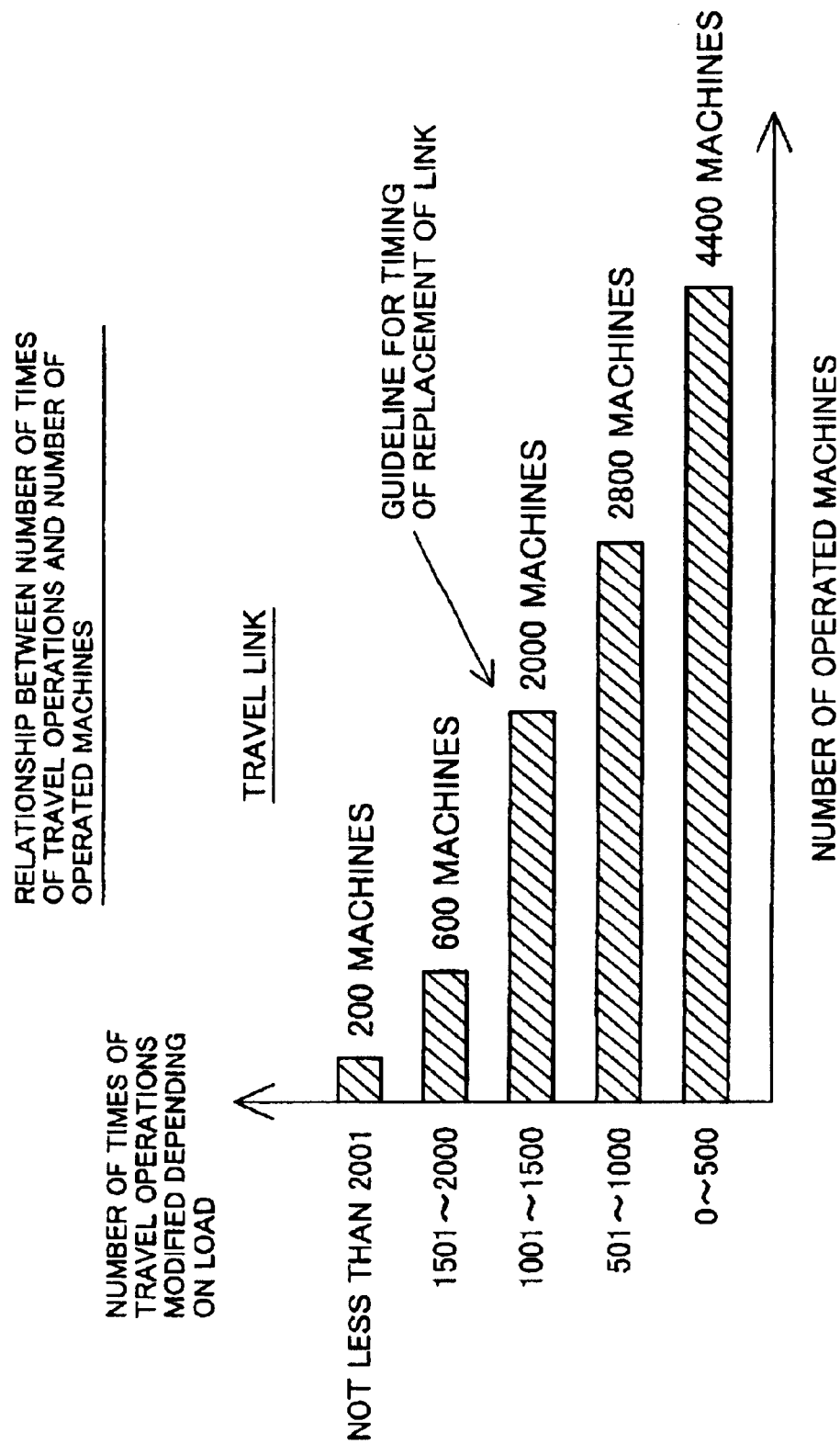
FIG. 36 shows one example of a distribution graph of the number of operated machines with respect to the number of travel operations regarding travel links.

FIG. 35 shows one example of a distribution graph of the number of operated machines with respect to the number of times of front operations having been modified depending on load, and FIG. 36 shows one example of a distribution graph of the number of operated machines with respect to the number of times of travel operations having been modified depending on load. In FIGS. 35 and 36, the horizontal axis indicates the number of operated hydraulic excavators, and the vertical axis indicates the number of times of front operations and the number of times of travel operations, which have been modified depending on load, respectively.

Figure 37:
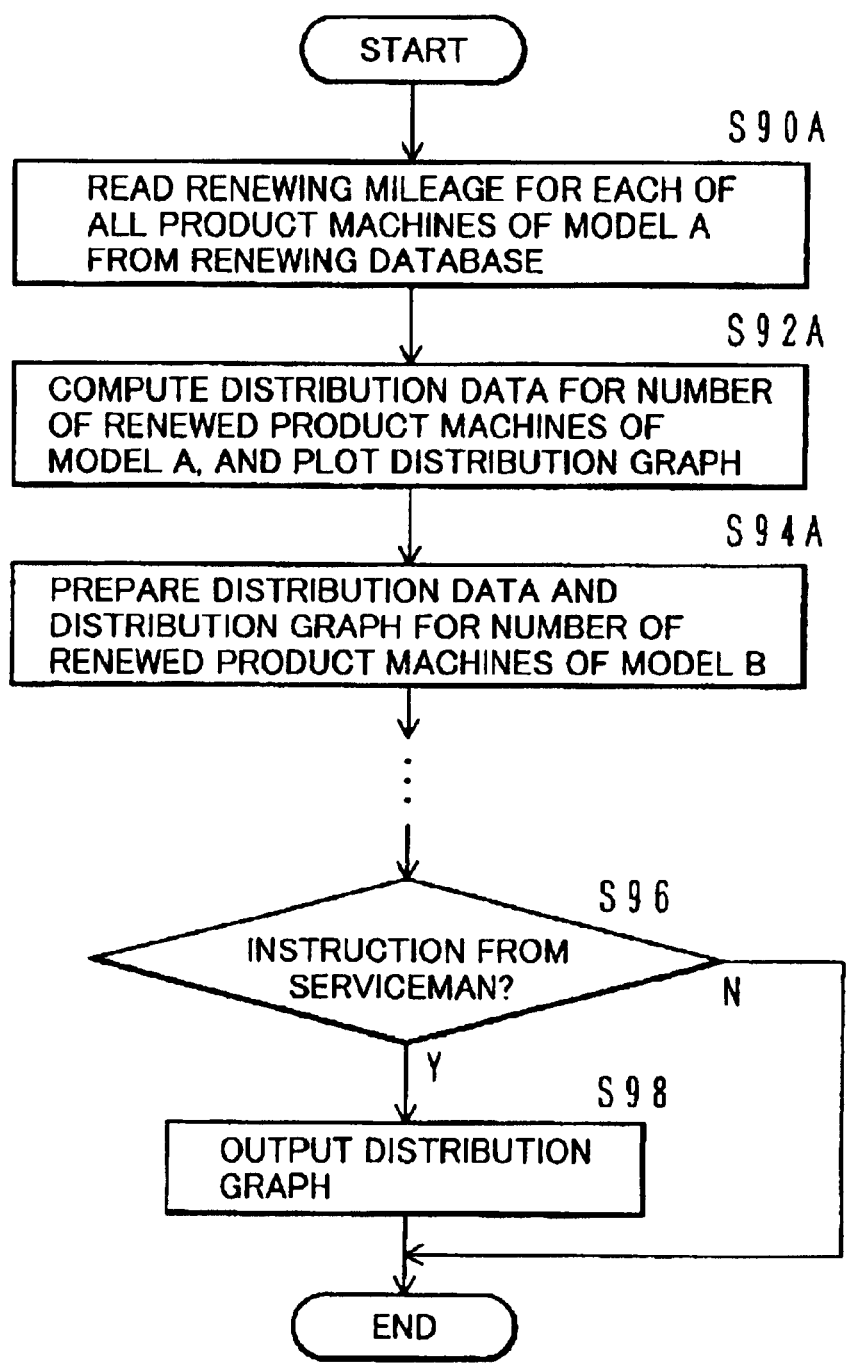
FIG. 37 is a flowchart showing procedures, in step S47A of FIG. 26, for computing distribution data of the number of renewed machines with respect to the mileages of hydraulic excavators which have been renewed in the past, and for plotting a distribution graph.

FIG. 37 is a flowchart showing details of the processing, in step S47A of FIG. 26, to prepare distribution data and a distribution graph of the number of renewed machines. The processing section first reads the mileages until renewing of all machines of model A from the renewing database shown in FIG. 28 (step S9OA). Then, it computes distribution data of the number of renewed product machines with respect to the mileage from the read mileage data, and prepares a distribution graph of the number of renewed product machines based on the computed data (step S92A). Likewise, for all machines of other models B, C, . . . , distribution data of the number of renewed product machines is computed and a distribution graph is prepared (step S94A). The processing section then waits for an instruction from the serviceman (step S96A). If there is an instruction, the thus-prepared distribution graph of the number of renewed product machines is outputted to the in-house computer (step S98A).

Figure 38:
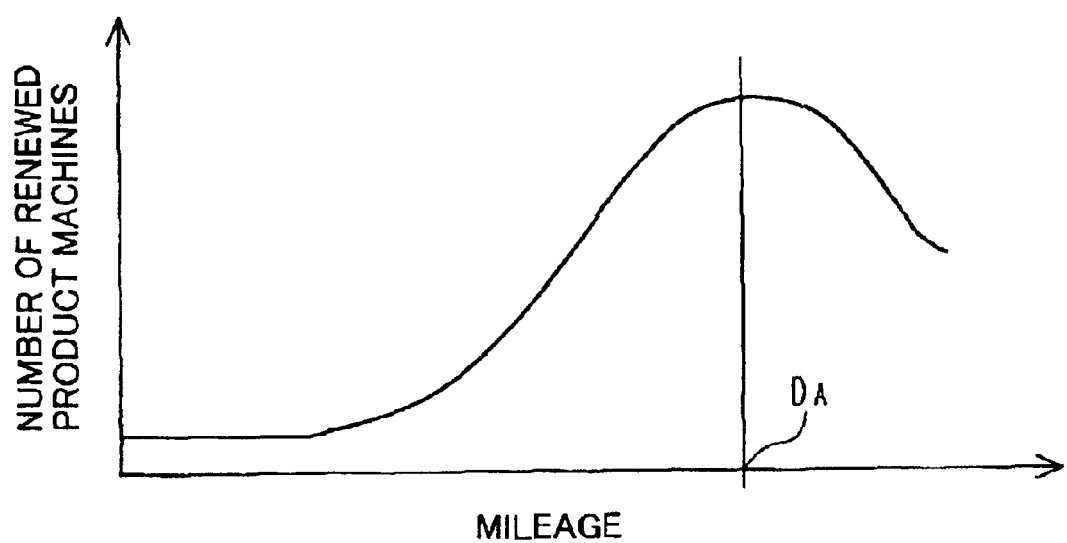
FIG. 38 shows one example of a distribution graph of the number of renewed machines with respect to the mileages of hydraulic excavators which have been renewed in the past.

FIG. 38 shows one example of a distribution graph of the number of renewed product machines with respect to the mileage of the hydraulic excavator. The horizontal axis of FIG. 38 indicates the mileage of the hydraulic excavator, and the vertical axis indicates the number of renewed product machines. Additionally, $D_A$ indicates a mileage near the maximum number of renewed product machines in the distribution graph, i.e., an average mileage.

Figure 39:
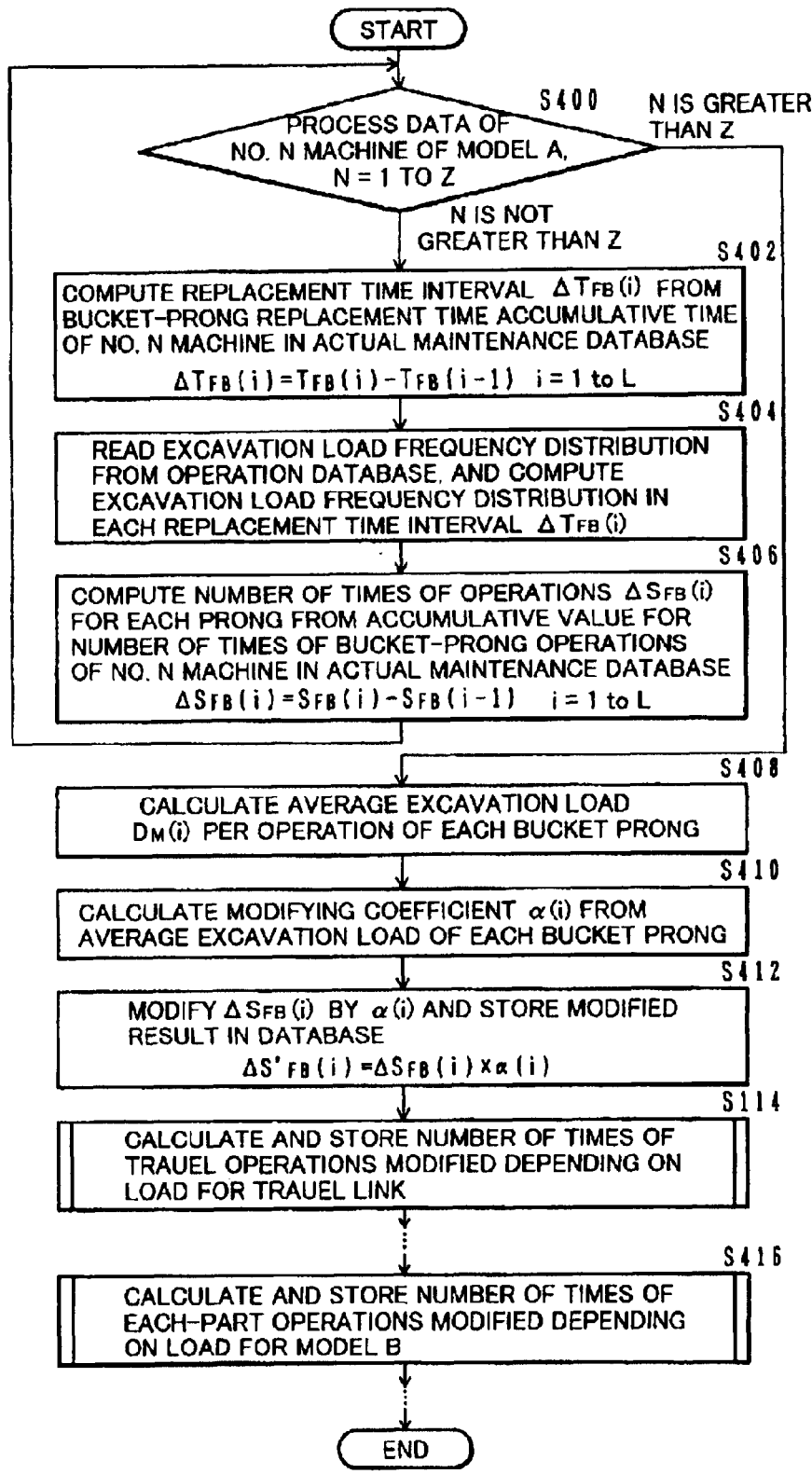
FIG. 39 is a flowchart showing details of processing, in step S55 of FIG. 27, to modify the number of times of operations for each replaced part depending on load and to store the modified result.

FIG. 39 is a flowchart showing details of the processing, in step S55 of FIG. 27, to modify and store the number of times of operations of a replaced part depending on load. For processing all data of No. 1 to Z machines of model A, the processing section first determines whether the machine number N is not greater than Z (step S400). If N is not greater than Z. it accesses an area of the actual maintenance database, shown in FIG. 10, where the bucket-prong replacement time intervals of the No. N machine are stored, and computes the replacement time interval $\Delta T_{FB}(i)$ from the accumulative value included in that database area based on the following formula (step S402):

$$\Delta T_{FB}(i) = T_{FB}(i) - T_{FB}(i-1)$$

i=1 to L (L is the number of times of replacements of No. N machine's bucket)

Herein, the replacement time interval $\Delta T_{FB}(i)$ of the bucket prong is given as a value on the basis of the front operating time (excavation time).

Then, data of the pump load frequency distribution of the No. N machine of model A is read out of the front operation area of the operation database, shown in FIG. 25, to compute a frequency distribution of excavation load in each replacement time interval $\Delta T_{FB}(i)$ of the bucket prong (step S404). That frequency distribution can be computed in the same manner as when computing the frequency distribution shown in FIG. 33 except that the excavation operating time is substituted for the replacement time interval $\Delta T_{FB}(i)$.

Subsequently, the processing section accesses an area of the actual maintenance database, shown in FIG. 28, where the number of times of bucket-prong operations of the No. N machine is stored, and computes the number of times of bucket-prong operations $\Delta S_{FB}(i)$ in each replacement time interval $\Delta T_{FB}(i)$ of the bucket prong from the accumulative value included in that database area based on the following formula (step S406):

$$\Delta S_{FB}(i) = S_{FB}(i) - S_{FB}(i-1)$$

i=1 to L (L is the number of times of replacements of No. N machine's bucket prong)

The above-mentioned processing is repeated for all machines of No. 1 to Z, thereby collecting data of the excavation load frequency distribution and the number of times of bucket-prong operations $\Delta S_{FB}(i)$ in each replacement time interval $\Delta T_{FB}(i)$ of the bucket prong for all hydraulic excavators of model A.

Subsequently, an average excavation load $D_M(i)$ per operation of each bucket prong is calculated for the replacement time interval $\Delta T_{FB}(i)$ (step S408). and a load modifying coefficient α(i) is derived from the average excavation load $D_M(i)$ (step S410). That process is executed in essentially the same manner as the processing in steps S438, S440 of the flowchart shown in FIG. 32. Then, the number of times of operations $\Delta S_{FB}(i)$ of each bucket prong, computed in step S406, is modified with the load modifying coefficient α(i), thereby obtaining the modified number of times of operations $\Delta S'_{FB}(i)$ as given below, which is stored as distribution data in the database (step S412):

$$\Delta S'_{FB} = \Delta S_{FB} \times \alpha$$

Likewise, for other parts such as a travel link, distribution data of the number of times of operations having been modified depending on load is computed and stored in the database (step S114). Further, for parts of all hydraulic excavators of other models B, C, ..., distribution data of the number of times of operations having been modified depending on load is computed and stored in the database in a similar manner (step S116).

Figure 40:
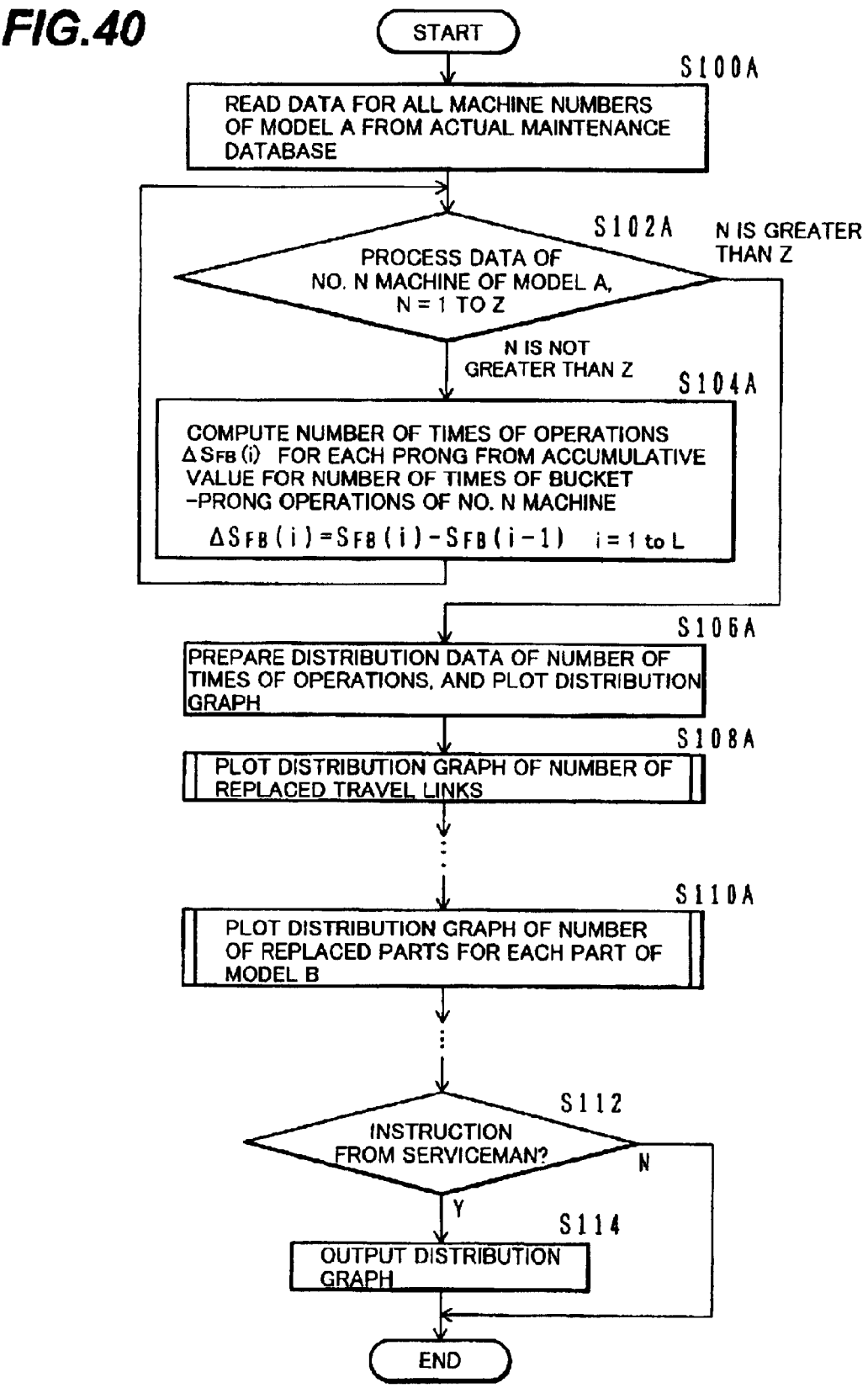
FIG. 40 is a flowchart showing procedures, in step S56A of FIG. 27, for computing distribution data of the number of replaced parts with respect to the number of times of operations, which has been modified depending on load, and for plotting a distribution graph.

FIG. 40 is a flowchart showing details of the processing, in step S56A of FIG. 27, to compute distribution data of the number of replaced parts with respect to the number of times of operations, which has been modified depending on load, and to plot a distribution graph.

In FIG. 40, the processing section first reads the maintenance data for all machines of model A from the actual maintenance database shown in FIG. 28 (step S100A). Then, for processing all data of No. 1 to Z machines of model A, it determines whether the machine number N is not greater than Z (step S102A). If N is not greater than Z, it computes the number of times of front operations $\Delta S_{FB}(i)$ of the bucket prong, for example, from the accumulative value of the number of times of bucket-prong operations, which is included in the read data of the No. N machine, based on the following formula (step S104A);

$$\Delta S_{FB}(i) = S_{FB} - S_{FB}(i-1)$$

i=1 to L (L is the number of times of replacements of No. N machine's bucket prong)

The above-mentioned processing is repeated for all machines of No. 1 to Z, thereby collecting data of the number of times of front operations $\Delta S_{FB}$ of each bucket prong for all hydraulic excavators of model A.

After completing data collection of the number of times of front operations $\Delta S_{FB}$ of each bucket prong for all hydraulic excavators as described above, the processing section computes, using the collected data, distribution data of the number of replaced parts with respect to the number of times of front operations, and prepares a distribution graph of the number of replaced parts based on the computed data (step S106A). Likewise, for other parts such as a travel link, distribution data of the number of replaced parts is computed and a distribution graph is prepared (step S108A). Further, for all hydraulic excavators of other models B, C, ..., distribution data of the number of replaced parts is computed and a distribution graph is prepared in a similar manner (step S110A). Then, as with the first embodiment, the processing section waits for an instruction from the serviceman (step S112). If there is an instruction, the thus-prepared distribution graph of the number of replaced parts is outputted to the in-house computer (step S114).

Figure 41:
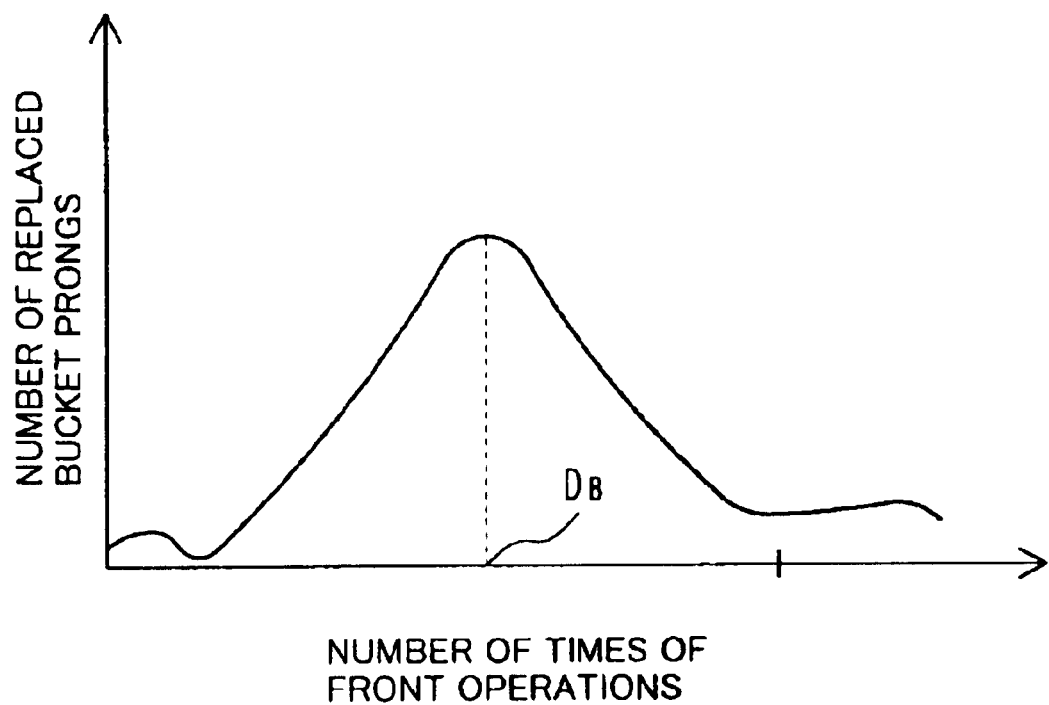
FIG. 41 shows one example of a distribution graph of the number of replaced bucket prongs with respect to the number of times of front operations.

FIG. 41 shows one example of a distribution graph of the number of bucket prongs, which have been replaced in the past, with respect to the number of times of front operations. The horizontal axis of FIG. 41 indicates the number of times of front operations, and the vertical axis indicates the number of renewed bucket prongs. Additionally, $D_B$ indicates the number of times of front operations near the maximum number of replaced parts in the distribution graph, i.e., an average number of times of front operations.

With this embodiment thus constructed, the number of hydraulic excavators to be renewed and the number of parts to be replaced can be estimated from FIGS. 38 and 41 as with the first embodiment.

Therefore, this embodiment also makes it possible to estimate the number of hydraulic excavators to be renewed and the number of parts to be replaced, by employing the mileage and the number of times of operations as the operation status. As a result, a maker of hydraulic excavators can adequately set up production plans of hydraulic excavators and parts thereof. Also, with setting-up of adequate production plans, inventory management can be properly performed and the occurrence of overstocked inventories or insufficient supply of products can be minimized. Furthermore, for a rental company possessing hydraulic excavators, the company can adequately set up plans about the number of hydraulic excavators to be purchased and the number of trade-in hydraulic excavators, as well as plans about the number of parts to be purchased. Consequently, easier planning of a budget and proper management of assets can be realized.

Moreover, in a construction machine such as a hydraulic excavator, not only the operation status but also the load differ from one to another section, and the life (replacement time interval) of each part varies depending on the amount of load of each section as well. In this embodiment, the load for each section is measured in addition to the operation status (number of times of operations) for each section, and stored and accumulated as operation data in the database 100 inside the base station computer 3. Then, the operation status (number of times of operations) is modified depending on the amount of load, and the load-dependent modified operation status (number of times of operations) is employed to estimate the number of repaired/replaced parts which belong to each section. It is therefore possible to correct a variation in the life caused by a difference in load, and to more precisely estimate the number of hydraulic excavators to be renewed.

While the number of times of operations of each section is modified depending on load in the second embodiment, the mileage may also be modified depending on load. With that modification, it is also possible to correct a variation in the renewing timing of hydraulic excavators caused by a difference in load, and to more precisely estimate the number of hydraulic excavators to be renewed.

Further, while the operating time of the hydraulic excavator and the operating time per section are employed, as they are, in the first embodiment, either operating time may be modified depending on load similarly to the number of times of operations in the second embodiment, which results in improved accuracy of the estimation.

A third embodiment of the present invention will be described with reference to FIGS. 42 to 44. This embodiment is intended to estimate the number of renewed machines by using a repurchase judgment time, which is separately preset, instead of the average operating time.

The overall construction of a system for managing a construction machine according to this embodiment is the same as that in the first embodiment, and has a similar system configuration to that in the first embodiment shown in FIGS. 1 to 3. Also, the machine side controller 2 and the base station center server 3 have the same processing functions as those described above with reference to FIGS. 4 to 26 except for the following points. A description is now made of points differing from the first embodiment.

Figure 42:
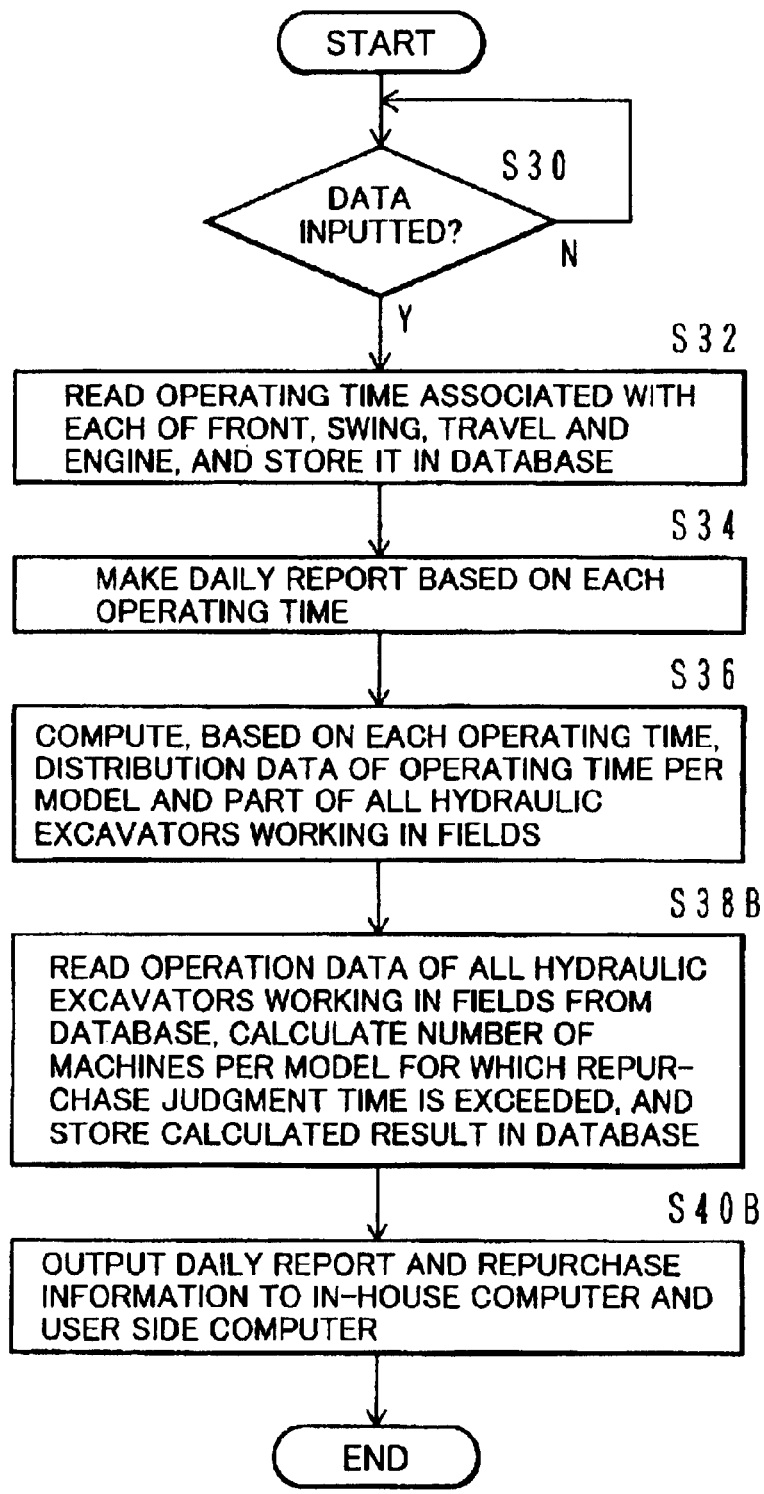
FIG. 42 is a flowchart showing the processing function of the machine body/operation information processing section in the base station center server of the system for managing a construction machine according to the second embodiment of the present invention.

FIG. 42 is a flowchart showing the processing function of the machine body/operation information processing section 50 in the center server 3 according to this embodiment.

In FIG. 42, the processing of steps S30 to S36 is the same as that in the first embodiment shown in FIG. 7.

After computing distribution data of the operating time in step S36, the processing section 50 reads operation data of all hydraulic excavators, which are currently working in fields, from the operation database area, shown in FIG. 10, of the database 100, calculates the number of hydraulic excavators per model in which the operating time exceeds the repurchase judgment time, and then stores the calculated result as repurchase information in the database 100 (step S38B). The thus-prepared repurchase information is transmitted to the in-house computer 4 along with the daily report, while the daily report is transmitted to the user side computer 5 (step S40B). FIG. 43 shows one example of the repurchase information transmitted to the in-house computer 4.

The repurchase judgment time can be decided, for example, as follows.

Figure 44:
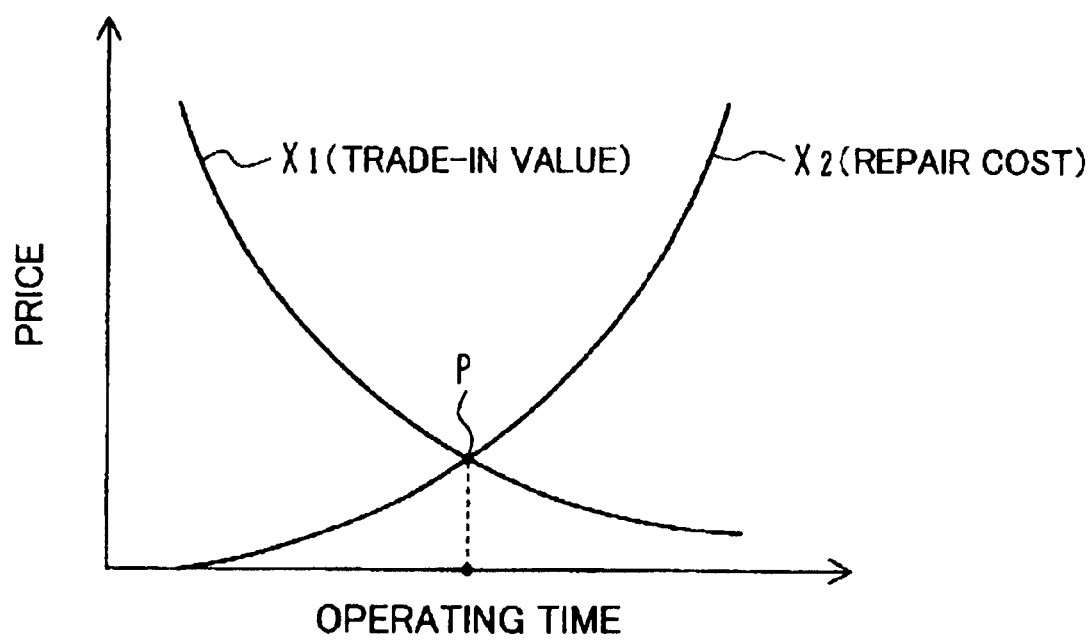
FIG. 44 is a graph showing the relationship between a trade-in value curve and a repair cost curve, which is used to judge the repurchase decision timing.

Generally, in construction machines such as hydraulic excavators, as the operating time increases, the trade-in value reduces, but the repair cost increases, as shown in FIG. 44. Therefore, it can be basically said that a crossed point P between a trade-in value curve X1 and a repair cost curve X2 represents the optimum repurchase timing. It is hence preferable to recommend a repurchase to a user a little before the optimum repurchase timing. The repurchase judgment time is set in consideration of the above. However, the curves shown in FIG. 44 represent standard cases, and the trade-in value and the repair cost vary depending on, e.g., the state of a construction machine. Accordingly, the repurchase judgment time is desirably set in consideration of such a variation as well. As an alternative, the optimum repurchase timing may be decided by dispatching servicemen to various places for examining the states of hydraulic excavators, and by taking into account the examined results in addition to the operating time. Then, the repurchase judgment time may be set based on the optimum repurchase timing thus decided. Further, since the trade-in value curve and the repair cost curve differ among model types, the repurchase judgment time is set to different values depending on model types.

According to this embodiment, as with the first embodiment, it is also possible to precisely estimate the sales quantity of hydraulic excavators and hence to adequately set up a production plan of hydraulic excavators.

Also, the fact that the operating time of a hydraulic excavator exceeds the repurchase judgment time means that the timing of recommending a repurchase of the hydraulic excavator is reached. Based on the result obtained in step S38B, therefore, the serviceman can start a sales campaign for promotion of the sales.

In the first and second embodiments, the number of replaced parts is estimated directly from the operation data of parts that have been replaced. For parts that require repair (including overhaul), such as an engine and a hydraulic pump, however, the number of replaced parts may be estimated by first estimating the number of parts to be repaired, and then estimating, from the number of repaired parts, the number of parts to be replaced in the repair. With that modification, since the number of replaced parts can be estimated, it is possible to estimate the manpower required for the repair, and to set up a personnel plan.

Also, in the above description of the first and second embodiments, when calculating the number of machines and the number of parts in which the operation status (operating time) exceeds a reference value (average operating time), the calculation and setting of the reference value are manually performed by outputting the distribution graphs shown in FIGS. 17 and 19 or FIGS. 38 and 41. However, those calculation and setting may also be executed in, e.g., the product renewing/part replacement information processing section of the base station center server. With that modification, it is possible to reduce a burden imposed on the human side, and to obtain precise data.

Further, in the above-described embodiments, the center server 3 prepares and transmits the distribution data and the distribution graph of the number of operated machines with respect to the working time of hydraulic excavators working in fields everyday along with preparation and transmission of the daily report. However, the distribution data and the distribution graph are not necessarily prepared and transmitted everyday, or may be performed at different frequencies, for example, such that only the distribution data is prepared everyday and the distribution graph is prepared and transmitted once a week. Alternatively, the distribution data may be automatically prepared in the center server 3, and the distribution graph may be prepared and transmitted using the in-house computer in response to an instruction from the serviceman. Further, both the distribution data and the distribution graph may be prepared and transmitted in response to an instruction from the serviceman.

In the above-described embodiments, the distribution data and the distribution graph of the number of renewed product machines with respect to the operating time of old hydraulic excavators that have been renewed, and the distribution data and the distribution graph of the number of replaced parts with respect to the operating time are prepared each time the product renewing data and the part replacement data are inputted. However, those distribution data and distribution graph may be prepared otherwise, for example, at any other suitable timing collectively.

Moreover, while the engine running time is measured using the engine revolution speed sensor 46, it may be measured by a combination of a timer and a signal resulting from detecting turning-on/off of the engine key switch by the sensor 43. As an alternative, the engine running time may be measured by a combination of a timer and turning-on/off of a power generation signal from an alternator associated with the engine, or by rotating an hour meter with power generated by the alternator.

Additionally, while the information created by the center server 3 is transmitted to the user-side and in-house computers, it may also be returned to the side of the hydraulic excavator 1.

Industrial Applicability

According to the present invention, the sales quantity of construction machines can be precisely estimated, and a productions plan of construction machines can be adequately set up. It is therefore possible to properly perform inventory management of construction machines and to minimize the occurrence of overstocked inventories or insufficient supply of products.

Also, according to the present invention, the sales quantity of parts of construction machines can be precisely estimated, and a productions plan of those parts can be adequately set up. It is therefore possible to properly perform inventory management of parts and to minimize the occurrence of overstocked inventories or insufficient supply of products.

Further, according to the present invention, a rental company possessing hydraulic excavators, the company can adequately set up plans about the number of hydraulic excavators to be purchased and the number of trade-in hydraulic excavators, as well as plans about the number of parts to be purchased. Consequently, easier planning of a budget and proper management of assets can be realized.

What is claimed is:

1. A method for managing a construction machine, the method comprising the steps of:
    a first step (S9-14, S20-24, S30-32) of measuring an operation status for each of a plurality of construction machines (1, 1*a*, 1*b*, 1*c*) working in fields, transferring the measured operation status to a base station computer (3), and then storing and accumulating the measured operation status as operation data in a database (100); and a second step (S36-40, S44-47) of, in said base station computer, statistically processing said operation data, and then producing and outputting estimation data of the number of construction machines to be renewed, the number of renewed construction machines being estimated from said estimation data.

2. A method for managing a construction machine according to claim 1, wherein said second step includes a third step (S36-40, S60-72) of obtaining, as said estimation data, first correlation between the operation status of construction machines currently operated and the number of operated machines based on said operation data, and the number of renewed construction machines is estimated from said first correlation.

3. A method for managing a construction machine according to claim 2, wherein said second step further includes a fourth step (S44-47, S90-98) of obtaining, as said estimation data, second correlation between the operation status of construction machines, which have been renewed in the past, and the number of renewed machines based on both renewing data of the past construction machines and said operation data, and the number of renewed construction machines is estimated by comparing said first correlation with said second correlation.

4. A method for managing a construction machine according to claim 1, wherein said second step includes a fifth step (S36-40, S60-72) of determining, as said estimation data, the number of those ones among construction machines currently operated, in which the operation status exceeds a preset reference value, based on said operation data, and the number of renewed construction machines is estimated from the determined number of machines.

5. A method for managing a construction machine according to claim 4, wherein said reference value is an average operation status ($T_A$; $D_A$) of construction machines that have been renewed in the past.

6. A method for managing a construction machine according to claim 5, wherein said second step further includes a sixth step (S44-47, S90-98) of obtaining correlation between the operation status of construction machines, which have been renewed in the past, and the number of renewed machines based on both renewing data of the past construction machines and said operation data, and said average operation status is represented by a value ($T_A$; $D_A$) obtained from said correlation.

7. A method for managing a construction machine according to claim 1, wherein said operation status is at least one of an operating time and a mileage.

8. A method for managing a construction machine according to claim 4, wherein said operation status is an operating time, and said reference value is a repurchase judgment time obtained from a crossed point (P) between a trade-in value curve (X1) and a repair cost curve (X2).

9. A method for managing a construction machine, the method comprising the steps of:
a first step (S9-14, S20-24, S30-32) of measuring an operation status for each section (12, 13, 15, 21a, 21b, 32) of each of a plurality of construction machines (1, 1a, 1b, 1c) working in fields, transferring the measured operation status to a base station computer (3), and then storing and accumulating the measured operation status as operation data in a database; and
a second step (S36-40, S50-56) of, in said base station computer, statistically processing said operation data, and then producing and outputting estimation data of the number of repaired/replaced parts belonging to each section, the number of repaired/replaced parts belonging to each section being estimated from said estimation data.

10. A method for managing a construction machine according to claim 9, wherein said second step includes a third step (S36-40, S81-87) of obtaining, as said estimation data, first correlation between the operation status for each section of construction machines currently operated and the number of operated machines based on said operation data, and the number of repaired/replaced parts belonging to each section is estimated from said first correlation.

11. A method for managing a construction machine according to claim 10, wherein said second step further includes a fourth step (S50-56, S100-114) of obtaining, as said estimation data, second correlation between the past operation status for each section, to which parts having been repaired and replaced in the past belong, and the number of repaired/replaced parts based on both repair/replacement data of the past parts and said operation data, and the number of repaired/replaced parts belonging to each section is estimated by comparing said first correlation with said second correlation.

12. A method for managing a construction machine according to claim 9, wherein said first step (S9-S18A, S20-24, S30A-32A) measures a load for each section in addition to the operation status for each section, and stores and accumulates the measured operation status as operation data in the database (100) inside said base station computer (3), and
said second step further includes a fifth step (S42A, S430-442) of modifying said measured operation status depending on an amount of the measured load, and produces said estimation data by using, as said operation data, the operation status having been modified depending on load.

13. A method for managing a construction machine according to claim 9, wherein said operation status is at least one of an operating time and the number of operations per section.

14. A method for managing a construction machine according to claim 9, wherein said construction machine is a hydraulic excavator (1), and said section is any of a front (15), a swing body (13), a travel body (12), an engine (32), and a hydraulic pump (21a, 21b) of a hydraulic excavator.

15. A system for managing a construction machine, the system comprising:
operation-data measuring/collecting means (2, 40-46, 48, S9-14) for measuring and collecting an operation status for each of a plurality of construction machines (1, 1a, 1b, 1c) working in fields; and
a base station computer (3) mounted in a base station and having a database (100) in which the operation status measured and collected for each construction machine is stored and accumulated as operation data,
said base station computer including computing means (50, 51, S36-40, S44-47) for statistically processing said operation data, and then producing and outputting estimation data of the number of construction machines to be renewed, the number of renewed construction machines being estimated from said estimation data.

16. A system for managing a construction machine according to claim 15, wherein said computing means includes first means (50, S36-40, S60-72) for obtaining, as said estimation data, first correlation between the operation status of construction machines currently operated and the number of operated machines based on said operation data, and the number of renewed construction machines is estimated from said first correlation.

17. A system for managing a construction machine according to claim 16, wherein said computing means further includes second means (51, S44-47, S90-98) for obtaining, as said estimation data, second correlation between the operation status of construction machines, which have been renewed in the past, and the number of renewed machines based on both renewing data of the past construction machines and said operation data, and the number of renewed construction machines is estimated by comparing said first correlation with said second correlation.

18. A system for managing a construction machine according to claim 15, wherein said computing means includes a third step (50, S36-40, S60-72) for determining, as said estimation data, the number of those ones among construction machines currently operated, in which the operation status exceeds a preset reference value, based on said operation data, and the number of renewed construction machines is estimated from the determined number of machines.

19. A system for managing a construction machine according to claim 18, wherein said reference value is an average operation status (TA; DA) of construction machines that have been renewed in the past.

20. A system for managing a construction machine according to claim 19, wherein said computing step further includes a fourth step (51, S44-47, S90-98) for obtaining correlation between the operation status of construction machines, which have been renewed in the past, and the number of renewed machines based on both renewing data of the past construction machines and said operation data, and said average operation status is represented by a value (TA; DA) obtained from said correlation.

21. A system for managing a construction machine according to claim 15, wherein said operation status is at least one of an operating time and a mileage.

22. A system for managing a construction machine according to claim 18, wherein said operation status is an operating time, and said reference value is a repurchase judgment time obtained from a crossed point (P) between a trade-in value curve (X1) and a repair cost curve (X2).

23. A system for managing a construction machine, the system comprising:
 operation-data measuring/collecting means (2, 40-46, 48, S9-14) for measuring and collecting an operation status for each section (12, 13, 15, 21a, 21b, 32) of each of a plurality of construction machines (1, 1a, 1b, 1c) working in fields; and
 a base station computer (3, S30-32) mounted in a base station and having a database (100) in which the operation status measured and collected for each section is stored and accumulated as operation data,
 said base station computer including computing means (50, 51, S36-40, S50-56) for statistically processing said operation data, and then producing and outputting estimation data of the number of repaired/replaced parts belonging to each section, the number of repaired/replaced parts belonging to each section being estimated from said estimation data.

24. A system for managing a construction machine according to claim 23, wherein said computing means includes first means (50, S36-40, S81-87) for obtaining, as said estimation data, first correlation between the operation status for each section of construction machines currently operated and the number of operated machines based on said operation data, and the number of repaired/replaced parts belonging to each section is estimated from said first correlation.

25. A system for managing a construction machine according to claim 23, wherein said computing means further includes second means (51, S50-56, S100-114) for obtaining, as said estimation data, second correlation between the past operation status for each section, to which parts having been repaired and replaced in the past belong, and the number of repaired/replaced parts based on both repair/replacement data of the past parts and said operation data, and the number of repaired/replaced parts belonging to each section is estimated by comparing said first correlation with said second correlation.

26. A system for managing a construction machine according to claim 23, wherein said data measuring/-collecting means (2, 40-46, 48, S9-18A) measures a load for each section in addition to the operation status for each section,
 said base station computer (3, S30A-32A) stores and accumulates the operation status and the load, which have been measured and collected per section, as operation data in the database (100), and
 said computing means includes third means (50, S42A, S430-442) for modifying said measured operation status depending on an amount of the measured load, and produces said estimation data by using, as said operation data, the operation status having been modified depending on load.

27. A system for managing a construction machine according to claim 23, wherein said operation status is at least one of an operating time and the number of operations.

28. A system for managing a construction machine according to claim 23, wherein said construction machine is a hydraulic excavator (1), and said section is any of a front (15), a swing body (13), a travel body (12), an engine (32), and a hydraulic pump (21a, 21b) of a hydraulic excavator.

29. A processing apparatus wherein an operation status for each of a plurality of construction machines (1, 1a, 1b, 1c) working in fields is stored and accumulated as operation data, and said operation data is statistically processed to produce and output estimation data of the number of construction machines to be renewed.

30. A processing apparatus wherein an operation status for each section (12, 13, 15, 21a, 21b, 32) of each of a plurality of construction machines (1, 1a, 1b, 1c) working in fields is stored and accumulated as operation data, and said operation data is statistically processed to produce and output estimation data of the number of repaired/replaced parts belonging to each section.

* * * * *